US009243922B2

(12) United States Patent
Watts

(10) Patent No.: US 9,243,922 B2
(45) Date of Patent: Jan. 26, 2016

(54) WEATHER AVOIDANCE TOOL SYSTEM

(71) Applicant: Delta Air Lines, Inc., Atlanta, GA (US)

(72) Inventor: William Henry Watts, Seneca, SC (US)

(73) Assignee: Delta Air Lines, Inc., Atlanta, GA (US)

( * ) Notice: Subject to any disclaimer, the term of this patent is extended or adjusted under 35 U.S.C. 154(b) by 84 days.

(21) Appl. No.: 13/781,573

(22) Filed: Feb. 28, 2013

(65) Prior Publication Data

US 2013/0226452 A1 Aug. 29, 2013

Related U.S. Application Data

(60) Provisional application No. 61/604,022, filed on Feb. 28, 2012.

(51) Int. Cl.
*G06F 7/00* (2006.01)
*G01C 21/34* (2006.01)
*G08G 5/00* (2006.01)
*G01W 1/00* (2006.01)

(52) U.S. Cl.
CPC .......... *G01C 21/3407* (2013.01); *G08G 5/0021* (2013.01); *G08G 5/0091* (2013.01); *G01W 2001/003* (2013.01)

(58) Field of Classification Search
None
See application file for complete search history.

(56) References Cited

U.S. PATENT DOCUMENTS

| | | | |
|---|---|---|---|
| 5,265,024 A | 11/1993 | Crabill et al. | |
| 6,289,277 B1 | 9/2001 | Feyereisen et al. | |
| 6,381,538 B1 | 4/2002 | Robinson et al. | |
| 6,650,972 B1 | 11/2003 | Robinson et al. | |
| 6,917,860 B1 | 7/2005 | Robinson et al. | |
| 7,027,898 B1 | 4/2006 | Leger et al. | |
| 7,463,955 B1 | 12/2008 | Robinson et al. | |
| 7,471,995 B1 | 12/2008 | Robinson | |
| 7,612,688 B1 | 11/2009 | Vigeant-Langlois et al. | |
| 8,135,500 B1 | 3/2012 | Robinson | |
| 2004/0183695 A1 | 9/2004 | Ruokangas et al. | |
| 2008/0208474 A1* | 8/2008 | Wilson | 702/3 |
| 2010/0057362 A1 | 3/2010 | Schilke et al. | |
| 2011/0022294 A1 | 1/2011 | Apley | |

OTHER PUBLICATIONS

Brown, B. G., et al., "Forecast Icing Potential (FIP): Quality Assessment Report," Quality Assessment Product Development Team of the Federal Aviation Administration's Aviation Weather Research Program, Apr. 24, 2003, 39 pages, USA.

(Continued)

*Primary Examiner* — Thomas Tarcza
*Assistant Examiner* — Garrett Evans
(74) *Attorney, Agent, or Firm* — Alston & Bird LLP

(57) ABSTRACT

A method of providing a simplified practice for dealing with aviation turbulence and other weather hazards that allows the end users to better communicate turbulence as a state of the atmosphere metric and the additional weather threats affecting the flight is described. The method provides an Atmospheric State Index (ASI) that allows all the users to work with a standardized metric that describes the turbulence as the state of the atmosphere and a similar scale for other weather risks to the flight. This system makes the correlation between the forecast and aircraft reports for turbulence easier to interpret for the end users. This approach concentrates on turbulence as a weather hazard with a more objective and easier to use metric. This configuration provides a transition for moving from a system based on turbulence Pilot Reports (PIREPS) to a more objective data driven process in the air traffic environment.

25 Claims, 37 Drawing Sheets

(56) References Cited

OTHER PUBLICATIONS

United States Government, "aviationweather.gov/adds/turbulence/turbnav", Jan. 7, 2012 to Aug. 7, 2013, Internet Archive <http://web.archive.org/web/20120107231245/http://www.aviationweather.gov/adds/turbulence/turbnav>, 3 pages.

United States Government, "aviationweather.gov", Aug. 7, 2002 to Aug. 6, 2013, Internet Archive <http://web.archive.org/web/20130806175005/http://www.aviationweather.gov/>, 2 pages.

International Searching Authority, International Search Report and Written Opinion for International Application No. PCT/US2013/028444, Jul. 24, 2013, 16 pages, European Patent Office, The Netherlands.

\* cited by examiner

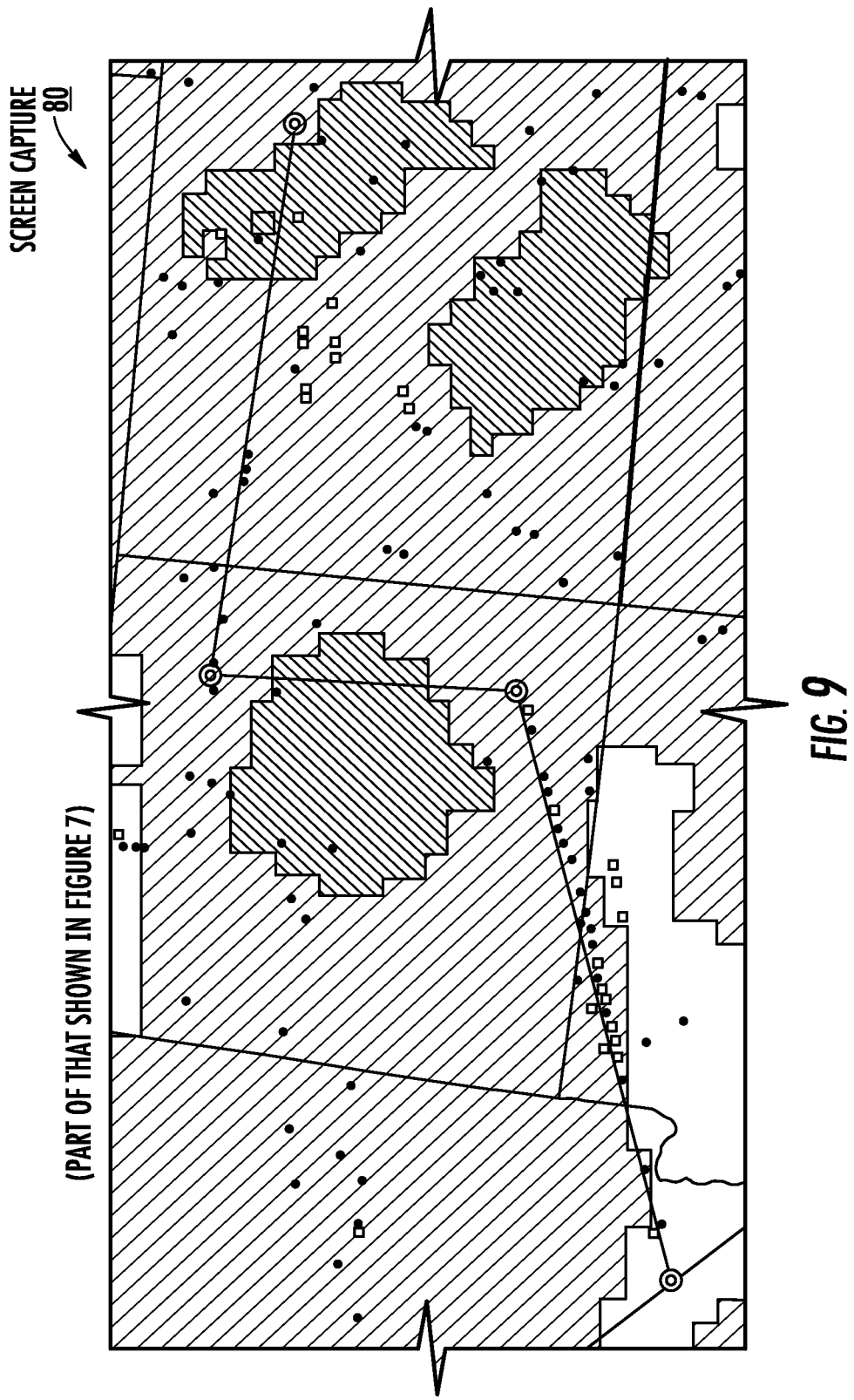

Inspect values

From PHX -> JFK  12 Observations between 17/28Z 04/20/11 and 17/40Z 04/20/11

| Time | Lat/Long | Altitude | Wdir/Wspd | Temp | Edr Peak/Avg |
|---|---|---|---|---|---|
| 17:28 | -79.45,41.832 | 31000 | 228/110 | -36.5 | 0.06/0.64 |
| 17:29 | -79.253,41.835 | 30990 | 228/111 | -35.2 | 0.05/0.64 |
| 17:30 | -79.053,41.842 | 38990 | 227/377 | -38.7 | 0.09999994/0.06 |
| 17:31 | -78.055,41.847 | 30990 | 226/378 | -35 | 0.17999994/0.08 |
| 17:32 | -78.581,41.851 | 30990 | 226/372 | -39.2 | 0.15/0.17 |
| 17:33 | -78.455,41.855 | 31080 | 228/372 | -35 | 0.17999999/0.12 |
| 17:34 | -78.286,41.858 | 29830 | 233/373 | -33.2 | 0.28/0.17999999 |
| 17:35 | -78.07,41.862 | 28890 | 232/372 | -35.7 | 0.08/0.02 |
| 17:37 | -77.707,41.825 | 29830 | 234/371 | -35.5 | 0.02/0.02 |
| 17:38 | -77.532,41.779 | 29000 | 236/372 | -35.5 | 0.02/0.02 |
| 17:39 | -77.355,41.735 | 29030 | 237/96 | -35.2 | 0.04/0.02 |
| 17:40 | -77.195,41.685 | 28990 | 238/95 | -36.5 | 0.08/0.02 |

SCREEN CAPTURE 120

INVENTOR CONCEPT: CHANGE THIS TO ASI INDEX FOR PEAK ONLY

*FIG. 13*

ATMOSPHERE STATE INDEX ("ASI")

| TURBULENCE DESCRIPTOR | CURRENT METRIC EQUIVALENT (EDR) | NUMERIC RISK RANGE | COLOR CODE |
|---|---|---|---|
| NONE | 0 | 0 | CLEAR |
| LOW END OF NULL/VERY LIGHT | >0 to 0.09 | >0 to 9 | LIGHT BLUE |
| HIGH END OF NULL/VERY LIGHT | 0.10 to 0.19 | 10 to 19 | DARK BLUE |
| LOW END OF LIGHT | 0.20 to 0.29 | 20 to 29 | LIGHT GREEN |
| HIGH END OF LIGHT | 0.30 to 0.39 | 30 to 39 | DARK GREEN |
| LOW END OF MODERATE | 0.40 to 0.49 | 40 to 49 | LIGHT ORANGE |
| HIGH END OF MODERATE | 0.50 to 0.59 | 50 to 59 | DARK ORANGE |
| LOW END OF SEVERE | 0.60 to 0.69 | 60 to 69 | LIGHT RED |
| HIGH END OF SEVERE | 0.70 to 0.79 | 70 to 79 | DARK RED |
| LOW END OF EXTREME | 0.80 to 0.89 | 80 to 89 | LIGHT MAROON |
| HIGH END OF EXTREME | 0.90 to 0.99 | 90 to 99 | DARK MAROON |

EXAMPLE SHOWN FOR TURBULENCE IS TYPICAL FOR OTHER HAZARDS

*FIG. 14*

ASI INDEX FOR TURBULANCE

ATMOSPHERIC STATE

| VERY LT | VERY LT TO LT | LT | LT TO MOD | MOD | MOD TO SEV | SEV | SEV TO EX | EX | EX PLUS |
|---|---|---|---|---|---|---|---|---|---|
| >0 TO 9 | 10 TO 19 | 20 TO 29 | 30 TO 39 | 40 TO 49 | 50 TO 59 | 60 TO 69 | 70 TO 79 | 80 TO 89 | 90 TO 99 |
| LIGHT BLUE | DARK BLUE | LIGHT GREEN | DARK GREEN | YELLOW | ORANGE | PINK | RED | MAROON | BLACK |

NOTE

0 OR NONE WILL HAVE NO COLOR INDICATION, BUT ANYTHING GREATER THAN 0 WILL HAVE A COLOR TO MATCH THE SCALE ABOVE. THIS IS THE REASON THE "LIGHT BLUE" SCALE IS > 0 TO 9 INSTEAD OF 0 TO 9

FIG. 17

ASI INDEX FOR VISIBILITY

ATMOSPHERIC STATE

| VFR > 5 MILES | | | | | MVFR > 5K TO 3 MILES | | | IFR > 3 TO 1 MILES | | LIFR <1 MILE |
|---|---|---|---|---|---|---|---|---|---|---|
| 10-9 MILES | 9-8 MILES | 8-7 MILES | 7-6 MILES | 6 TO 5 MILES | 5 TO 4 MILES | 4 TO 3 MILES | 3 TO 2 MILES | 2 TO 1 MILES | 1K TO 0 | |
| LIGHT BLUE | DARK BLUE | LIGHT GREEN | DARK GREEN | YELLOW | ORANGE | PINK | RED | MAROON | BLACK | |
| 10 | 20 | 30 | 40 | 50 | 60 | 70 | 80 | 90 | | |

| CATEGORY | CEILING | | VISIBILITY |
|---|---|---|---|
| LOW INSTRUMENT FLIGHT RULES LIFR* | BELOW 500 FEET AGL | AND/OR | LESS THAN 1 MILE |
| INSTRUMENT FLIGHT RULES IFR | 500 TO BELOW 1,000 FEET AGL | AND/OR | 1 MILE TO LESS THAN 3 MILES |
| MARGINAL VISUAL FLIGHT RULES MVFR | 1,000 TO 3,000 FEET AGL | AND/OR | 3 to 5 MILES |
| VISUAL FLIGHT RULES VFR+ | GREATER THAN 3,000 FEET AGL | AND | GREATER THAN 5 MILES |

*BY DEFINITION, IFR IS CEILING LESS THAN 1,000 FEET AGL AND/OR VISIBILITY LESS THAN 3 MILES WHILE LIFR IS A SUB-CATEGORY OF IFR.
+BY DEFINITION, VFR IS CEILING GREATER THAN OR EQUAL TO 3,000 FEET AGL AND VISIBILITY GREATER THAN OR EQUAL TO 5 MILES WHILE MVFR IS A SUB-CATEGORY OF VFR.

| M | □ | O | ⊕ | ◐ | ● | ● | ⊗ | DVX |
|---|---|---|---|---|---|---|---|---|
| MISSING | CLR | SKC | FEW | SCT | BKN | OVC | | |

CLOUD COVERAGE SYMBOLS

AUTOMATED STATIONS REPORT "CLR" WHEN CLOUDS MAY EXIST ABOVE 12,000 FEET SO A SQUARE IS USED TO REPRESENT THIS UNCERTAINTY WHEREAS AN UNFILLED CIRCLE IS USED FOR "SKC" WHICH A HUMAN REPORTS THE SKY IS COMPLETELY CLEAR OVERHEAD. THE ABBREVIATION "OVX" IS UNOFFICIAL BUT ADDS USES IT HERE TO INDICATE THE SKY IS OBSCURED WHICH IS THE CASE WHEN A METAR REPORTS VERTICAL VISIBILITY AND NO CLOUD INFORMATION.

*FIG. 18*

ASI INDEX FOR CEILING
ATMOSPHERIC STATE

| VFR > 3K FEET | | | | | | | MVFR 3K TO 1K | | LIFR < 0.5K / IFR < 1K TO 0.5K | |
|---|---|---|---|---|---|---|---|---|---|---|
| 10K-9K FEET | 9K-8K FEET | 8K TO 7K FEET | 7K TO 6K FEET | 6K TO 5K FEET | 5K TO 4K FEET | 4K TO 3K FEET | 3K TO 2K FEET | 2K TO 1K FEET | 1K TO 0 | |
| LIGHT BLUE | DARK BLUE | LIGHT GREEN | DARK GREEN | YELLOW | ORANGE | PINK | RED | MAROON | BLACK | |
| 10 | 20 | 30 | 40 | 50 | 60 | 70 | 80 | 90 | | |

CEILING

| CATEGORY | CEILING |
|---|---|
| LOW INSTRUMENT FLIGHT RULES LIFR* | BELOW 500 FEET AGL |
| INSTRUMENT FLIGHT RULES IFR | 500 TO BELOW 1,000 FEET AGL |
| MARGINAL VISUAL FLIGHT RULES MVFR | 1,000 TO 3,000 FEET AGL |
| VISUAL FLIGHT RULES VFR+ | GREATER THAN 3,000 FEET AGL |

*BY DEFINITION, IFR IS CEILING LESS THAN 1,000 FEET AGL AND/OR VISIBILITY LESS THAN 3 MILES WHILE LIFR IS A SUB-CATEGORY OF IFR.
+BY DEFINITION, VFR IS CEILING GREATER THAN OR EQUAL TO 3,000 FEET AGL AND VISIBILITY GREATER THAN OR EQUAL TO 5 MILES WHILE MVFR IS A SUB-CATEGORY OF VFR.

VISIBILITY

| | | |
|---|---|---|
| | AND/OR | LESS THAN 1 MILE |
| | AND/OR | 1 MILE TO LESS THAN 3 MILES |
| | AND/OR | 3 to 5 MILES |
| | AND | GREATER THAN 5 MILES |

CLOUD COVERAGE SYMBOLS

M □ ○ ◉ ● ● ⊗
MISSING CLR SKC FEW SCT BKN OVC DVX

AUTOMATED STATIONS REPORT "CLR" WHEN CLOUDS MAY EXIST ABOVE 12,000 FEET SO A SQUARE IS USED TO REPRESENT THIS UNCERTAINTY WHEREAS AN UNFILLED CIRCLE IS USED FOR "SKC" WHICH A HUMAN REPORTS THE SKY IS COMPLETELY CLEAR OVERHEAD. THE ABBREVIATION "OVX" IS UNOFFICIAL BUT ADDS USES IT HERE TO INDICATE THE SKY IS OBSCURED WHICH IS THE CASE WHEN A METAR REPORTS VERTICAL VISIBILITY AND NO CLOUD INFORMATION.

FIG. 19

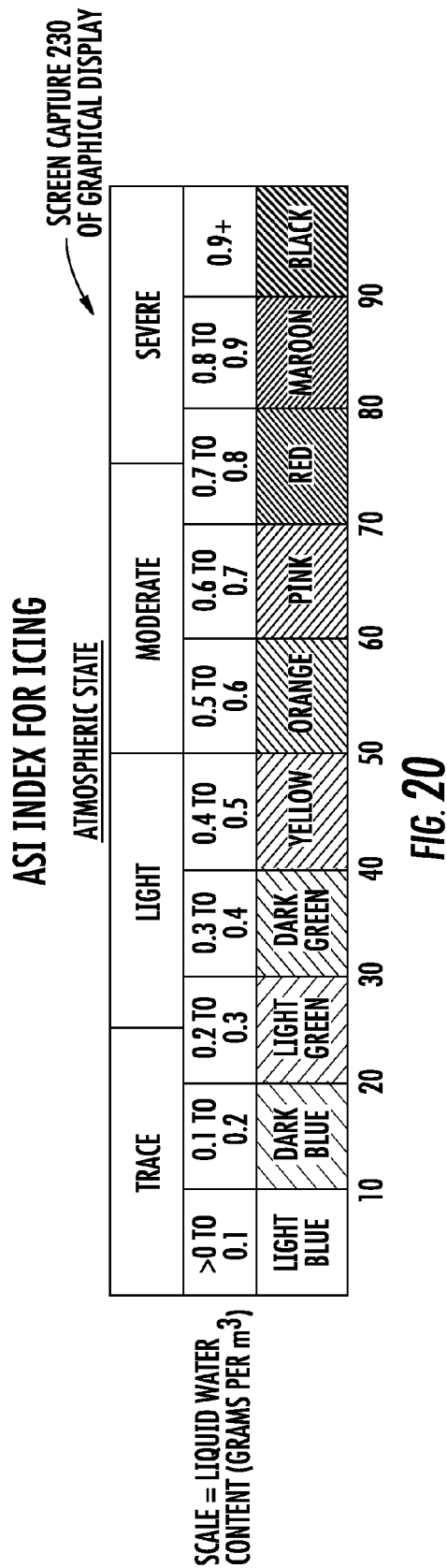

ASI INDEX FOR VOLCANIC ASH
ATMOSPHERIC STATE

| TRACE | LIGHT | MODERATE | SEVERE |
|---|---|---|---|
| 0-10 MILLIGRAMS PER CUBIC METER (LOGARITHMIC SCALE) | | 10-10,000 MILLIGRAMS PER CUBIC METER (LOGARITHMIC SCALE) | |

| LIGHT BLUE | DARK BLUE | LIGHT GREEN | DARK GREEN | YELLOW | ORANGE | PINK | RED | MAROON | BLACK |
|---|---|---|---|---|---|---|---|---|---|
| | 10 | 20 | 30 | 40 | 50 | 60 | 70 | 80 | 90 |

*FIG. 22*

ASI INDEX FOR GROUND CROSSWIND
ATMOSPHERIC STATE

| 0 TO 5 | 5 TO 10 | 10 TO 15 | 15 TO 20 | 20 TO 25 | 25 TO 30 | 30 TO 35 | 35 TO 40 | 40 TO 45 | 45 TO 50 |
|---|---|---|---|---|---|---|---|---|---|

CROSSWIND COMPONENT IN KNOTS

| LIGHT BLUE | DARK BLUE | LIGHT GREEN | DARK GREEN | YELLOW | ORANGE | PINK | RED | MAROON | BLACK |
|---|---|---|---|---|---|---|---|---|---|
| | 10 | 20 | 30 | 40 | 50 | 60 | 70 | 80 | 90 |

*FIG. 23*

WEATHER AVOIDANCE TOOL SYSTEM

CROSS REFERENCE TO RELATED APPLICATIONS

This application claims priority to and the benefit of U.S. Application No. 61/604,022 entitled, "Turbulence Detection and Reporting System" that was filed on Feb. 28, 2012, the entirety which is hereby incorporated by reference herein.

BACKGROUND

1. Technical Field

Embodiments of the present invention described herein relate generally to the appraisal of various weather hazards, including but not limited to such hazards as they affect air, ground, and water travel.

2. Description of Related Art

Weather has long been known the affect travel, including air, ground and sea travel. It has also long been known to attempt to better understand current and forecast weather data in order to provide for safer and more efficient travel for recreational and professional consumers.

Weather is a very complex phenomenon, and the descriptions of its various components are generally produced by people with an intimate knowledge of the subject. This can often lead to confusion for the end user whose familiarity with the various components varies widely. The consumers of this data include all segments of society including recreational and professional consumers.

The descriptors for weather often can be confusing to users who do not have an in depth knowledge of the various components. For example in convective weather descriptions, there are many different scales for the various hazards resulting from the storm. For radar, there are several scales for the reflectivity (dBz) depending on the mode of the radar. There are also varying scales for rainfall amounts, lightning, icing and turbulence. Business and general aviation can struggle with this widely varying array of products.

A significant focus of this discussion will be upon aviation, but the tools can address the shortcomings in other areas such as marine and ground transportation since the goal of an intuitive, straightforward approach is similar across the user population.

Aviation

Atmospheric turbulence has plagued aviation since its earliest days. Pilots, air traffic controllers, and airline dispatchers have officially relied on pilot reports (PIREPs) of hazards such as turbulence, icing, etc., to ascertain both its location and severity. Although PIREPs are firsthand accounts of actual pilot experiences, they have by their very nature limitations. Each pilot's interpretation of a given encounter with turbulence may vary widely, and reports are generally few. According to some research, the average difference between the actual location of a turbulence encounter and the reported location of the same encounter as contained in a PIREP is 135 km. They can also be very aircraft-dependent; a pilot's report of his aircraft reaction relative to the current atmospheric state can be very different in a regional jet compared to an Airbus 380.

In addition, the relatively few PIREPs recorded are often broadcast too late to avoid similar encounters by nearby or trailing aircraft. In the context of the modern air traffic system and air carrier operations, the shortcomings of turbulence related PIREPs have significant consequences in three main areas.

Probably most obvious among these is the realm of aviation safety. The lack of real time, objective turbulence data for pilots, dispatchers and controllers in an area where unexpected turbulence is present can lead to unnecessary and sometimes unsafe turbulence encounters for multiple aircraft, whereas the presence of better defined data could lead to mitigation or avoidance tactics and far fewer cabin injuries. While the robust structural standards to which airliners are now manufactured provide adequate structural safety margins for the aircraft, it is essential that crews are able to alert the passengers and crew to ensure their safety.

Pilots and air traffic controllers also know intuitively that the imperfections of conventional turbulence reporting adversely affect airspace capacity, (the second main reason), particularly with respect to the utilization of en route altitudes. For a better understanding of how this is possible, consider the following scenario which, though the flight is hypothetical, is borne out thousands of times each day within the National Airspace System (NAS). The pilots of Flight 123, a regional jet, report moderate turbulence at their flight planned altitude of Flight Level 330 (FL330) and are given clearance to descend to FL290 for a better ride. Due partly to the subjective nature of reporting, imagine that the level of the turbulence encountered was actually only light and would have been of very short duration. Consider also that what might have been light turbulence for the regional jet would have been an even lesser level for larger airplanes transiting the same area. But because data in this airspace is inadequate both quantitatively and qualitatively, word of moderate turbulence at FL330 is propagated often for hours, resulting in the potentially significant underutilization of en route airspace.

The reality of day-to-day operations, however, reveals a problem of much greater magnitude, as conscientious users in a given area routinely avoid numerous en route altitudes just for light turbulence. Although pilots, controllers, and dispatchers speculate as to the pervasiveness of this phenomenon, their suspicions are in fact supported by flight data. Preliminary studies show approximately 30% of flights will leave their flight level within 5 minutes of an initial encounter with turbulence of 0.2 g or higher. A subset of these changes were either appropriate for the level of turbulence encountered or the result of an air traffic control clearance unrelated to the turbulence, but it is also reasonable to assume that a good percentage of these changes were due to the light turbulence alone. It is also worth noting that these data do not account for the number of flights that never achieved the most efficient flight planned altitude due to mere rumors of turbulence over the ATC frequency.

Although airline dispatchers work diligently to arrive at the best compromise of ride comfort and economy in generating flight plan cruise altitudes, they lack accurate objective data to aid in their decisions due to the above issues. Even when they are able to provide good recommendations, such efforts are routinely and unnecessarily undermined by the repeated occurrence of the above scenario.

Of course, all of this maneuvering has yet a third consequence in that it significantly reduces airline fuel economy and increases carbon emissions. For all major U.S. carriers, it is estimated that jet fuel wasted annually due to these inefficiencies could be in the hundreds of millions dollar range. Though expensive in its own right for airlines, wasted fuel also has significant social and environmental costs in the form of excessive carbon emissions, as well as delay costs for the traveling public via the overall poor allocation of airspace. These inefficiencies exacerbate the challenges to commerce presented by stubbornly high energy prices, which are now being borne by air travelers in the form of fuel surcharges and higher ticket prices.

The present system for handling initial flight plans and any subsequence changes called reroutes is very labor intensive, especially with changes due to weather. For a typical commercial flight, a licensed dispatcher in the airline's operational center files a flight plan electronically using a tool that gives the optimal path based on the business model of the corporation and the time of departure. If there are no constraints, the air traffic system will respond with a clearance that is received by the airline and entered into the air traffic control computers. If there are any changes needed, the airline and the air traffic provider negotiate the changes acceptable to both parties. In a dynamic weather situation, this process can be tedious and cumbersome often resulting in delays. The arrival times are dependent on these delays and often result in a long string of aircraft based on first come first served in the arrival sequence.

Marine and Ground Transportation

The use of weather in the marine and ground transportation segments can vary even more than aviation because of the wide range of user background and experience. Many users have no training in weather basics or the products produced by the governing agencies.

Different Hazards

Producers of weather hazards include convective activity, hurricanes, and sandstorms.

BRIEF SUMMARY OF VARIOUS EMBODIMENTS OF THE INVENTION

According to various embodiments of the present invention, a method is provided for planning a path of air travel through a three dimensional travel region having at least two different types of travel hazards each having varying degrees of intensity. Various embodiments of the method comprise the steps of: A) accumulating data relating to each of the two different types of travel hazards, the two hazards being "Hazard 1" and "Hazard 2"; B) converting each of the sets of data ("Hazard 1 Data" and Hazard 2 Data") to fit to a common atmospheric state intensity scale, such that Hazard 1 Data can be used to report the intensity of Hazard 1 along the common atmospheric state intensity scale, and such that Hazard 2 Data can be used to report the intensity of Hazard 2 along the intensity scale; and C) using both sets of converted data to plan a path of air travel through the three dimensional travel region.

According to various embodiments of the present invention, a method is provided for planning a path of air travel through a three dimensional travel region having at least two different types of travel hazards each having varying degrees of intensity. Various embodiments of the method comprise the steps of: A) accumulating data relating to each of the two different types of travel hazards, the two hazards being "Hazard 1" and "Hazard 2"; B) converting each of the sets of data ("Hazard 1 Data" and Hazard 2 Data") to fit to a common atmospheric state intensity ("ATI") scale, such that Hazard 1 Data can be used to report the intensity of Hazard 1 along the common atmospheric state intensity scale, and such that Hazard 2 Data can be used to report the intensity of Hazard 2 along the intensity scale; C) establishing travel tolerance parameters (TTPs) following the ATI scale for each of the hazards, such that travel tolerance parameter (TTP) is set for Hazard 1, and a separate travel tolerance parameter (TTP) is set for Hazard 2; and D) using both sets of converted data from step "B" as well as both TTPs from step "C" to plan a path of air travel through the three dimensional travel region.

According to various embodiments of the present invention, a method is provided for planning a path of air travel through a three dimensional travel region having at least two different types of travel hazards each having varying degrees of intensity. Various embodiments of the method comprise the steps of: A) accumulating data relating to each of the two different types of travel hazards, the two hazards being "Hazard 1" and "Hazard 2"; B) converting each of the sets of data ("Hazard 1 Data" and Hazard 2 Data") to fit to a common atmospheric state intensity ("ATI") scale, such that Hazard 1 Data can be used to report the intensity of Hazard 1 along the common atmospheric state intensity scale, and such that Hazard 2 Data can be used to report the intensity of Hazard 2 along the intensity scale; C) establishing travel tolerance parameters (TTPs) following the ATI scale for each of the hazards, such that travel tolerance parameter (TTP) is set for Hazard 1, and a separate travel tolerance parameter (TTP) is set for Hazard 2; and D) using both sets of converted data from step "B" as well as both TTPs from step "C" to plan a path of air travel through the three dimensional travel region, by using the reports in the form of two different screen displays, one displaying information relating to Hazard 1 using the common atmospheric scale, and the other displaying information relating to Hazard 2 using the common atmospheric scale, wherein the reports vary depending upon the TTPs in place.

According to various embodiments of the present invention, a method is provided for planning a path of air travel through a three dimensional travel region having at least two different types of travel hazards each having varying degrees of intensity. Various embodiments of the method comprise the steps of: A) accumulating data relating to each of the two different types of travel hazards, the two hazards being "Hazard 1" and "Hazard 2"; B) converting each of the sets of data ("Hazard 1 Data" and Hazard 2 Data") to fit to a common atmospheric state intensity ("ATI") scale, such that Hazard 1 Data can be used to report the intensity of Hazard 1 along the common atmospheric state intensity scale, and such that Hazard 2 Data can be used to report the intensity of Hazard 2 along the intensity scale; C) establishing travel tolerance parameters (TTPs) following the ATI scale for each of the hazards, such that travel tolerance parameter (TTP) is set for Hazard 1, and a separate travel tolerance parameter (TTP) is set for Hazard 2; D) using both sets of converted data from step "B" as well as both TTPs from step "C" to plan a path of air travel through the three dimensional travel region; and E) altering the path of travel by monitoring the levels of "Hazard 1" and "Hazard 2" and upon recognition that the path of travel is incompatible with either of the TTPs.

According to various embodiments of the present invention, a weather avoidance system for planning a path of air travel through a three dimensional travel region. The system comprises: one or more memory storage areas containing data related to at least two different types of travel hazards each having varying degrees of intensity; and one or more computer processors. The processors are configured to: accumulate data relating to each of the two different types of travel hazards, the two hazards being "Hazard 1" and "Hazard 2"; convert each of the sets of data ("Hazard 1 Data" and Hazard 2 Data") to fit to a common atmospheric state intensity ("ATI") scale, such that Hazard 1 Data can be used to report the intensity of Hazard 1 along the common atmospheric state intensity scale, and such that Hazard 2 Data can be used to report the intensity of Hazard 2 along the intensity scale; and use both sets of converted data from step "B" as well as both TTPs from step "C" to plan a path of air travel through the three dimensional travel region.

In certain embodiments, the system processors are further configured to establish travel tolerance parameters (TTPs) following the ATI scale for each of the hazards, such that a travel tolerance parameter (TTP) is set for Hazard 1, and a separate travel tolerance parameter (TTP) is set for Hazard 2; and use both TTPS to further plan the path of air travel through the three dimensional travel region.

According to various embodiments of the present invention, a non-transitory computer program product is provided comprising at least one computer-readable storage medium having computer-readable program code portions embodied therein. The computer-readable program code portions comprise: (A) a first executable portion configured for accumulating data relating to two different types of travel hazards each having varying degrees of intensity, the two hazards being "Hazard 1" and "Hazard 2"; (B) a second executable portion configured for converting each of the sets of data ("Hazard 1 Data" and Hazard 2 Data") to fit to a common atmospheric state intensity ("ATI") scale, such that Hazard 1 Data can be used to report the intensity of Hazard 1 along the common atmospheric state intensity scale, and such that Hazard 2 Data can be used to report the intensity of Hazard 2 along the intensity scale; and (C) a third executable portion configured for using both sets of converted data to plan a path of air travel through the three dimensional travel region.

BRIEF DESCRIPTION OF THE SEVERAL VIEWS OF THE DRAWING(S)

FIG. 1 is a flowchart illustrating one process under one aspect of one of the inventions described herein.

FIG. 2 is a screen capture of a Web site on the current FAA ADDS site showing, among other data, a combined version of GTG turbulence forecast with EDR reports superimposed on the forecast. See http://aviationweather.gov/adds/turbulence/turbnav as well as http://aviationweather.gov/ generally. This is available on a secure site for participating users. The screen shot has been taken with the cursor hovering over an EDR icon. GTG is a forecast model shown in the plan view with colored globs representing different levels of turbulence based on the response on a nominal Boeing 757 to the atmospheric state. Since the GTG is a three dimensional grid product, an altitude slider is available, which may be positioned on the right side of the screen. As you move the altitude slider the color globs will change based on the turbulence forecast for the selected altitude. The reports are given for a range of altitudes either side of the selected altitude based on setting in a configuration pull down menu or reports for all altitudes will be shown if the "All" box at the bottom of the altitude slider is checked. Notably, the aircraft reports are based on the state of the atmosphere and not based on the aircraft response. The "Minimum EDR Peak Severity" allows the user to filter the severity of the reports shown on the map. The time scale below the Severity scale shows the current time and the times for the forecast and reports. The "Background Grids" and "Data Overlays" in the lower left allow other selections of weather products and the availability of each Data Set.

FIG. 9 is a more detailed screen capture 80 of FIG. 8.

Figure 8A:
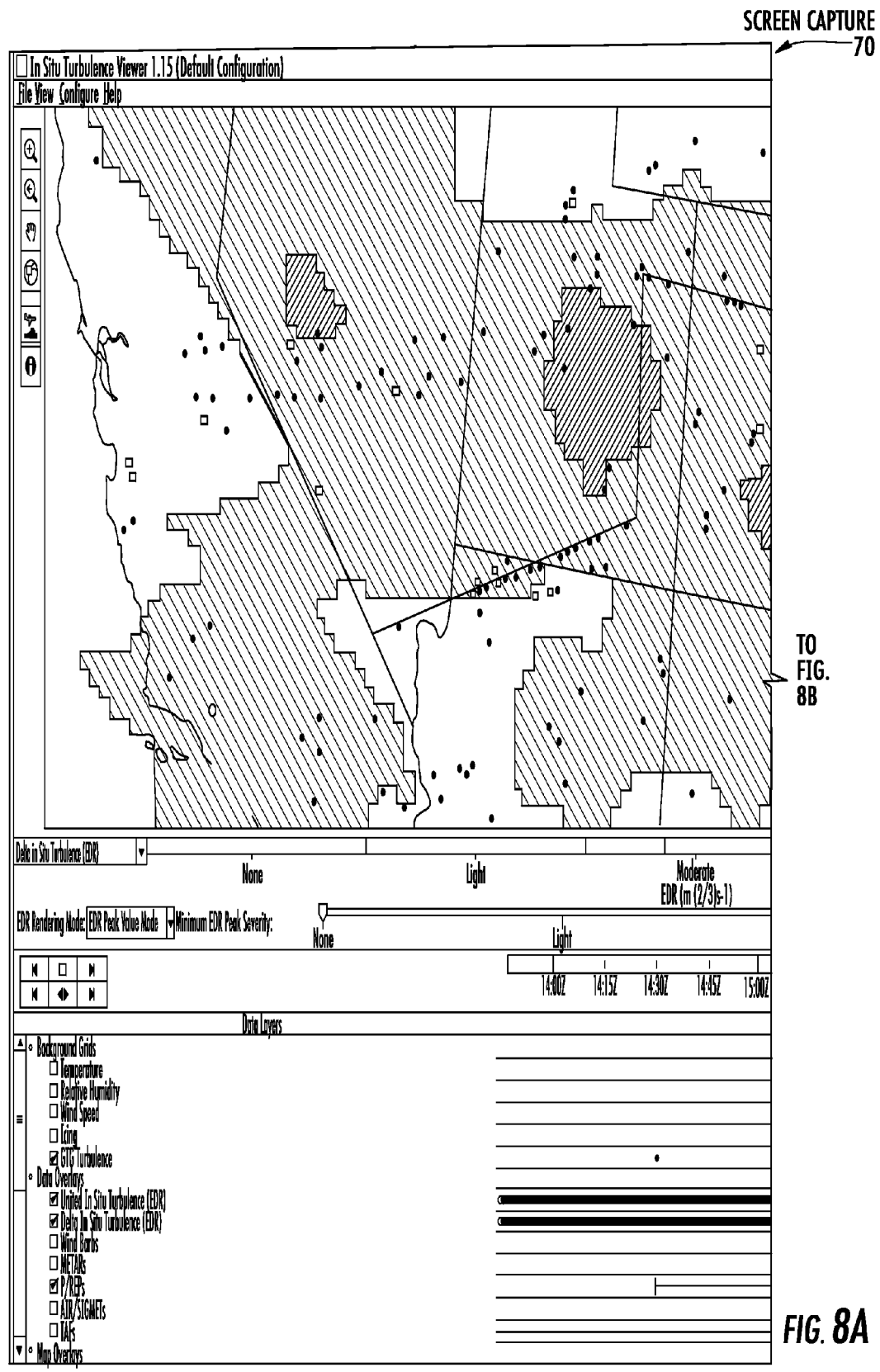
FIG. 8 is a screen capture 70 of the plan view for the forecasted turbulence (GTG) of a certain southeast portion of the US at 22,000 feet as shown by the altitude slider on the right side.
Figure 8B:
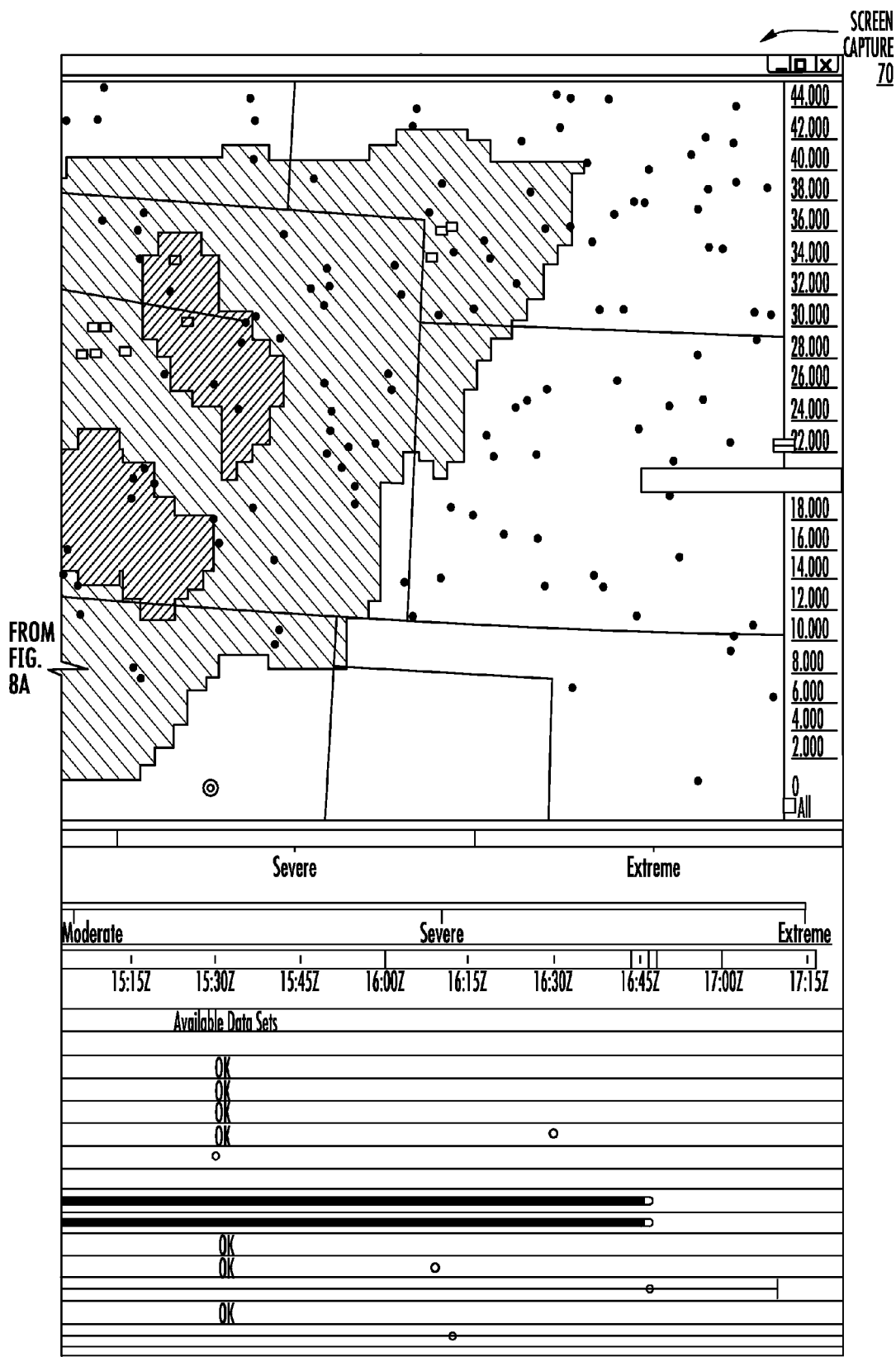
Figure 10:
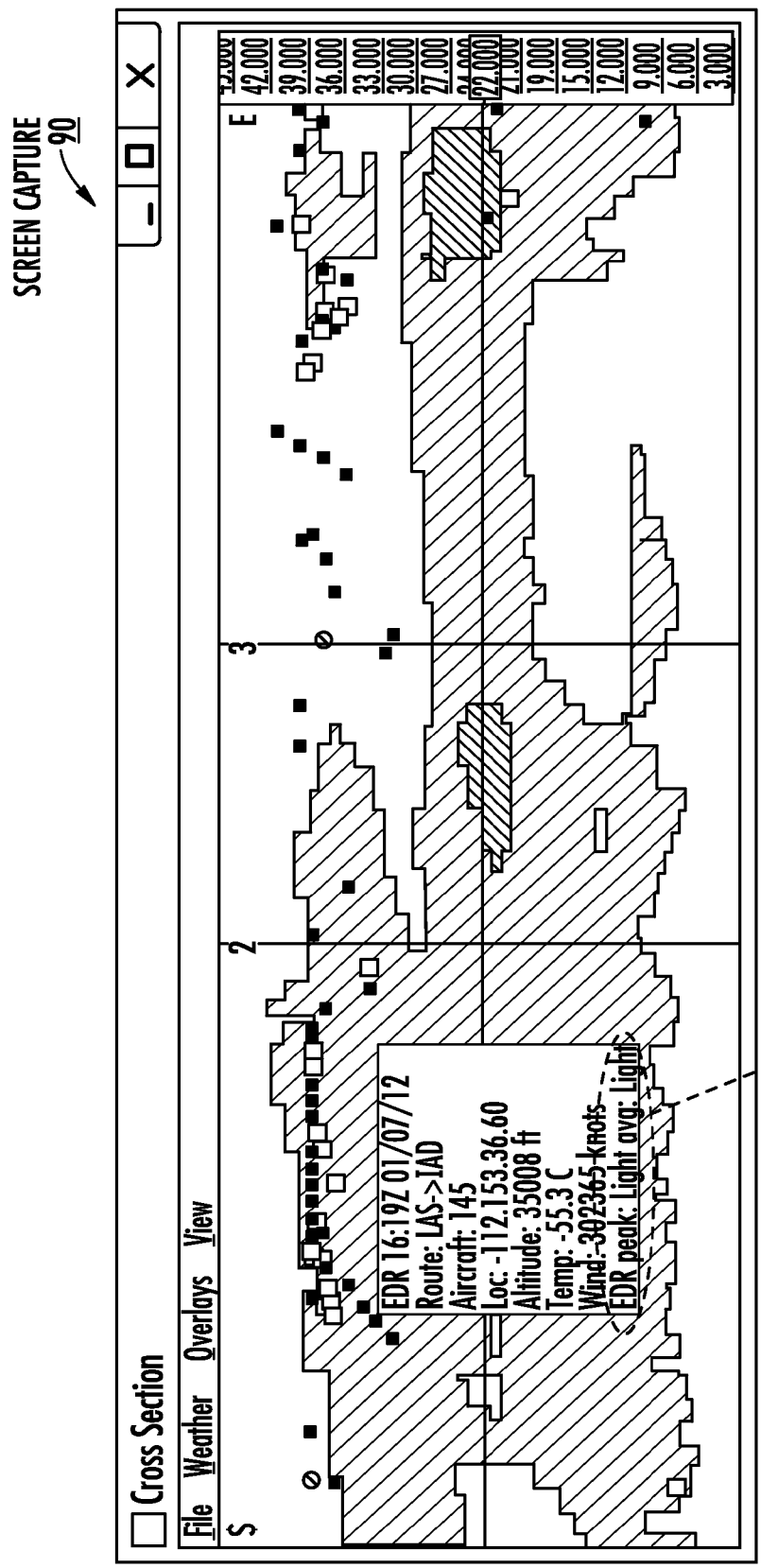

FIG. 10 is a screen capture 90 of the vertical cross section a discrete distance (e.g., 50 miles) either side of the path created in FIG. 8. The altitude slider in this view is only a reference line since the cross section covers all altitudes. The brown shading at the bottom represents terrain. The added text describes an inventive concept described herein of changing the EDR Peak/Avg readings to ASI values for peak only.

Figure 11A:
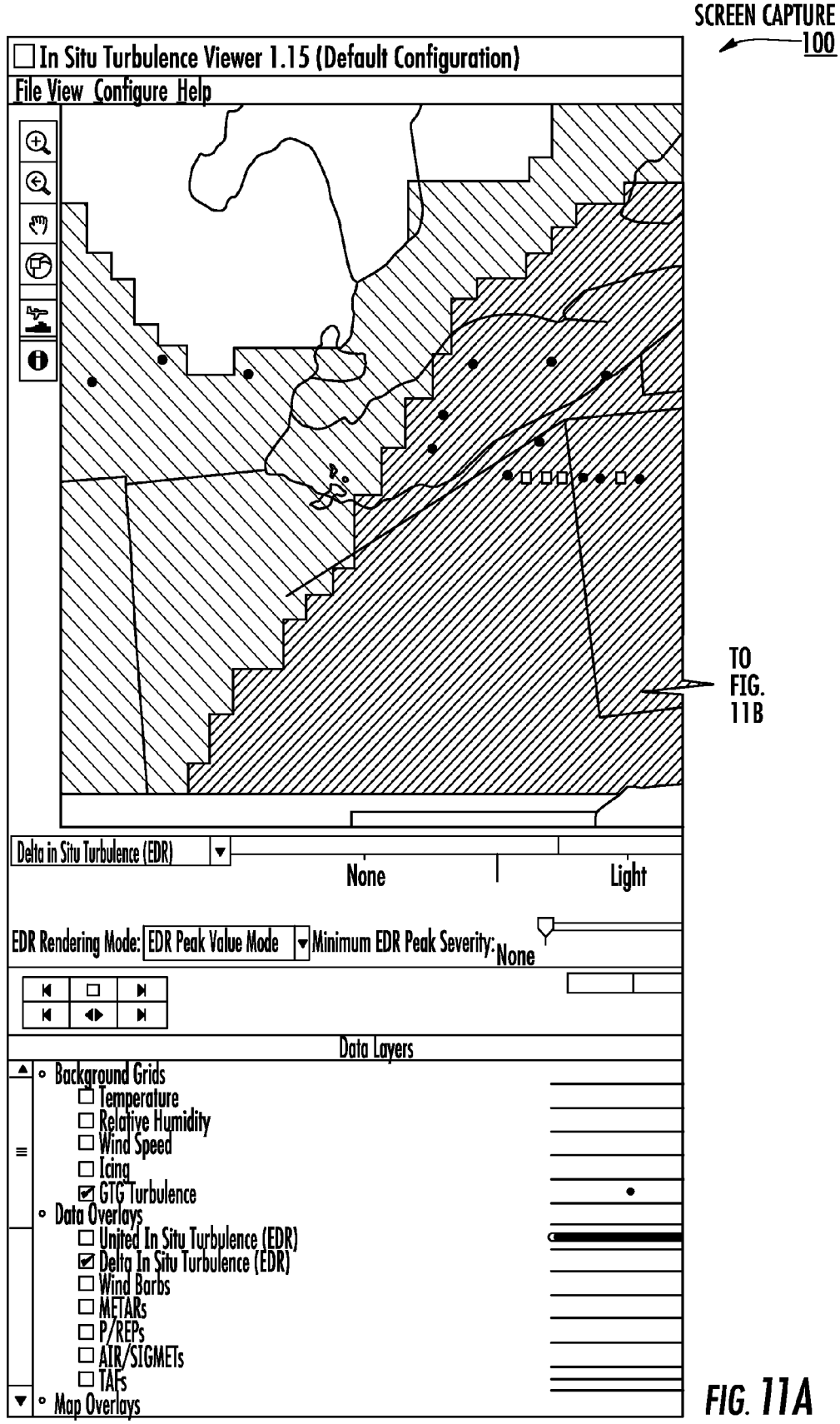
Figure 11B:
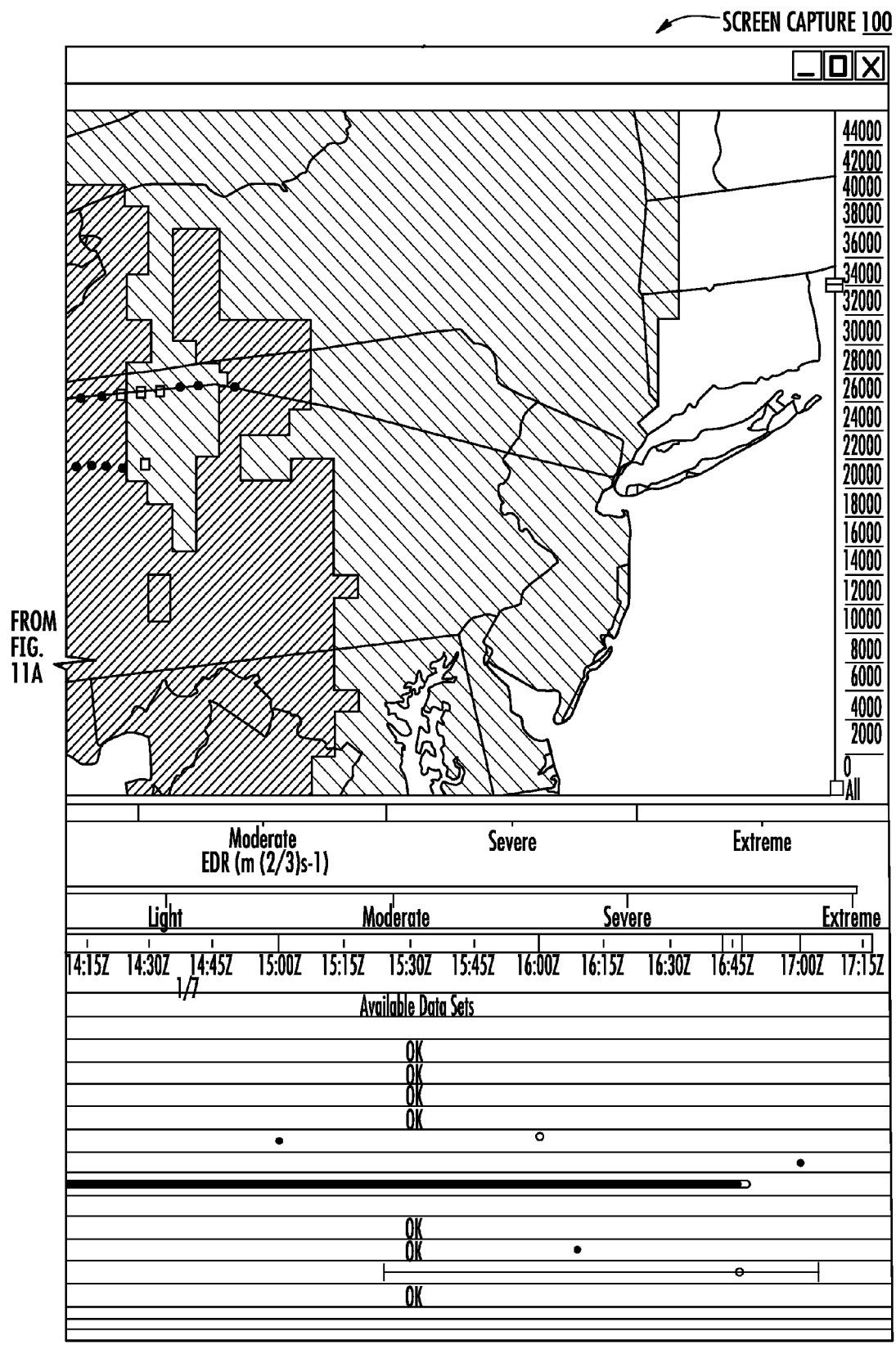
Figure 12A:
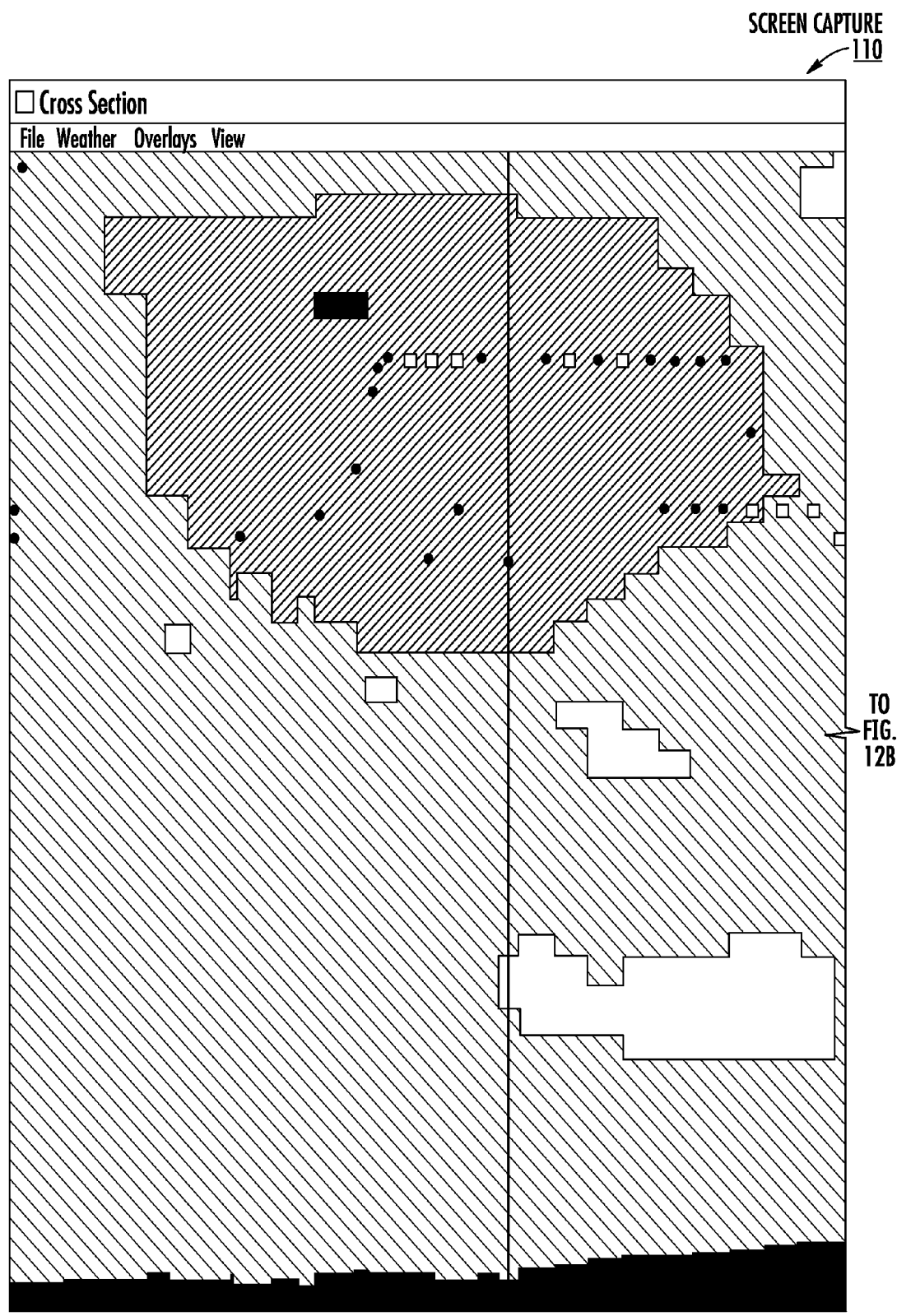
Figure 12B:
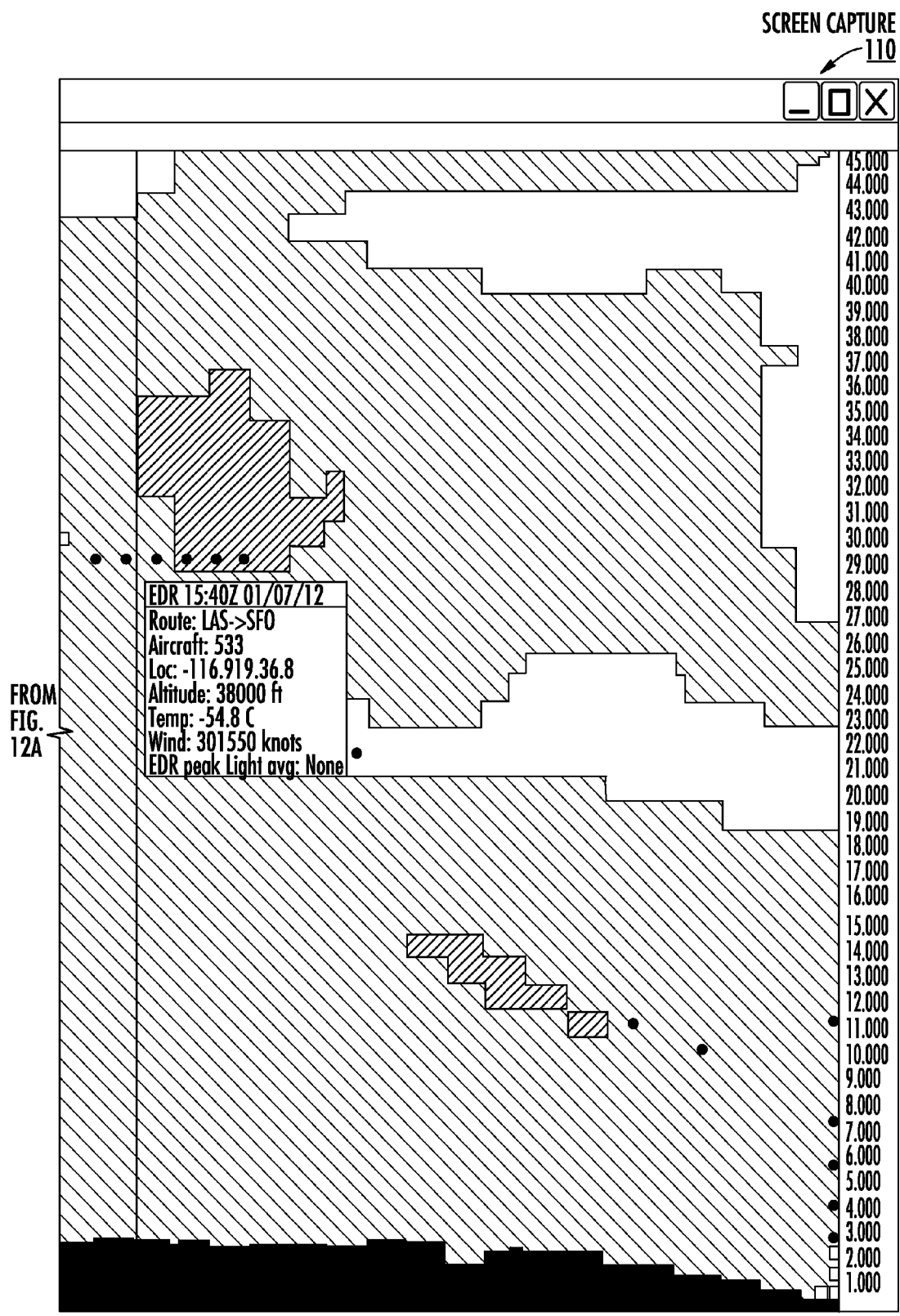

FIGS. 11 and 12 are screen captures 110 and 110 similar to those of FIGS. 9 and 10.

FIG. 13 is a screen shot of a chart of inspect values. The dotted lines, circle and added text describe an inventive concept described herein of changing the EDR Peak/Avg readings to ASI values for peak only.

FIG. 14 is an Atmospheric State Index according to the present invention.

Figure 15A:
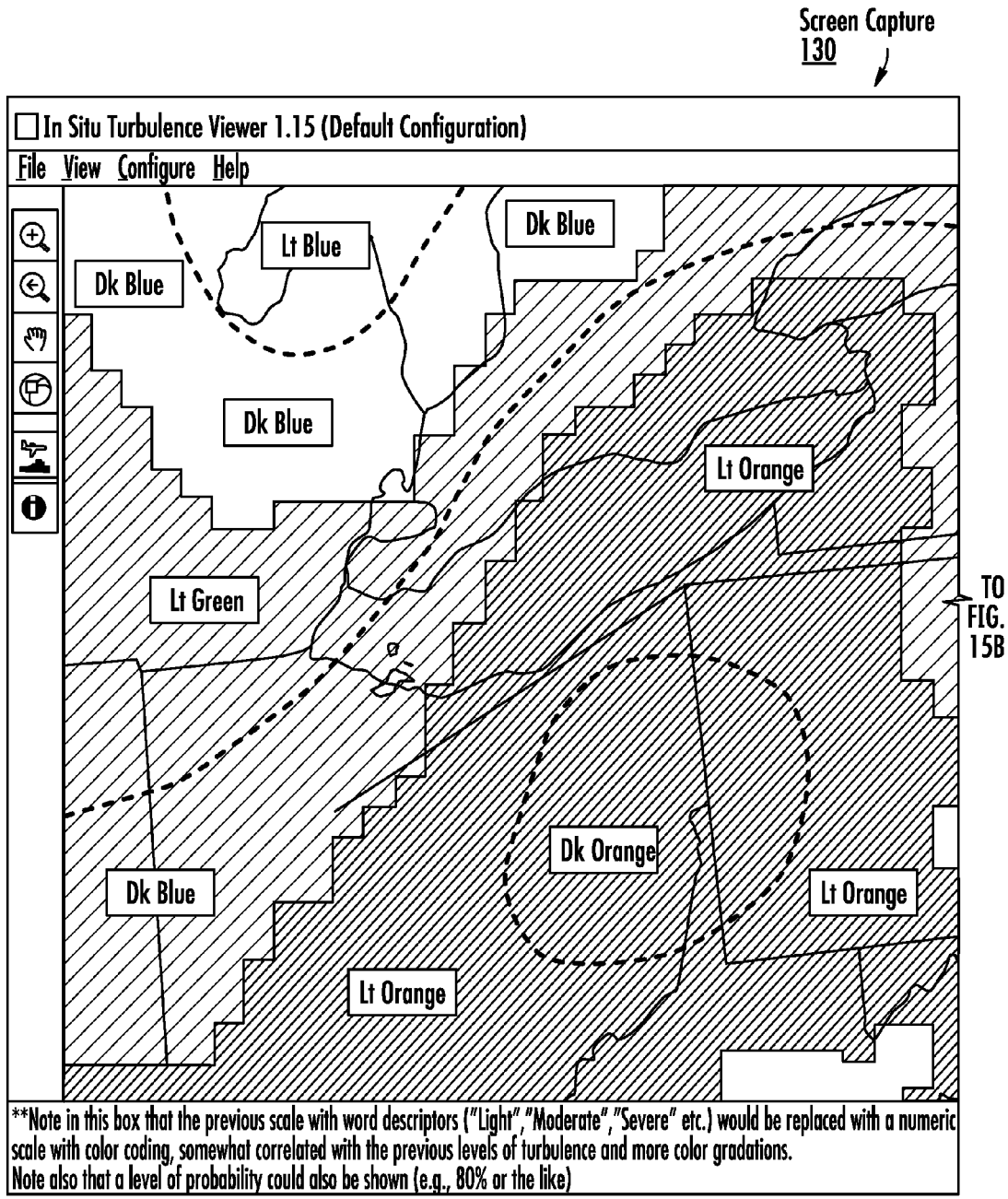
Figure 15B:
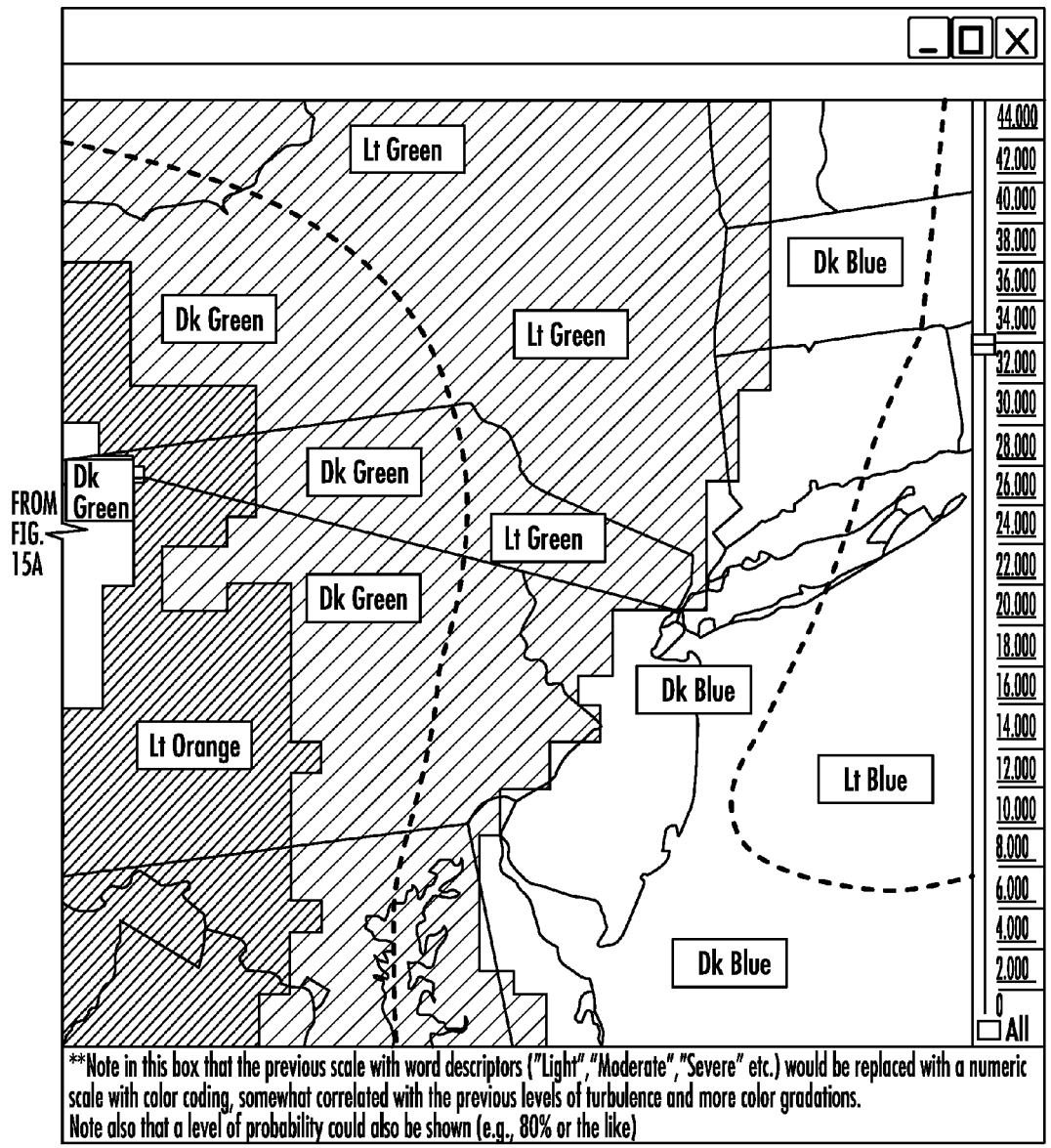

FIG. 15 shows some changes the inventor contemplates making to some of the screen displays shown above, in this case changes to FIG. 11.

Figure 16A:
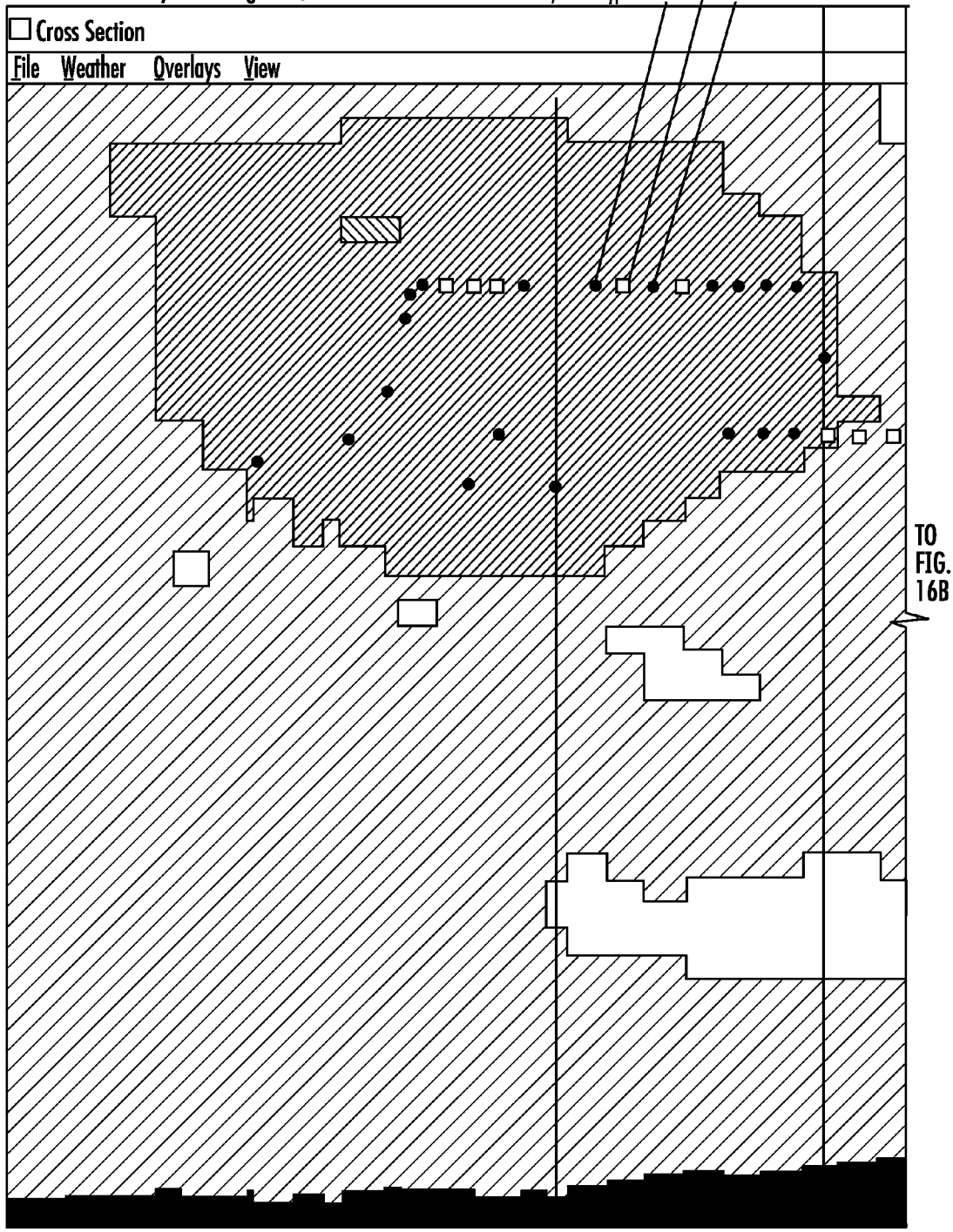
Figure 16B:
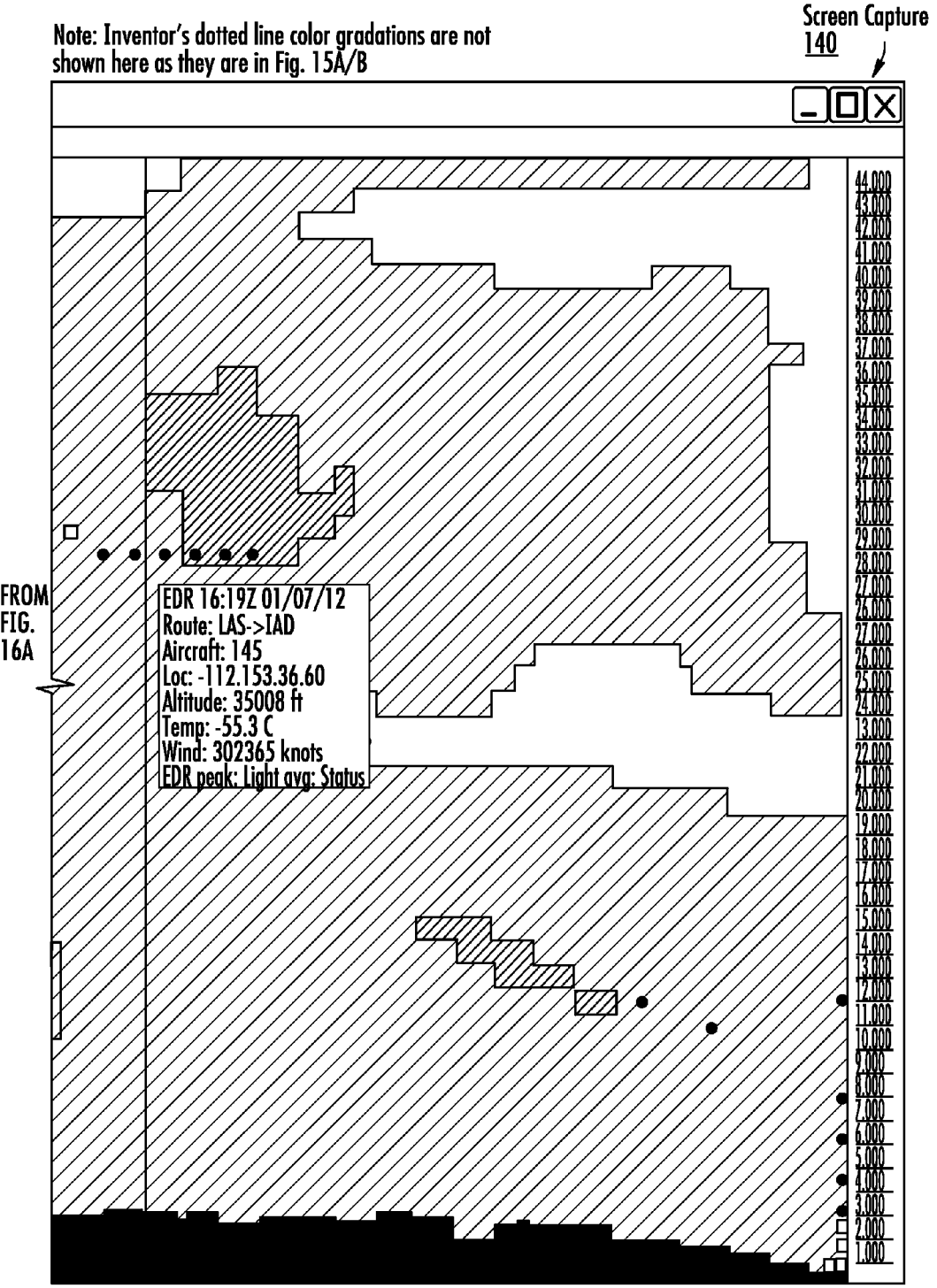

FIG. 16 shows some changes the inventor contemplates making to some of the screen displays shown above, in this case changes to FIG. 12.

FIG. 17 is an alternate, more graphical display of the index of FIG. 14, and uses color coding (in the case of the black and white drawing requirements, the color cannot shown but is noted in the boxes of varying shades of gray).

FIG. 18 is an illustration of use of the Atmospheric State Index according to the present invention to grade visibility (as an example).

FIG. 19 is an illustration of use of the Atmospheric State Index according to the present invention to grade ceiling (as an example).

FIG. 20 is an illustration of use of the Atmospheric State Index according to the present invention to grade icing (as an example).

FIG. 21 is an illustration of use of the Atmospheric State Index according to the present invention to grade lightning (as an example).

FIG. 22 is an illustration of use of the Atmospheric State Index according to the present invention to grade volcanic ash (as an example).

FIG. 23 is an illustration of use of the Atmospheric State Index according to the present invention to grade ground crosswind (as an example).

Figure 24:
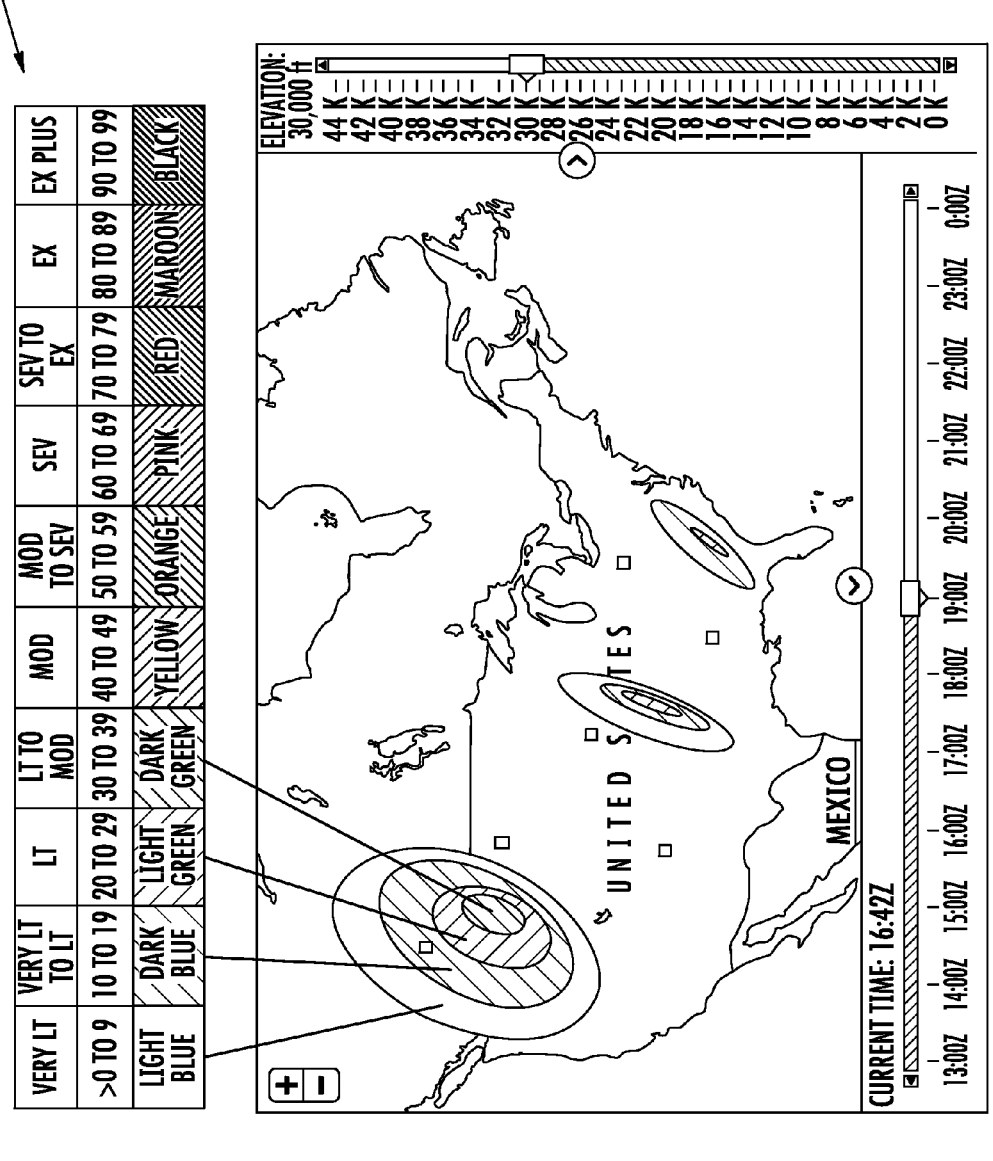

FIG. 24 is a screen capture 200 of an exemplary graphical display (such as might be viewed on a computer screen 190 capable of showing such displays) of multiple actual turbulence reports (the small squares), as well as a turbulence forecast at 30000 feet (the oval-shapes) using the Atmospheric State Index according to various embodiments of the present invention.

Figure 25:
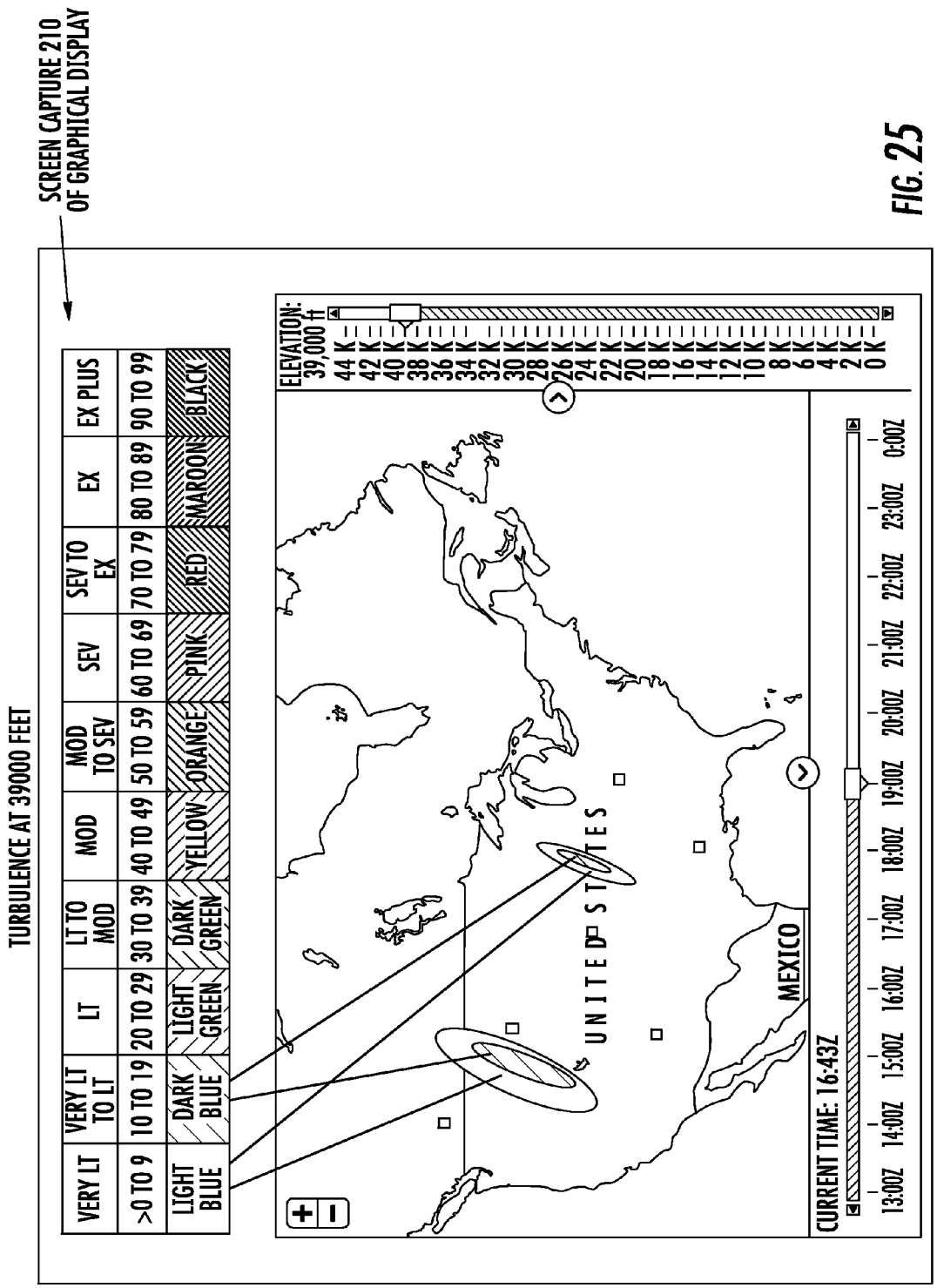

FIG. 25 is a screen capture 210 of an exemplary graphical display (such as might be viewed on a computer screen) of turbulence similar to FIG. 24 using the Atmospheric State Index according to the present invention, except at 39000 feet instead of 30000 feet. Note that this screen capture does not show percentages, as would be the case in a deterministic approach to forecasting. This is to compare with a display that includes percentages such as FIG. 27, which is based on probabilistic forecasting.

Figure 26:
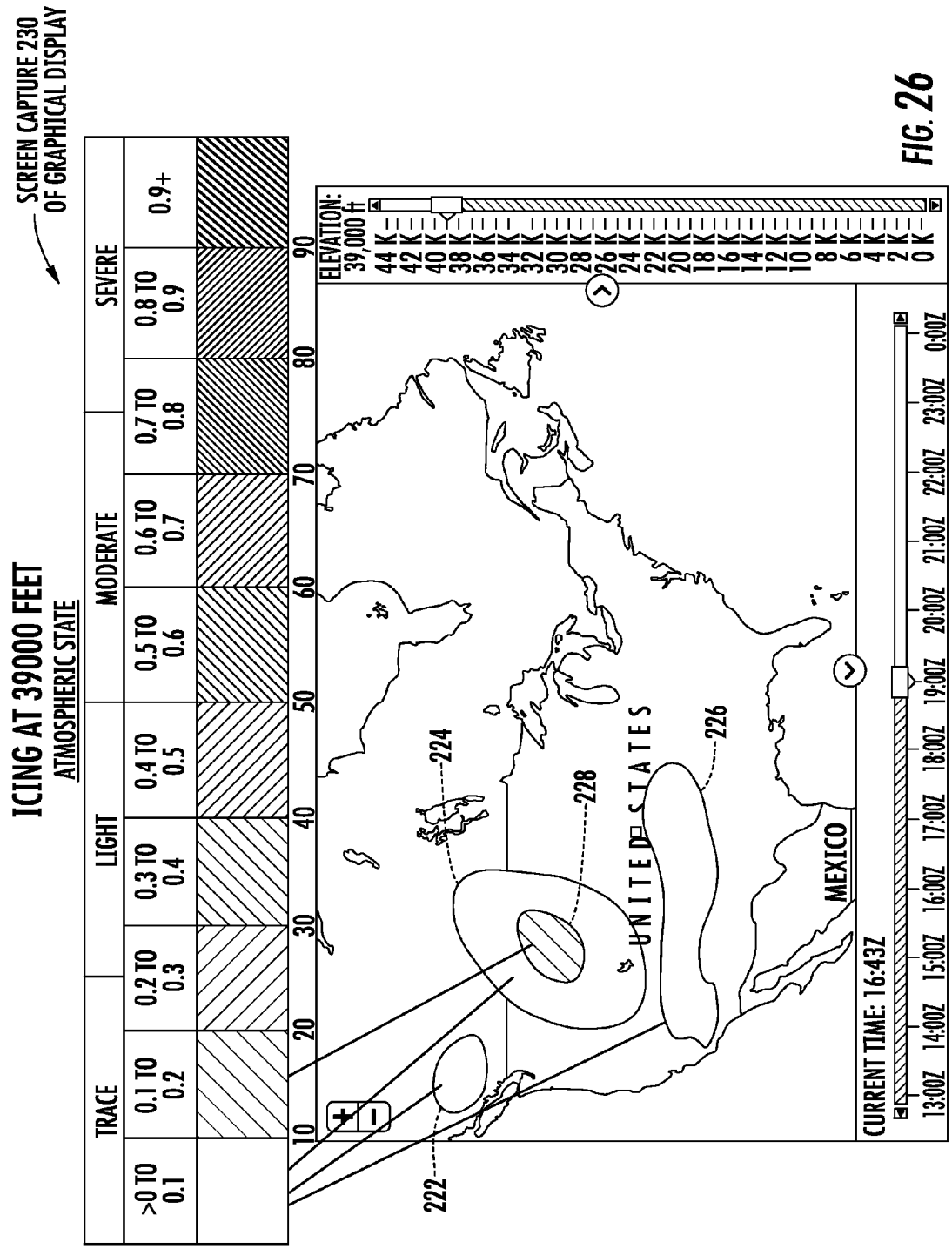

FIG. 26 is a screen capture 220 of an exemplary graphical display (such as might be viewed on a computer screen) of icing at 39000 feet using the Atmospheric State Index according to the present invention. At may be seen, this does not show percentages as does FIG. 27, as this is based on deterministic forecasting vs. the probabilistic forecasting use in FIG. 27.

Figure 27:
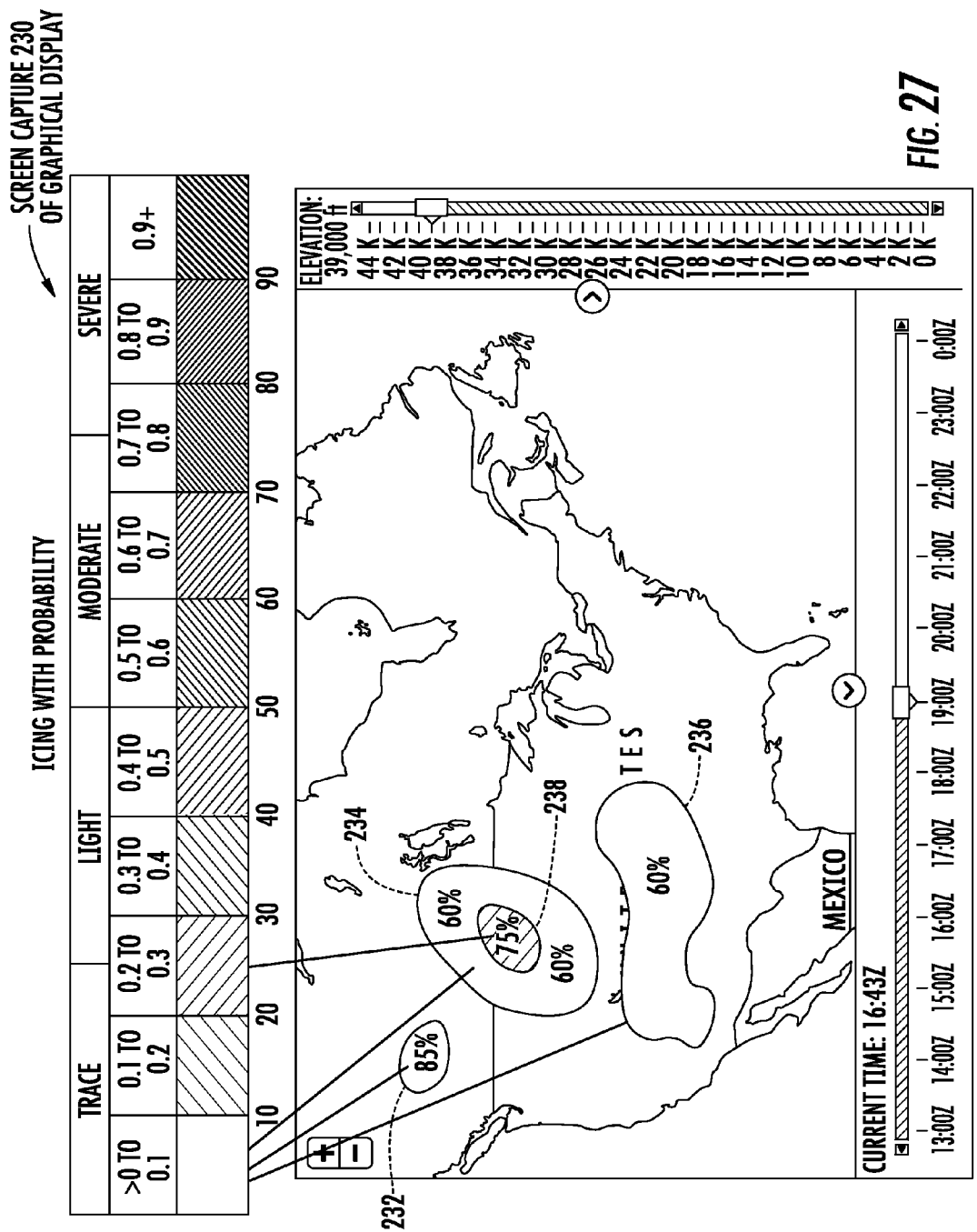

FIG. 27 is a screen capture 230 of an exemplary graphical display (such as might be viewed on a computer screen) of icing at a certain altitude using the Atmospheric State Index according to various embodiments of the present invention.

Figure 28:
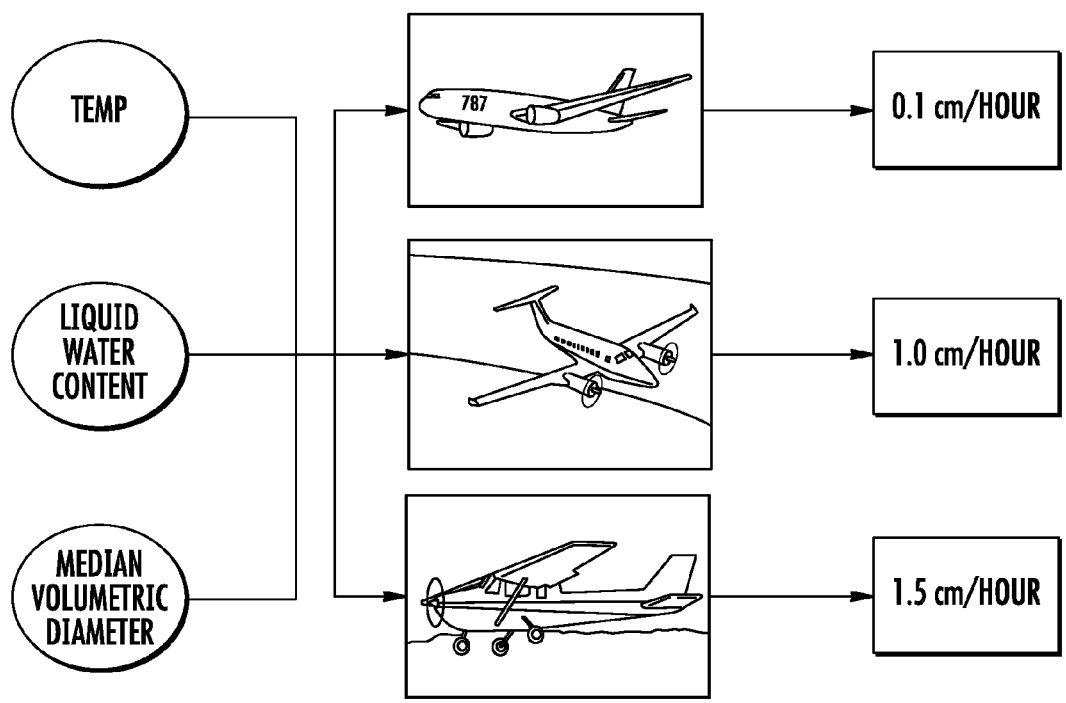

FIG. 28 shows how difference airplanes can have difference icing characteristics for a given ASI value, so this will result in a need for different TTPs associated with different aircraft.

Figure 29:
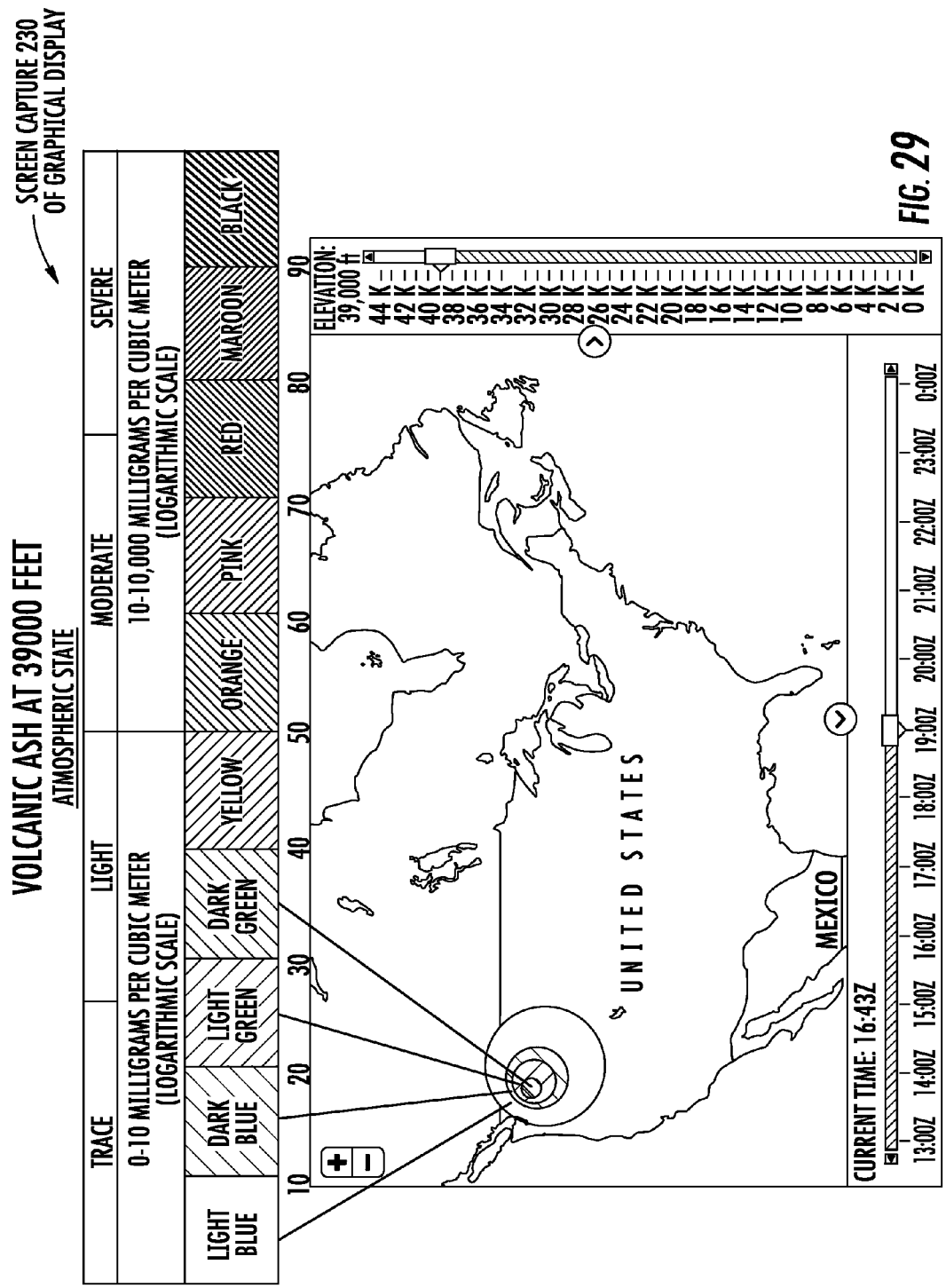

FIG. 29 is a screen capture 240 of an exemplary graphical display (such as might be viewed on a computer screen) of volcanic ash at a certain altitude using the Atmospheric State Index according to various embodiments of the present invention.

Figure 30:
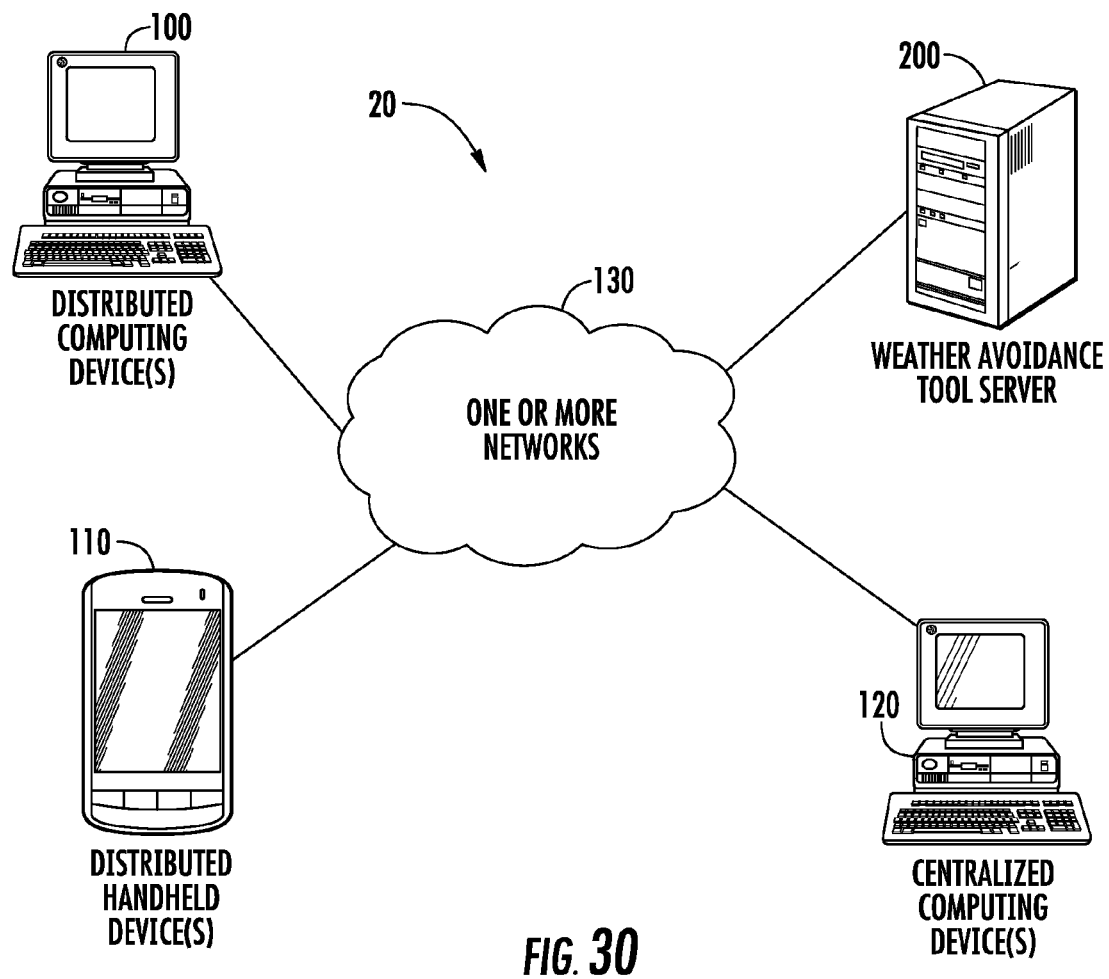

FIG. 30 is a block diagram of a weather avoidance tool system 20 according to various embodiments.

Figure 31:
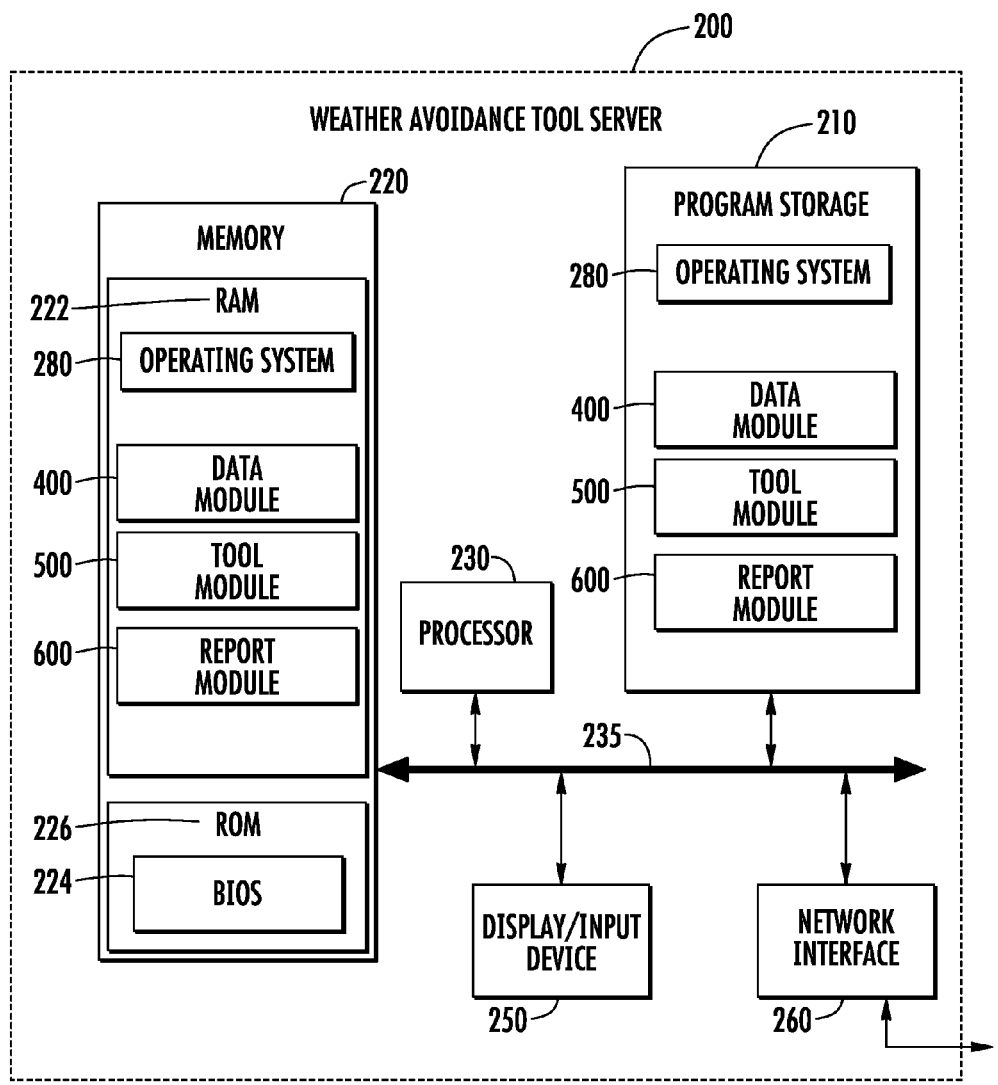

FIG. 31 is a schematic block diagram of a weather avoidance server 200 according to various embodiments.

DETAILED DESCRIPTION OF VARIOUS EMBODIMENTS

Various embodiments of the present invention will now be described more fully hereinafter with reference to the accompanying drawings, in which some, but not all embodiments of the invention are shown. Indeed, embodiments of the invention may be embodied in many different forms and should not be construed as limited to the embodiments set forth herein. Rather, these embodiments are provided so that this disclosure will satisfy applicable legal requirements. Unless otherwise defined, all technical and scientific terms used herein have the same meaning as commonly known and understood by one of ordinary skill in the art to which the invention relates. The term "or" is used herein in both the alternative and conjunctive sense, unless otherwise indicated. Like numbers refer to like elements throughout.

When the term "invention" is used, it is not necessarily used to identify a single isolated concept, but could in fact be identifying a plurality of concepts, and should not in any way be construed as limiting the available coverage afforded any patent issuing from this application to a single concept. Said another way, when the phrase "the invention" is used, it should be understood that this could include a multiple set of inventions, each of which could be separately and independently patented or otherwise protected.

Outline
A. Accumulation of Live Report Data
  1) Generally What It Is
  2) Specific Types
    a) Subjective Personal Observations
    b) Sensor based Data
      i) From Vehicle (wind temp turbulence)
      ii) Other (Weather station, Satellite)
B. Accumulation of Forecast Data
  1) Generally What Forecast Data Is; Deterministic vs. Probabilistic Forecasting
  2) Specific Types of Forecast Data
    Winds, surface and aloft
    turbulence (eg GTG2)
    icing
    visibility
    ceiling
    lightning
    volcanic ash
C. Current Displays of Forecast and Live Report Data
  1) Textual Output
  2) Graphic Output
D. Challenges of Current Reporting Protocols
E. Use of Accumulated Data to Assign Travel Space with Common Atmospheric State Index ("ASI")
  1) Establish a Common Scale for Data
  2) Fit Data to That Scale
    turbulence (eg GTG2)
    icing
    visibility
    ceiling
    lightning
    volcanic ash
  3) ASI with Probability Value Associated Therewith
  4) New Reporting Protocols
F. Establish Travel Tolerance Parameters (TTPs)
  1) Operator
  2) Machine
G. Use ASI and TTP data to Display Common Look and Feel While Viewing Different Hazards
  [discuss displays, including probability related]
H. Use ASI and TTP data in Computer Exchange
I. Adaptive Measures to Transition from Current State of Art
J. Apparatuses, Methods, Systems, and Computer Program Products Element List 10 FIG. 2 screen capture
  12 lighter gray
  14 darker gray
20 FIG. 3 screen capture
30 FIG. 4 screen capture
40 Inspect Values Chart
50 FIG. 6 screen capture
60 FIG. 7 screen capture
70 FIG. 8 screen capture
80 FIG. 9 screen capture
90 FIG. 10 screen capture
100 FIG. 11 screen capture
110 FIG. 12 screen capture
120 FIG. 13 screen capture
130 FIG. 15 screen capture
140 FIG. 16 screen capture
200 FIG. 24 screen capture
210 FIG. 25 screen capture
220 FIG. 26 screen capture
230 FIG. 27 screen capture
240 FIG. 29 screen capture Overview According to various embodiments, the invention addresses the foregoing shortcomings in the art by providing a method of and system for providing end users with the information and tools they need to make more informed and intelligent decisions when dealing with travel weather hazards. These end users can include travelers as well as those assisting in said travels. In the instance of air flight, these end users can include pilots, airlines, and governmental agencies which monitor same.

According to various embodiments, the invention includes the recognition of a need for an "atmospheric state" and related Atmospheric State Index (ASI), as opposed to multiple indexes at least some of which are bases on vehicle response.

In the case of aviation as an example, such a process enhances the user's awareness by providing a standardized aviation turbulence index and operational responses for all regions of the world, thus improving safety, capacity and efficiency/emissions. This is one step in solving a larger problem in aviation weather, by differentiating between sources of a hazard and the actual operational hazard.

Various embodiments of this inventive system standardize the level of actual turbulence regardless of source. It is designed for future growth to be used in the broader definitions of weather hazards which would replace the current state of the art. An example is the prior process of describing thunderstorm coverage rather than the actual hazards of the phenomenon which could be turbulence, lightning or icing.

In one aspect, various embodiments of the invention will provide an Atmospheric State Index (ASI) will allow all the users to work with a standardized method that describes a metric for turbulence as a state of the atmosphere, as well as similar metrics for other weather hazards such as icing or lightning. This index can include a simplified numbering system with color gradations.

An analogy to this approach would be the use of "sea state". If twenty foot waves are reported, an aircraft carrier commander from experience and training would expect a certain vehicle response, possibly having the deck pitching plus or minus 10 degrees, while a 20 foot pleasure boat driver might expect to pitch up to 90 degrees.

According to various embodiments, the inventive system also provides a color coded forecast similar to the reporting system discussed previously using more gradations than the present systems. This system will make the correlation between the forecast and objective aircraft reports easier to interpret for the users in their decision making processes.

According to various embodiments, the inventive system also provides a "toggle-ready" display protocol which will allow the user to "toggle" through different screens, with each screen displaying a certain hazard, but all screens having a "common look and feel" which will allow the user to more easily toggle through various screens and accumulate information.

According to various embodiments, the inventive system also relates to defining the hazard in seven (7) "dimensions", "fields", or "parameters":

Hazard type (eg turbulence, icing, wind)
  Location (three spacial dimensions)
  Severity (the ASI numerical value from 1-100)
  Probability, if a forecast (could be 100% if a report)
  Time Other details of the invention disclosed herein are set forth below.

Figure 1:
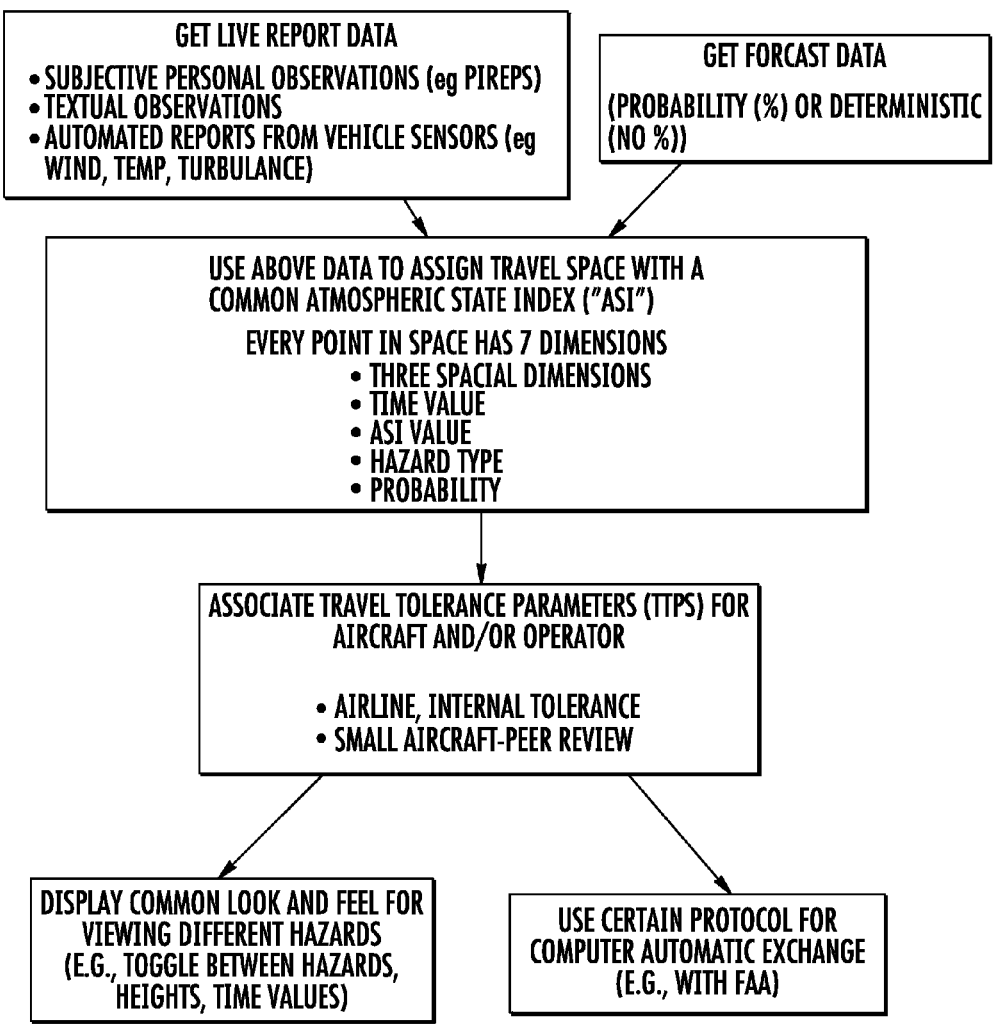

Reference is first made to FIG. 1, which is a flowchart illustrating one process under one aspect of one of the inventions described herein. As may be seen, live report data and forecast data is accumulated. This data is then used to assign the potential travel space with a common Atmospheric State Index (ASI), such that the data associated with the travel space is associated with seven data fields or "dimensions"; the three traditional spacial dimensions (x, y, z, or lat long alt, or GPS coordinates, or the like), time, ASI value (discussed later), hazard type, and probability. Once this common index is in place, travel tolerance parameters (TTPs) established for association with the aircraft and/or the operator, are associated with the data. A combination of the ASI and TTP data can then be used for display and/or computer exchange.

These steps will now be discussed in more detail.

A. Accumulation of Live Report Data

1) Generally

Once type of data that is accumulated is live report data, in other words data that is actually recorded in real time. This is to be contrasted with the accumulation of forecast data, which is discussed elsewhere.

2) Specific Types a) Subjective Personal Observations

Subjective personal observations may be defined as any report given by an individual that is based on his personal observation with a description perceived to approximate the definitions of a particular hazard which is by explanation subjective.

The following are typical types of live report data provided by subjective personal observations:

PIREPS (Pilot REPortS) for icing, turbulence, visibility, and ceiling, in the case of nautical travel, also sea state estimates.

One type of live reporting includes pilot reports (aka PIREPs). A pilot report or PREP is a report of actual weather conditions encountered by an aircraft in flight. This information is usually relayed by radio to the nearest ground station. The message is then typically encoded and relayed to other weather offices and air traffic service units.

As a point of interest, in an area of concern created by lack of real time atmospheric state metrics, forecast models (discussed elsewhere) have used PIREPS which as discussed can be inaccurate in intensity, time and location because of the lack of a true objective measure that is timely and accurate. This was the case in earlier versions of GTG (mentioned below in more detail), although GTG now uses EDR data, a more objective and accurate metric discussed below.

b) Sensor based Data

Sensor based data can include data obtained from vehicle mounted sensors, or could be data obtained by stationary sensors such as found at weather stations, or by other means such as via sensors in satellites. The data could be taken manually or via automation. The following are typical types of sensor based data:

EDR
  LIDAR
  Wind speed (at ground and airborne)
  Wind direction
  Infrared & visible sensors on satellites
  Runway Visual Range sensors
  Temp
  Humidity (via satellite)
  Cloud tops (via satellite)
  Anemometers in the case of ships and land based travel EDR (Eddy Dissipation Rate) sensors are one type of sensors mounting on vehicles, in this case airplanes. Eddy Dissipation Rate, or EDR, consists of an algorithm that processes multiple inputs from existing airplane sensors run by software that reports automatically via the Aircraft Communications Addressing and Reporting System (ACARS) data link installed on nearly all modern airliners. Reports are made both routinely for system monitoring purposes and whenever a minimum level of turbulence is exceeded. This metric has been accepted by the International Civil Aviation Organization (ICAO) as the international standard for aviation turbulence. The first version of the EDR algorithm was loaded on airplanes at United Airlines, and all 99 of United's Boeing 757s continue to send EDR reports. In 2008, a more sophisticated version of the algorithm was installed on all 83 Boeing 737NGs at Delta Air Lines. It is hoped that other airlines will be reporting EDR within the next year as well.

All EDR data has been made available via the EDR/GTG Viewer (shown later), an experimental version of the FAA's Aviation Digital Data Services (ADDS) webpage maintained by NCAR. As a means to incent EDR equipage at other carriers, access to the viewer has so far been restricted only to users at carriers reporting EDR.

Satellite pictures taken in visible light are the easiest to understand on a basic level, as it is what we are familiar with in our everyday experience. Reflection of light from clouds or other objects and surfaces reflects back to our eyes or a camera. The reflection of light makes the object visible. Exceptions would be self-luminous objects, such as the sun or a light bulb, which do not depend on reflected light.

But visible light is only one type of electromagnetic radiation. The infrared region of the spectrum is where objects and gases of "normal" temperatures usually radiate most strongly. Sensors aboard the satellites provide images in this and other portions of the electromagnetic spectrum, as well. The thermal or infrared images recorded by sensors called scanning radiometers enable a trained analyst to determine cloud heights and types, to calculate land and surface water temperatures, and to locate ocean surface features. Infrared satellite imagery can be used effectively for tropical cyclones with a visible eye pattern, using the Dvorak technique, where the difference between the temperature of the warm eye and the surrounding cold cloud tops can be used to determine its intensity (colder cloud tops generally indicate a more intense storm). [6] Infrared pictures depict ocean eddies or vortices and map currents such as the Gulf Stream which are valuable to the shipping industry. Fishermen and farmers are interested in knowing land and water temperatures to protect their crops against frost or increase their catch from the sea. Even El Niño phenomena can be spotted. Using color-digitized techniques, the gray shaded thermal images can be converted to color for easier identification of desired information.

B. Accumulation of Forecast Data

1) Generally What Forecast Data is; Deterministic Vs. Probabilistic Forecasting

Generally speaking, weather forecast data includes the same type of data accumulated above by personal observations and sensor reading, except that estimates are made as to what will happen in the future. Two common types of forecasting include deterministic and probabilistic forecasting.

A perfect deterministic forecast can only be as good as (a) the meteorologist's skills in interpreting; (b) the degree to which we understand the forecast models and how good these models are at estimating things; (c) the degree to which the original observations are accurate. If it is actually a deterministic model, it has no probability associated with it.

Probabilistic forecasting is a technique for weather forecasting that relies on different methods to establish an event occurrence/magnitude probability. This differs substantially from giving a definite information on the occurrence/magnitude (or not) of the same event, technique used in deterministic forecasting.

Both techniques try to predict events but information on the uncertainty of the prediction is only present in the probabilistic forecast.

2) Specific Types of Forecast Data

Forecast data is compiled for at least the following hazards:
turbulence (eg GTG2)
icing
visibility
ceiling
lightning
volcanic ash The turbulence forecast tool currently provided by the National Weather Service as GTG2 is nominally tied to an aircraft response for a Boeing 757 type aircraft to correlate to the definitions of turbulence in the AIM (Airman's Information Manual). While this may be helpful, it also has a downside in that conversions are required to determine the manner in which an aircraft other than the 757 would react to such turbulence. A smaller plane would react more violently, whereas a larger plane might not.

Graphical Turbulence Guidance (GTG)

One of the earlier turbulence forecasting models with a feedback loop using objective aircraft reports (e.g. EDR) is Graphical Turbulence Guidance (GTG), which is an automatically-generated turbulence product that predicts the location and intensity of turbulence over the continental United States (CONUS). The GTG was developed by the NCAR Turbulence Product Development Team, sponsored by the Federal Aviation Administration's Aviation Weather Research Program, and implemented by the National Weather Service Aviation Weather Center as a supplement to turbulence AIRMETs and SIGMETs.

Over the last several years the FAA has funded NCAR and others to develop a turbulence nowcast and forecast system for mid- and upper-level turbulence over the continental U.S. The forecast system, named GTG for "Graphical Turbulence Guidance," provides contours of turbulence potential based on RUC (Rapid Update Cycle) model forecasts out to 12 hours lead time. The system was updated in February 2010 and is part of the NCEP operational suite.

The GTG procedure uses numerical weather prediction model forecasts to compute a number of turbulence diagnostics which are then weighted and combined. The relative weights for the combination are dynamically optimized for best agreement with the most recent available turbulence observations (in situ EDR data and pilot reports). This procedure allows the algorithm to minimize forecast errors due to uncertainties in individual diagnostic performance and thresholds. Intense statistical verification exercises have been performed in which probabilities of yes and no detections were determined by comparing turbulence forecasts to PIREPs. These statistics have made it possible to compare performance of the individual diagnostics, as well as test various diagnostic thresholding and weighting strategies. The overall forecast performance using the weighted diagnostics provides superior skill to the use of individual diagnostics.

The GTG is a constantly evolving product, with specific mountain wave turbulence and convectively-induced turbulence diagnostics (DCIT) and probabilistic forecasts as well as a global forecast product currently under development. GTG2 is RUC-based, but was planned for transition to use the WRF Rapid Refresh (WRFRR) model sometime in the last quarter of CY10.

Turbulence is an example of how technology has allowed the weather groups to developed more defined states of the atmosphere in a numerical model and more objective numeric reports. Other meteorological phenomena such as icing and volcanic ash are continually developing new sensors, algorithms, and techniques to provide a better definition of the atmosphere which will allow this approach to be better utilized as the products evolve.

C. Current Displays of Forecast and Live Report Data

1) Textual Outputs

One type of data is textual-only data, being in the form of text. This type of data includes METAR, AIRMET, SIGMET, and others. These reporting protocols attempt to provide forcast and live reporting data through the use of text only.

2) Graphic Outputs

There are many different types of graphic outputs for forecast and live report data. These include:
GTG Turbulence (by NWS)
Icing (by NWS)
Convection
Winds
Temperature
Some of these will be discussed by example.

The EDR/GTG Viewer

Figure 2A:
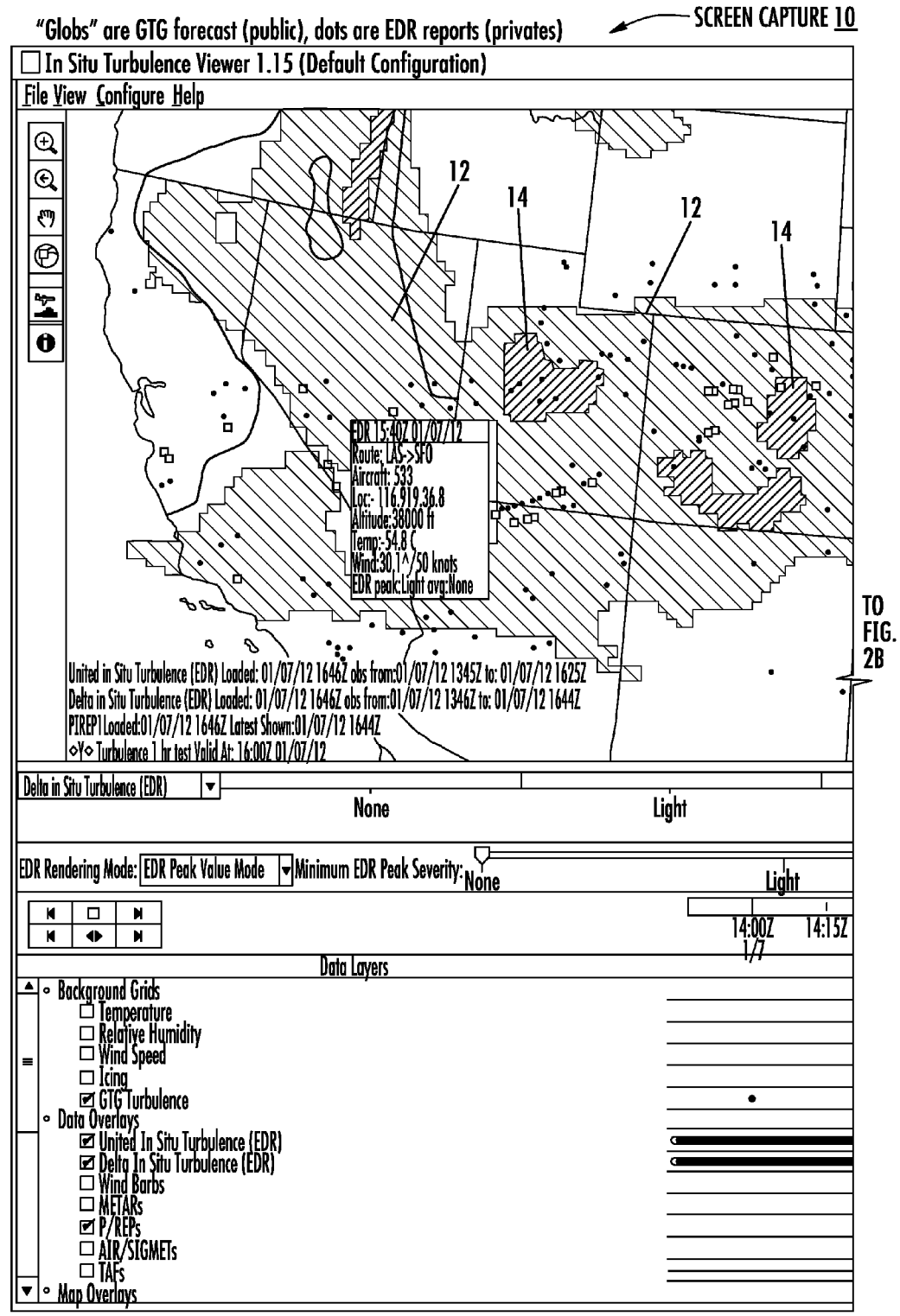
Figure 2B:
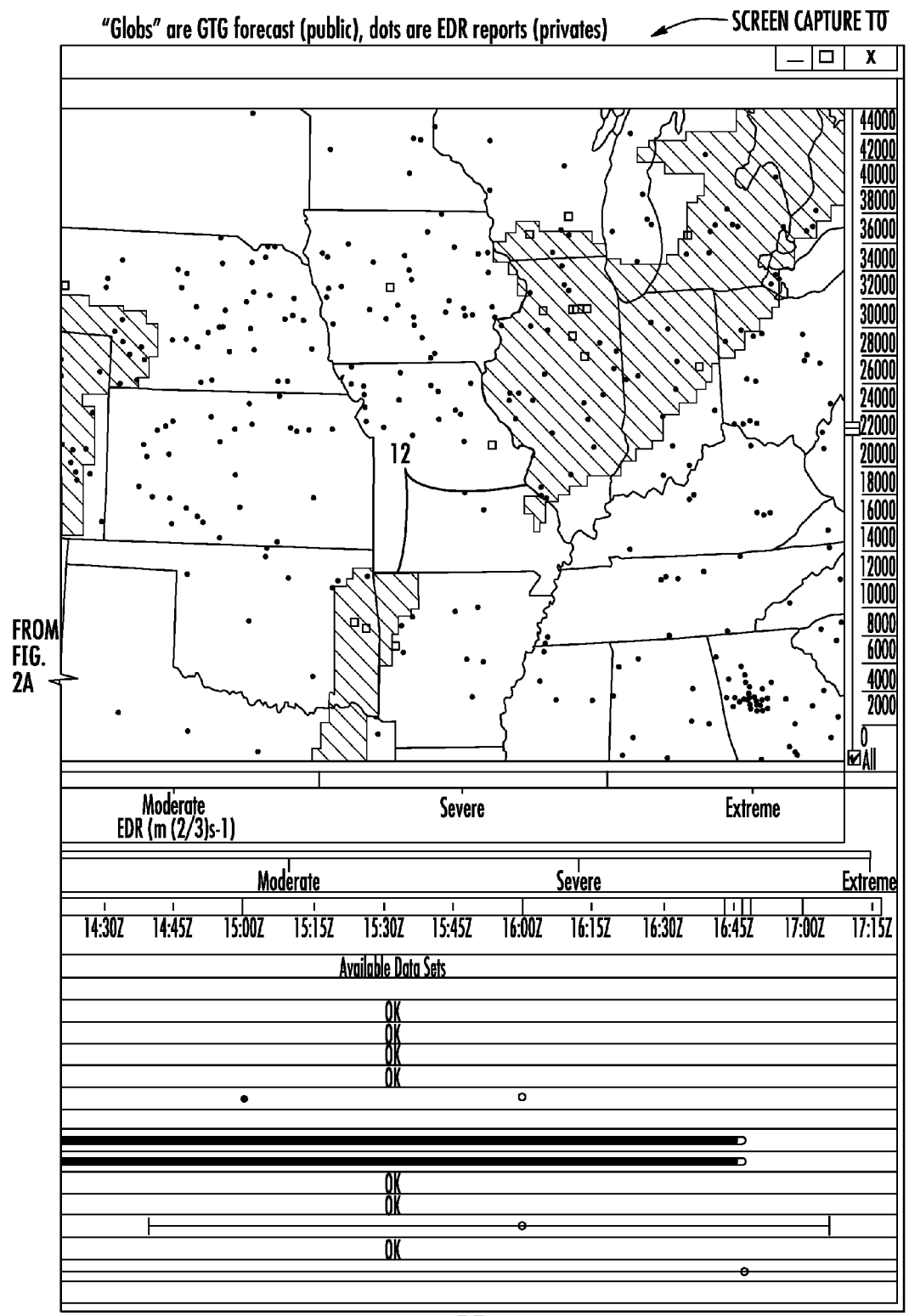

One type of graphic outputs for forecast and live report data is the EDR/GTG Viewer such as shown in screen capture 10 in FIG. 2. This features a newer generation version of Graphical Turbulence Guidance (GTG), a forecast product developed by NCAR that relies on EDR as an important input along with PIREPS. The meteorological community feels strongly that EDR strengthens this model significantly over models with only PIREPS. GTG is available alongside EDR on the viewer, and the two complement one another in the decision making process.

Unfortunately, the GTG forecast model presents the turbulence forecast in the older paradigm as an aircraft response based on a Boeing 757 and the EDR reports represents a state of the atmosphere independent of the aircraft it is associated with. This methodology creates confusion.

PIREPS, which are based on the response of the particular aircraft involved, have been used since the Wright Brothers with few refinements. This leaves the pilot with a conversion of PIREPs based on aircraft response from the reporting aircraft to an aircraft response for the receiving aircraft using the following guidance from the FAA's Aeronautical Information Manual (AIM) (aka as "FAA'S AIM document") below:

FIG. 2 is a screen capture of a Web site on the current FAA ADDS site showing, among other data, a combined version of GTG turbulence forecast with EDR reports superimposed on the forecast. See http://aviationweather.gov/adds/turbulence/turbnav as well as http://aviationweather.gov/ generally. This is available on a secure site for participating users.

In this figure, two major data sets are presented: a three dimensional turbulence forecast grid generated from Graphical Turbulence Guidance (GTG), data, shown with colored areas (in practice green and orange, but in the black and white figures of the application showing as lighter gray at 12 and darker grey at 14) based on the altitude selected on the far right side (22,000 in this case). These colored areas change as the altitude slider is moved up and down to show the three dimensional grid.

The second set of data shown in FIG. 2 (overlaid over the forecast grid) in presented in the form of aircraft reports (EDR) as small colored squares for all altitudes which are giving an atmospheric state measured by aircraft sensors, which essentially use an algorithm to correlate certain aircraft movements like pitch and roll to the atmospheric state number called EDR (Eddy Dissipation Rate), a meteorologist term. The algorithms are adjusted by aircraft type to recognize that the same atmosphere would create different aircraft movements in a B747 and a Regional Jet (RJ). This means that theoretically the B747 and the RJ would report the same number for the atmosphere or "sea state" if you will. When ones mouses over the small squares, a box pops up giving you the label "EDR" with other identifying data and the level of EDR in terms of "peak" and "avg" where peak is the highest value and the average during the one minute sample. The blue squares represent what is considered Null turbulence or less than Light.

| Intensity | Aircraft Reaction | Reaction Inside Aircraft |
| --- | --- | --- |
| Light | Turbulence that momentarily causes slight, erratic changes in altitude and/or attitude (pitch, roll, yaw). Report as Light Turbulence;[1] or Turbulence that causes slight, rapid and somewhat rhythmic bumpiness without appreciable changes in altitude or attitude. Report as Light Chop. | Occupants may feel a slight strain against seat belts or shoulder straps. Unsecured objects may be displaced slightly. Food service may be conducted and little or no difficulty is encountered in walking. |
| Moderate | Turbulence that is similar to Light Turbulence but of greater intensity. Changes in altitude and/or altitude occur but the aircraft remains in positive control at all times. It usually causes variations in indicated airspeed. Report as Moderate Turbulence;[1] or Turbulence that is similar to Light Chop but of greater intensity. It causes rapid bumps or jolts without appreciable changes in aircraft altitude or attitude. Report as Moderate Chop.[1] | Occupants feel definite strains against seat belts or shoulder straps. Unsecured objects are dislodged. Food service and walking are difficult. |
| Severe | Turbulence that causes large, abrupt changes in altitude and/or attitude. It usually causes large variations in indicated airspeed. Aircraft may be momentarily out of control. Report as Severe Turbulence.[1] | Occupants are forced violently against seat belts or shoulder straps. Unsecured objects are tossed about. Food Service and walking are impossible. |
| Extreme | Turbulence in which the aircraft is violently tossed about and is practically impossible to control. It may cause structural damage. Report as Extreme Turbulence.[1] | |

[1]High level turbulence (normally above 15,000 feet ASL) not associated with cumuliform cloudiness, including thunderstorms, should be reported as CAT (clear air turbulence) preceded by the appropriate intensity, or light or moderate chop.

As may be understood, this approach does not provide much fidelity for the crew in evaluating the level of turbulence and lends itself to confusion amongst the various end users, pilots, dispatchers, and controllers since it is reported as an aircraft response and has to be converted to the receiving aircraft type using several parameters such as size, weight, altitude, speed, and aerodynamic characteristics.

In the top frame in FIG. 2, which shows a map of a part of the US, the "blobs" are the GTG turbulence forecast, and the individual "specks" (actually squares if looked at closely) are the EDR reports. Note that if one uses a mouse over technique on any one of these reports (small square) an EDR report will pop up such as is shown in the left portion of the map in this figure. The EDR squares are colored to match the scale under the map showing Null, Light, Moderate, Severe, and Extreme (corresponding to the FAA'S AIM document). Note that the color codes for EDR reports are shown at the bottom of the map as "None" (Blue), Moderate (Orange), Severe (Red) and Extreme (Maroon). The forecast areas that look like globs are the same except white represents "None".

In FIG. 2, colored "globs" representing different levels of turbulence based on the response on a nominal Boeing 757 to the atmospheric state. Since the GTG is a three dimensional grid product, an altitude slider is available on the right side of the screen in FIG. 2. As the user moves the altitude slider, the color "globs" will change based on the turbulence forecast for the selected altitude. The EDR reports are given for a range of altitudes either side of the selected altitude based on setting in the Configuration pull down menu or EDR reports for all altitudes will be shown if the "All" box at the bottom of the altitude slider is checked. The EDR aircraft reports are based on the state of the atmosphere and not based on the aircraft response. The "Minimum EDR Peak Severity" allows the user to filter the severity of the reports shown on the map.

The time scale below the Severity scale shows the current time and the times for the forecast and reports. The "Background Grids" and "Data Overlays" in the lower left allow other selections of weather products and the availability of each Data Set.

Figure 3:
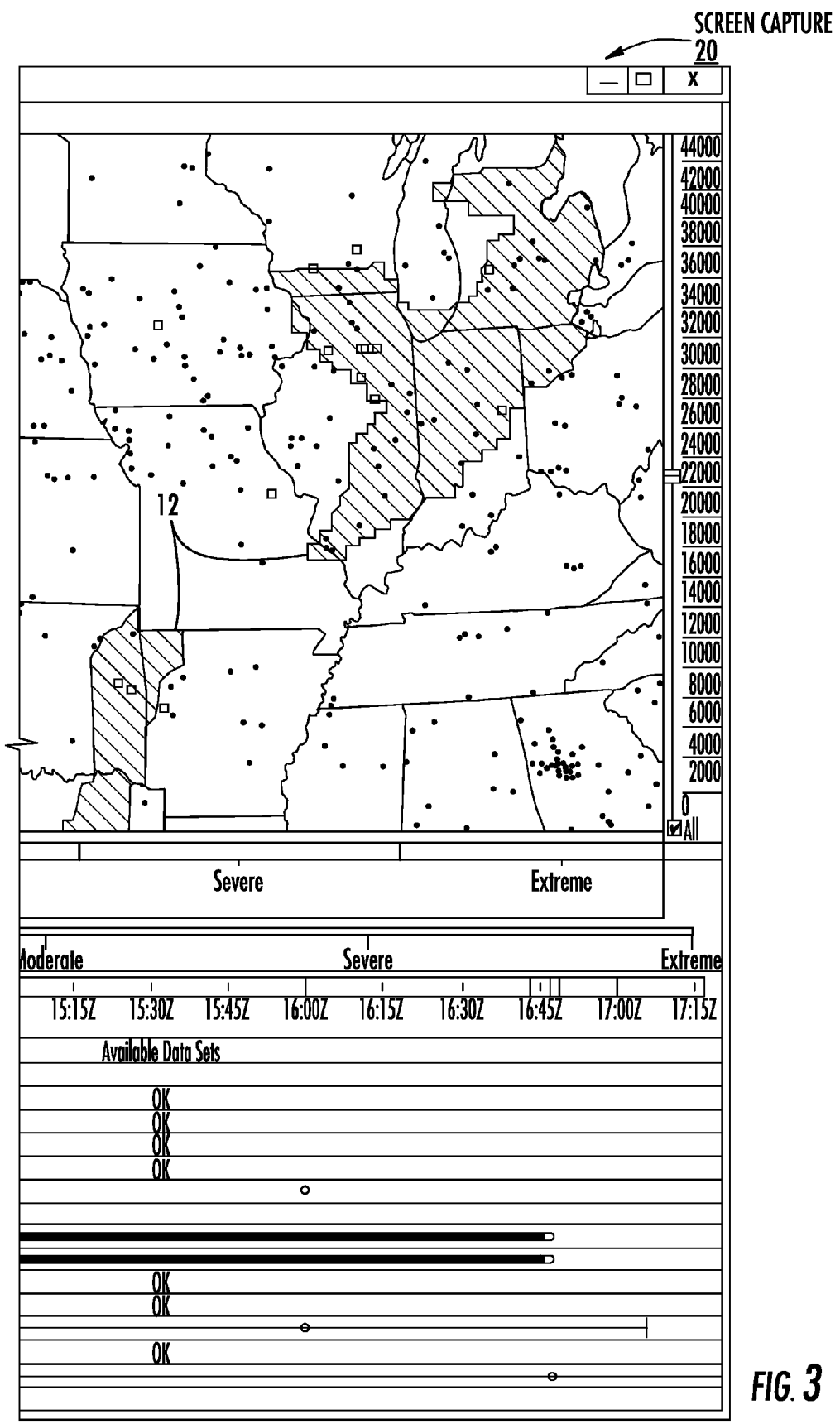
FIG. 3 is a screen capture 20, being a portion of that shown in FIG. 2.

FIG. 3 is a screen capture 20, being a portion of that shown in FIG. 2.

Figure 4:
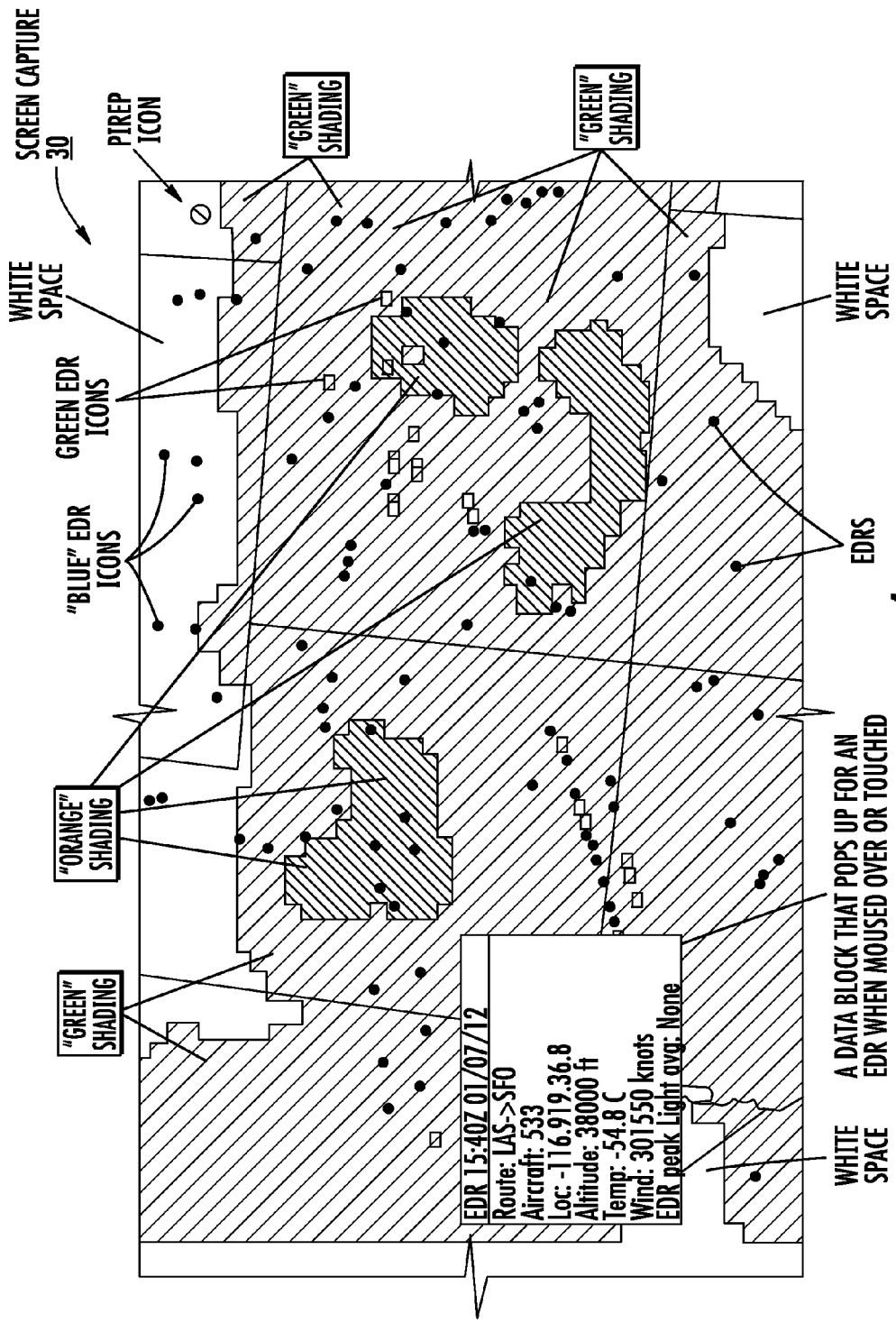
FIG. 4 is another screen capture 30, being a portion of that shown in FIG. 2.

FIG. 4 is another screen capture 30, being a portion of that shown in FIG. 2. This view shows the GTG forecasting sections with white space (no turbulence forecasted), "green" shading (light turbulence forecasted), and "orange" shading (medium turbulence forecasted). The discrete "blue" specks in this view (actually squares if looked at closely) show EDR reports indicating minimal turbulence. The slightly larger squares are EDR reports indicating light turbulence (they are actually green squares, but they have been outlined in black to show up against their green background). Also shown in FIG. 4 is a "pop up" EDR report for one of the blue EDR icons, including the following information:

| EDR Field | Comment |
|---|---|
| EDR 15:40z 01/07/12 | Title of the EDR |
| Route: LAS-SFO | Los Angeles to San Francisco |
| Aircraft: 533 | Under this system this is a tail number, but under one concept of the current invention this would include aircraft type |
| Loc: −116.919, 36.8 | Location |
| Altitude | 38000 ft |
| Temp −54.8 C. | Temperature |
| Wind: 301*/50 knots | Wind Speed |
| EDR peak: Light avg: Non | Under this system this is a peak and an average value over a one minute sample, but under one of the inventor's new concepts the new system would only use a peak value over the one minute sample. |

Note that the last entry above relates to turbulence, and is not aircraft dependent, but is based on the FAA'S AIM document definition of turbulence. As may be seen, this can be confusing.

Figure 5:
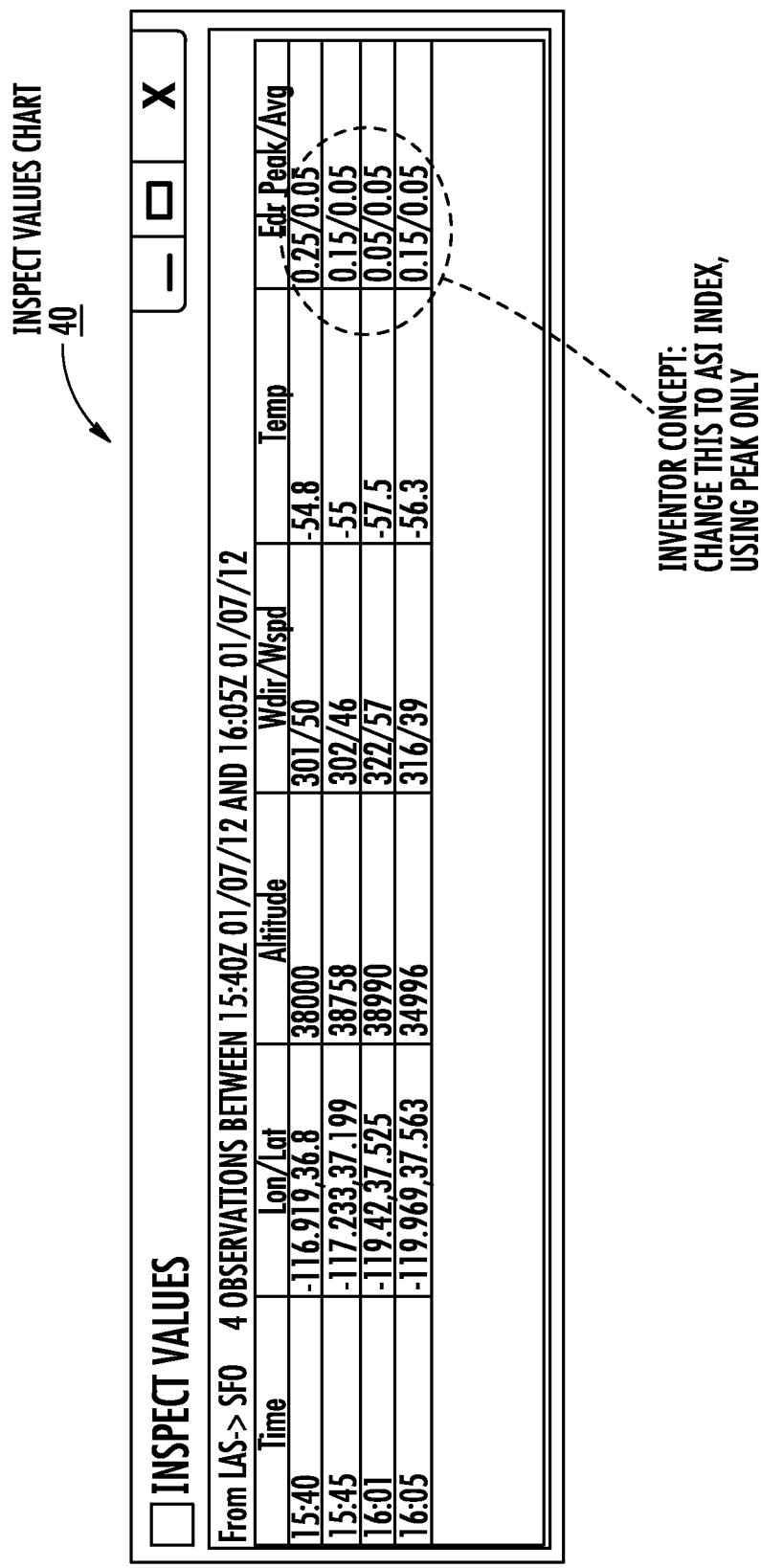
FIG. 5 is an Inspect Values chart 40.

FIG. 5 is an Inspect Values chart 40. This is an example of the current function using the circled blue (I) icon shown on the left side of FIG. 2. When the icon is selected, the user can double click on an individual report and it provides this type of Table for all the reports of the flight from that given aircraft. This report is the only place to find the actual numeric values for EDR. The dotted lines, circle and added "Inventor Concept" text describe an inventor concept of changing the EDR Peak/Avg readings to ASI values for peak only. Said another way, under one invention the inventor contemplates using peak values only in displaying and recording turbulence ASI values.

Figure 6A:
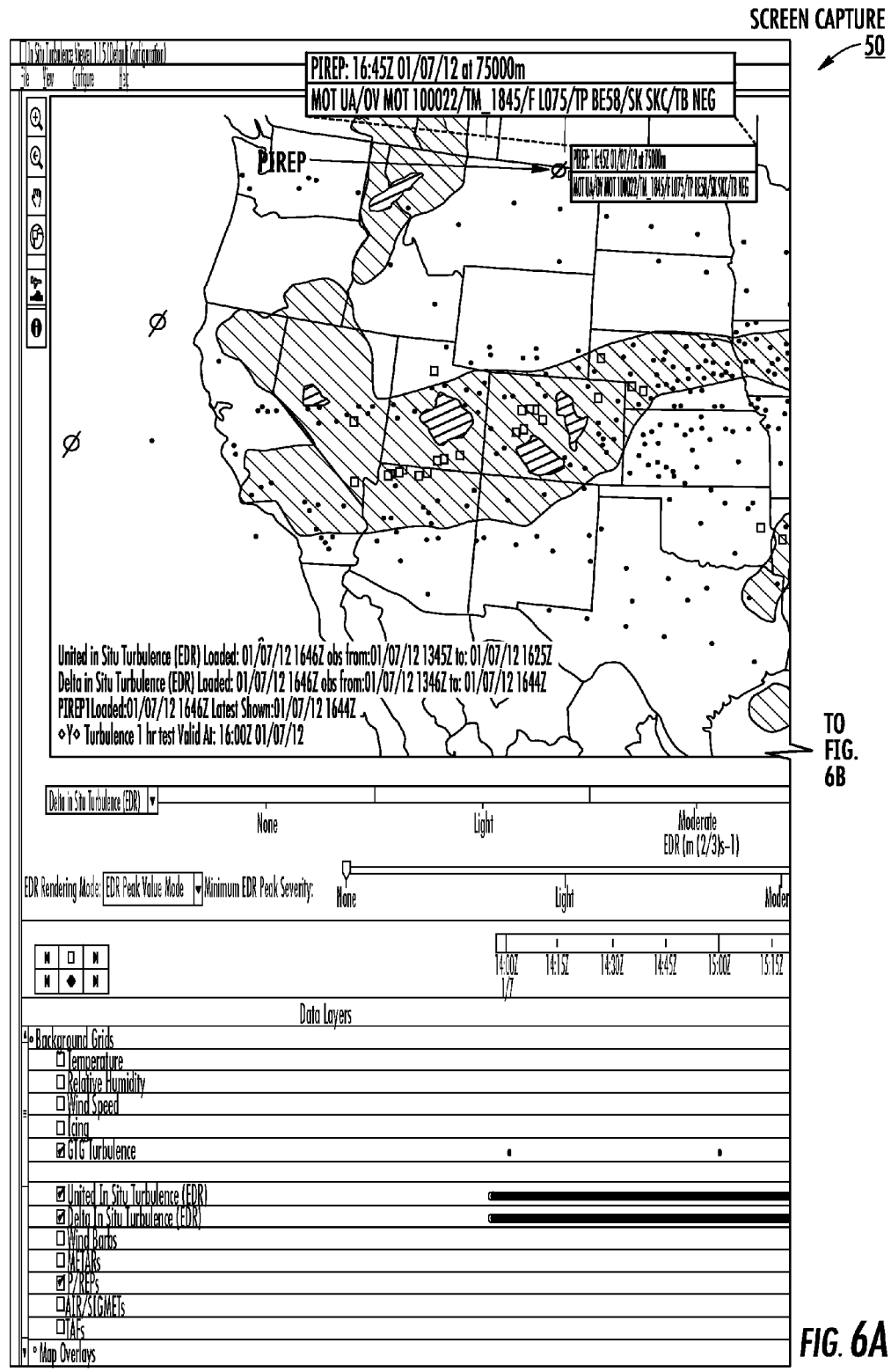
FIG. 6 is a screen capture 50, similar to that of FIG. 2 except that the cursor is hovering over a PIREP icon.
Figure 6B:
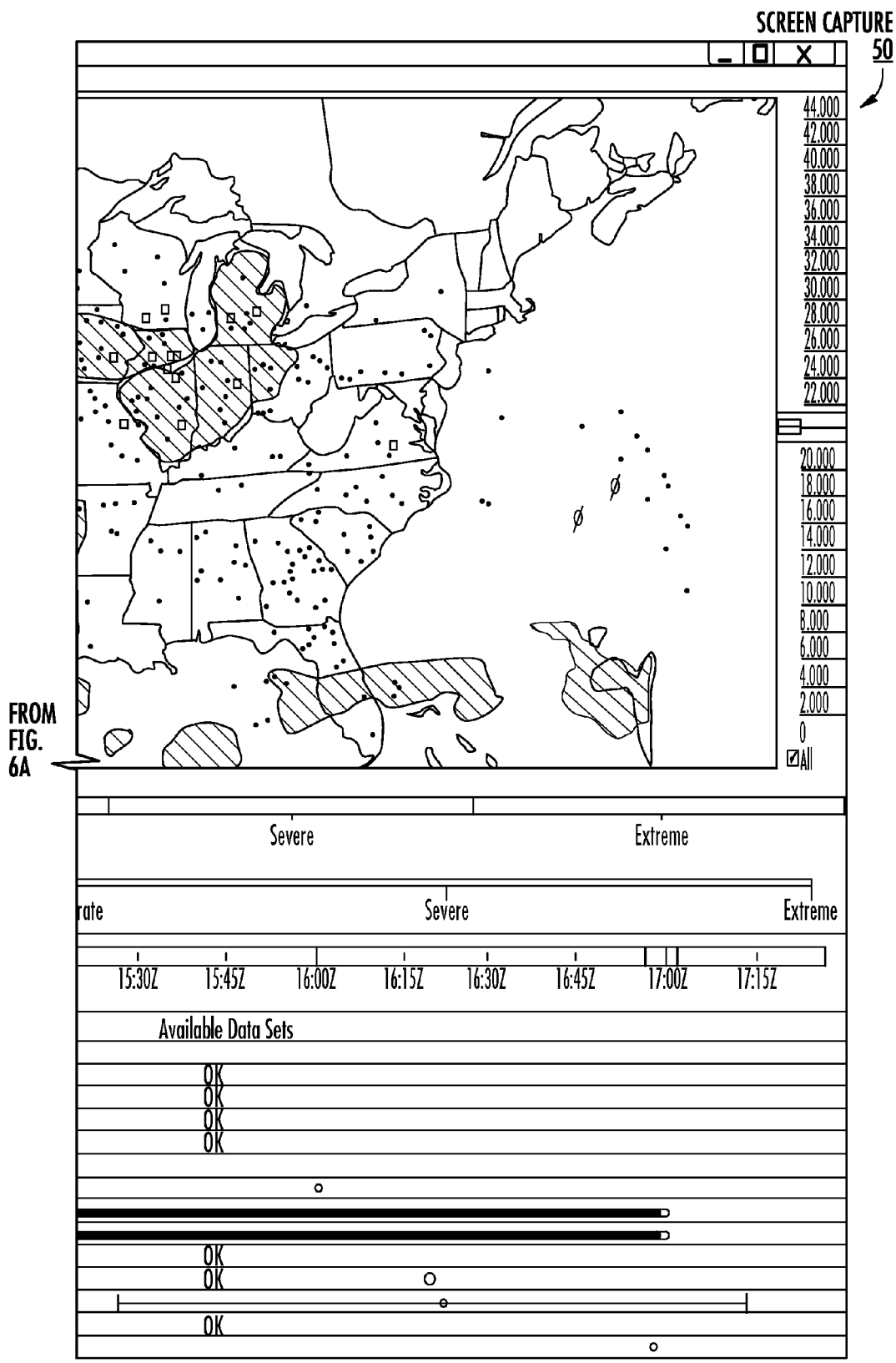

FIG. 6 is a screen capture 50, similar to that of FIG. 2. However, in this case, the screen was captured during use of a mouse over technique over a PIREP in North Dakota. This figure likewise shows the sparse number of PIREPS compared to EDR reports even though at present there are only about 200 aircraft outputting EDR compared to thousands of aircraft flying in the domestic airspace that could provide a lot of PIREPS, but do not because of various flaws in the system. In this example, a mouse cursor hovering over the PIREP icon (circle with a slanted line) in northern North Dakota is a Beach Baron (BE58-small light twin) reporting smooth conditions (TB NEG) using standard FAA descriptions for the different levels of turbulence according to the FAA'S AIM document.

Figure 7A:
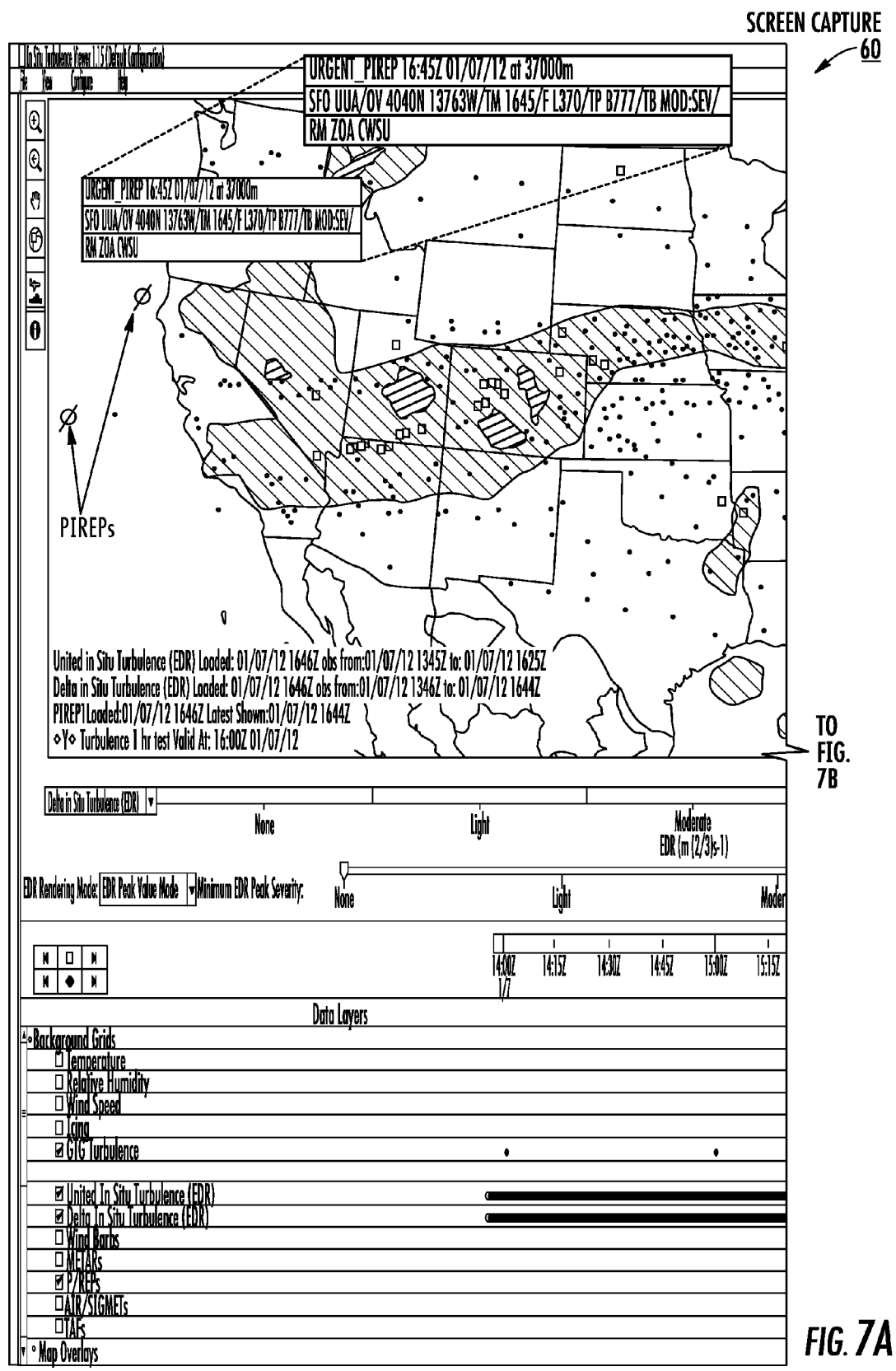
FIG. 7 is a screen capture 60 very similar to that of FIG. 6, except that the cursor is hovering over another PIREP icon.
Figure 7B:
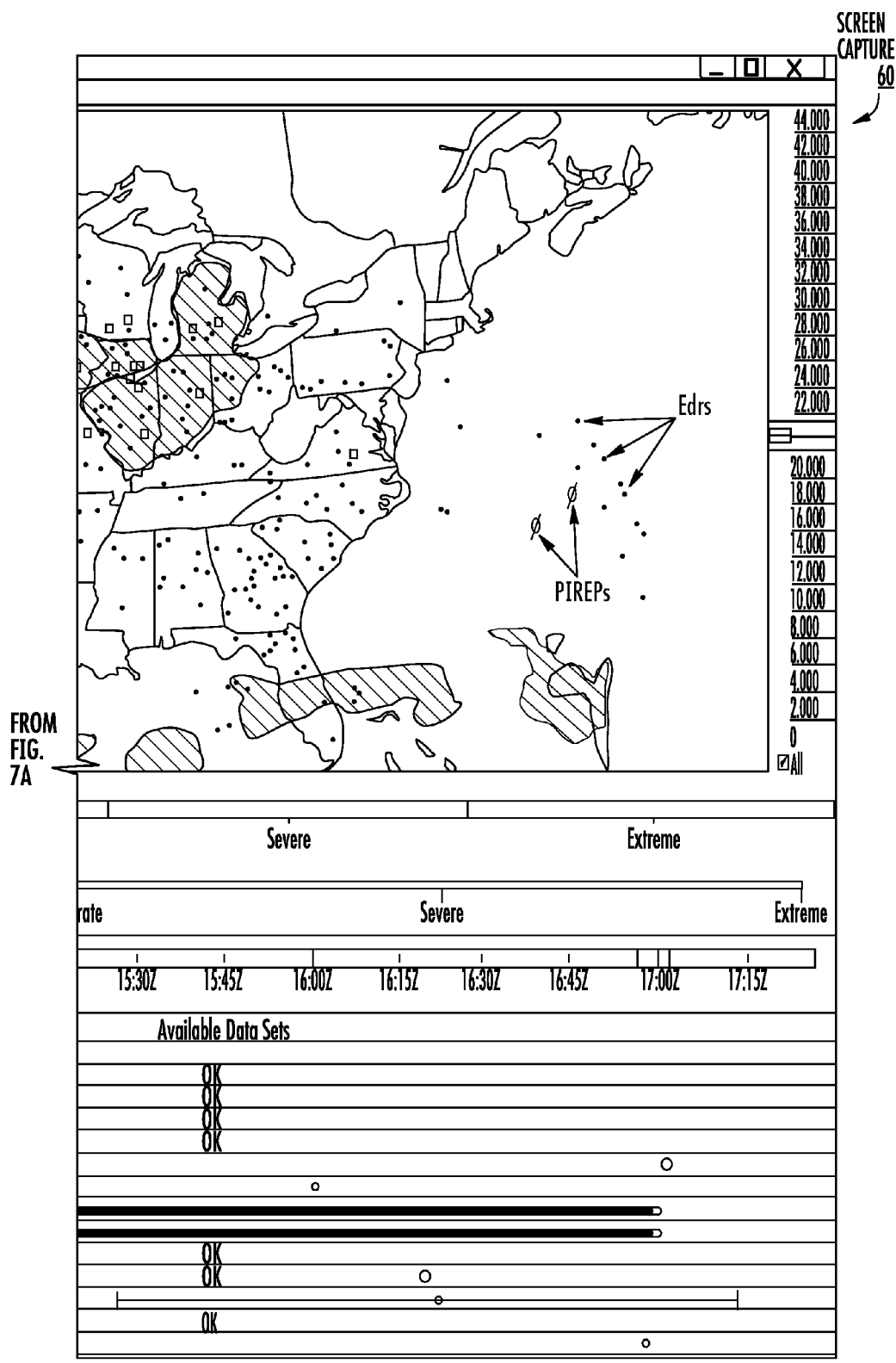

FIG. 7 is a screen capture 60 very similar to that of FIG. 6, except that the cursor is hovering over another PREP. In this case it is a severe PIREP; a B777 over the Pacific west of Oregon reporting moderate to severe conditions (TB MOD-SEV).

Both FIGS. 6 and 7 show the sparse number of PIREPS compared to EDR reports even though at present there are only about 200 aircraft outputting EDR compared to thousands of aircraft flying in the domestic airspace.

FIG. 8 is a screen capture 70 of the plan view for the forecasted turbulence (GTG) of a certain southwest portion of the US at 22,000 feet as shown by the altitude slider on the right side. The valid forecast time is shown for GTG in the lower left portion of the screen. EDR reports are shown for all altitudes as shown be the check in the box labeled "All" at the bottom of the altitude select slider.

FIG. 9 is a more detailed screen capture 80 of FIG. 8. In order to find the altitude and other data for individual reports, one would mouse over the report as described in relation to FIG. 2. The line drawn was done by selecting the aircraft icon on the right side of the screen and single clicking the points with a double click for the last point creating the path labeled S(tart), 1, 2, 3, and E(nd).

FIG. 10 is a screen capture 90 of the vertical cross section a discrete distance (e.g., 50 miles) either side of the path created in FIG. 8. The altitude slider in this view is only a reference line since the cross section covers all altitudes. The brown shading at the bottom represents terrain. As may be seen this figure also shows a concept under one aspect of one invention herein to the effect that the reading would be changed to an ASI index, listing only the peak ASI value.

FIGS. 9 and 10 show the power of a current experimental viewer that superimposes objective numeric reports from aircraft sensors on a very sophisticated numeric model. As viewers like this become operational for different hazards, users will need a way to interpret easily all the different states. As mentioned earlier, the forecast is a 3 dimensional grid. The pilot would look at two major factors in his decision to change altitudes, the most common method of avoiding turbulence instead of changing routes. He considers firstly the forecast based on probability which is often 2-6 hours old for some of the forecast models and secondly reports from other aircraft. As you might suspect, he relies heavily on reports and in today's world mainly on reports from other aircraft on the same radio frequency for Air Traffic Control (ATC) where one pilot can report "rough" air (notice that applicant did not use the official FAA language for PIREPS) at a given altitude and many pilots will avoid this altitude based on this limited knowledge.

With this background, the first picture (FIG. 8) draws a line on the GTF Forecast model starting with "s" near Las Vegas, Nev., goes into SE Utah "2", up to Salt Lake City "3" and ends at Denver, Colo. "e". This is not a rational route but designed to go thru what limited turbulence forecasts of moderate are available today. FIG. 10, labeled "Cross Section", shows a vertical cross section of the line (route) on the plan view 50 miles either side of centerline and the vertical break points match the line symbols (s, 1, 2, 3, e). If not for this feature, the pilot would have to select many altitudes for consideration to develop a solution. The Vertical Cross section gives the pilot a quick and intuitive way to view the forecasted turbulence as compared to actual reports shown as colored boxes along his route of flight. The blue boxes represent a report where an aircraft went thru the area and had negligible turbulence (less than 0.1). Interesting, based on observations over the last year, pilots often change altitude based on turbulence less than 0.1 because they do not have access to this in the cockpit. By the way the forecast for this product is updated every hour. The data block in this view is the same as shown in the first picture at the top of the page and shows a flight from LAS to IAD with Light when I ran my mouse over the green box.

FIGS. 11 and 12 are screen captures 100 and 110 similar to those of FIGS. 9 and 10.

D. Challenges of Current Reporting Protocols; Suggested Inventive Changes

As may be understood, confusion exists in the current state of the art. Currently the color coded forecast (GTG) is based on the aircraft response of a nominal B757 in terms of the language in the FAA'S AIM document (see above) even though the GTG model output is actually based on an atmospheric state. As a further point of confusion, the reports (EDR) in the small square boxes when you mouse over them are actually an atmospheric state (aircraft independent), but use words of the FAA'S AIM language for aircraft response.

Another cause for confusion is shown in reference to FIG. 5, labeled "Inspect Values". As noted above, this an example of the current function using the circled blue (I) icon shown on the left side of FIG. 2. When the icon is selected, the user can double click on an individual report and it provides this type of Table for all the reports of the flight from that given aircraft. This report is the only place to find the actual numeric values for EDR. Using this chart, we can inspect the actual number in the far right column which is shown as an atmospheric state. As you can see they are presented as decimal values from 0 to 0.9. Decimals do not seem to work well in high workload environments. As discussed later thus part of the inventor's new concepts is to multiply this scale by 100 to make it simple for the end users and to also only show the peak value.

Reference is now also made to FIGS. 6 and 7, just as an example. The small circle with a slash through it shows an example of PIREPS (PIlot REPortS), the system created by the Wright brothers. As discussed elsewhere it essentially is a very subjective system where the pilot reports what he feels at the time based on the movement of the particular aircraft using the "very scientific" language in the FAA's AIM. Unfortunately or fortunately depending on your view of PIREPS, they are not very numerous in the system and the hope is to eventually replace them with an automated aircraft sensor report as more aircraft are equipped. The ones that do get in the system are often geographically incorrect do to the protocol for reporting. They also have to be converted to the receiving aircraft's response which is often a guess at best. Again, more confusion.

Referring particularly to FIG. 6, the selected PIREP shown over North Dakota as a blue circle with a slanted line is a Beach Baron (BE58-small light twin) reporting smooth (TB NEG). FIG. 7 shows a PIREP for a B777 over the Pacific west of Oregon reporting moderate to severe (TB MOD-SEV). If we change these reports slightly where the smaller aircraft, Baron, reported moderate to severe, and the B777 reported light to moderate, it becomes very interesting determining how each pilot might respond. How would the lightweight aircraft respond to an atmosphere where an aircraft more than 100 times its weight reported a safe but somewhat rough ride? Since the B777 is not supposed to operate in severe turbulence, should it avoid an area reported by an aircraft 1/100 of its weight and should ATC close down this airspace? Absence of a uniform reporting standard tends to cause confusion.

FIG. 13 is a screen shot 120 of a chart of inspect values. The dotted lines, circle and added "Inventor concept" text describe at least one inventive concept of changing the EDR Peak/Avg readings to ASI values for peak only. Said another way, various embodiments contemplate using peak values only in at least displaying turbulence ASI values.

E. Use of Accumulated Data to Assign Travel Space with Common Atmospheric State Index ("ASI")

The inventor has discovered that the goal of better weather decisions is better addressed by identifying the hazards from the underlying causes and making an operational response to the threat with a presentation using a simple intuitive approach that is common across the different risks.

One of the inventor's concepts relates to the provision of an Atmospheric State Index ("ASI") which would correlate to the existing atmospheric state scale for hazards such as turbulence or the like with appropriate color coding to easily identify the threat. Turbulence, for example, uses Eddy Dissipation Rate developed by NCAR and accepted by ICAO as the standard metric for turbulence. The current scale for EDR is from 0 to 1.0 (m 2/3-1) In contrast, the inventive ASI scale would range from 0 to 100, which is arrived at by multiplying the existing NCAR scale by 100 to allow more granularities in interpreting reports and elimination of the cumbersome use of decimals in a high workload environment. This type scale would be more flexible in the broader context of weather hazards in general. The other hazards would also use a scale of 0 to 100 that would correlate with the appropriate metric for that hazard, but allows the user to view the hazard as a relative threat based on the operator and vehicle capabilities.

The inventive system also relates to defining the hazard using seven (7) parameters: the three traditional spacial dimensions (x, y, z, or lat long alt, or GPS coordinates, or the like), time, ASI value (discussed later), hazard type, and probability (which could be 100% in case of an actual report, but less than that for forecast related data).

Reference is made for the moment to FIG. 14, showing an Atmospheric State Index according to the present invention as applied to turbulence. The common Atmospheric State Index "ASI" runs from 0 to 100 with a corresponding graphical presentation shown in for example FIG. 24. The common scale would have different descriptors depending on the hazard. It should be understood that each of the hazards have been fit to the common atmospheric state intensity scale.

It is believed that use of this ASI scale, being of consistent scale, will require less training than current systems to make operational decisions. As described in further detail below, the user would have a relative sense of the hazard using the common scale and would develop operational numbers for each hazard based on the type of equipment, operator experience, and task definition. The type, location, time period, and probability of hazard would create an operational risk matrix tailored for each individual user. It should be noted that the operational risk matrix may alternatively be referred to as "Travel Tolerance Parameters" (TTPs) elsewhere herein and such should be understood as being generally interchangeable terms. Each user will develop this matrix based on the complexity of the organization and the regulations appropriate to the group. An airline would do much of this internally and coordinate with their regulators while an individual pilot might use a peer review approach with his instructor.

If automation is to be used to define the hazards in computers to allow operators to request routing based on operational responses to the current risk matrix, the volumetric area of concern can be numerically defined using location, time, severity and probability, if a forecast. Human intervention can be used to resolve any conflicts. The primary tools for execution will be the various displays for each of the hazards with the same relative scale using a standardized color code for the presentation with probability assigned when necessary. The users can toggle between the various hazard displays to determine the best course of action for their operations decision matrix.

The same concepts can be applied to other users like marine and ground transportation users. The land and water based vehicles would operate in a more two dimensional setting. The more intuitive approach would facilitate the usage of operators with minimal training.

FIG. 14 is a chart showing the Atmospheric State Index ("ASI") in place according to various embodiments of one of the present invention, using turbulence as an example. As may be seen, this chart includes on its left, under "Turbulence Descriptor", a rough adaptation of the terms discussed above with respect to Aeronautical Information Manual (AIM), in order to assist the viewer in comparing previous aircraft response values. In certain embodiments, where for example the viewer or user may not be experienced with vehicle (e.g., aircraft) response values, the chart may be populated via one or more algorithms configured to advise the viewer or user of those response values, based upon the ASI data itself.

FIG. 17 is an alternate, more graphical display of this same index, which uses color coding (color not shown but noted in the boxes of varying shades of gray in the black and white drawing). In this display element, the inventor's new system provides a color code for the forecast portion that matches the color coding for the turbulence metric for atmospheric state with more gradations than the present one. This color coding will make the correlation between the forecast and objective aircraft reports easier to interpret for the end users in their decision making process.

The display shown in in FIG. 17 allows the operator to use the ASI for simplification, but have access to the current AIM scales ("Very Lt", "Very Lt to Lt" for this hazard.

As may be seen, the turbulence metric for atmospheric state would be matched to an expanded color coded scheme developed for graphical presentations to allow a quick and intuitive summary of reports being considered. The null range would be at the lower end of the scale and is considered nuisance turbulence, but comprises approximately 90% (Per numbers found in NCAR\EDR_GTG_Verification_2004) of automated reports and causes many crews to respond with altitude changes. The index range for this area would be from 0 to 19, with light blue for the 0 to 9 range and dark blue for the 10 to 19 range. The next index range would be for 20 to 39 and would somewhat correlate with the area of Light turbulence as defined in the AIM with light green for the 20 to 29 range and dark green for 30 to 39. The next index range would be for 40 to 59 and would somewhat correlate with the area of Moderate turbulence in the AIM with light orange for 40 to 49 and dark orange for 50 to 59. The next range would be for 60 to 79 and would somewhat correlate with the area of Severe turbulence in the AIM with light red for 60 to 69 and dark red for 70 to 79. The next range would be for 80 to 99 and would somewhat correlate with Extreme turbulence in the AIM with light maroon for 80 to 89 and dark maroon from 90 to 99.

Note in particular the relabeling of Very Light with 2 ranges of 0 to 9 (light blue) and 10 to 19 (dark blue) This is somewhat significant since data indicates that over 90% of the reports fall in this range and crews react to it even thou the scientists consider it insignificant. Said another way, the scientists don't see this range of turbulence as significant based on their knowledge of airline operations, but some studies in the last few years have shown that crews are moving off their optimum altitudes for very light levels of turbulence. This is one of the reasons the inventor has developed the concept of expanding the scale, since most of the reports (>90%) are in the low range and the crews react to these light levels.

FIG. 15 shows how the expanded color coded scheme and ASI index according to the present invention can be used in the context of changing the screen display of FIG. 11. As may be seen by the added dotted lines, the inventor contemplates the use of more gradient lines which would separate more colors. As may be seen in FIG. 15, the inventor contemplates dividing the "white" space into light and dark blue (corresponding to 0-9 and 10-19, respectively, in the inventor's Atmospheric State Index). Also contemplated is dividing the "green" space into light and dark green (corresponding to 10-29 and 30-39, respectively, in the inventors Atmospheric State Index). Also shown in the inventor's contemplation to divide the "orange" space into light and dark orange (corresponding to 40-49 and 50-59, respectively, in the inventors Atmospheric State Index). Also contemplated is that the previous scale with word descriptors ("Light", "Moderate", "Severe" etc.) would be replaced with a numeric scale somewhat correlated with the previous levels of turbulence and more color gradations. In at least certain embodiments, the previous word descriptors would be expanded to provide a descriptive granularity comparable to that of the new numeric scale (e.g., the non-limiting example of "Very Light"=>0 to 9; "Very Light to Light"=10-19; "Light"=20-29; "Light to Moderate"=30-39; "Moderate"=40-49; "Moderate to Severe"=50-59; "Severe"=60-69; "Severe to Extreme"=70-79; "Extreme"=80-89; and "Extreme Plus"=90-99). In other embodiments, even the expanded granularity word descriptors could be eliminated, leaving only a color-coded numeric depiction of the ASI index for any of the various hazards described herein.

As will be described in further detail later, the user (e.g., pilot) may define certain degrees of acceptable turbulence (or other hazard) levels that they are either comfortable or approved for operating under, in which case, according to certain embodiments, at least those degrees deemed unacceptable (e.g., operating above a "Severe"=60-69) could be configured to flash according to their color coding scheme, have a marking thereon (e.g., "XXX"), incorporate a combination thereof, or any of a variety of alternative "warning indicators" for users of potentially adverse hazard conditions that they, per their customized settings, should avoid.

FIG. 16 also shows how the expanded color coded scheme and ASI index according to the various embodiments of the present invention can be used in the context of changing the screen display of FIG. 12. In the case of the individual aircraft automated reports (three have lead lines directed towards them), they will be color coded under one embodiment of the invention with the same color scheme as used in forecasting. Under other embodiments of the invention, when a mouse is hovered over one these automated report icons, a box will pop up as previously discussed, but numerical atmospheric state information will be included instead of AIM description. Also, it should be understood that instead of tail number, aircraft type could be used Reference is now made to FIG. 18, which is an illustration of use of the Atmospheric State Index according to the present invention to grade visibility (as an example). The first row of the chart on the top shows the current classification of operation; VFR represents visual flight rules, and requires greater than 5 miles, which is a legal requirement of operators. MVFR means marginal VFR, which is a transitional area between VFR and IFR. IFR stands for instrument flight rules; LIFT means low instrument flight rules. The second row of the chart on the top shows the values selected under one embodiment of the present invention to correspond with the ASI color gradations of the last row on the chart, both of this correspond to the ASI numerical values (10, 20, 30, etc.) listed below the chart. This allows the operator to use the ASI index for simplification, but have access to the prior art scales previously used for this hazard. As discussed later, over time with experience and guidance from the appropriate parties, the operator will develop a range for his particular procedure that will become his operational parameter for that hazard. This will be discussed more with respect to travel tolerance parameters (TTPs). The information on the chart below the 10 . . . 20 . . . 30 data relates to the regulatory definitions for phases of the conditions under which the operator can conduct flight based on his specific licenses (e.g. VFR vs. IFR). It should be understood, however, that additional more restrictive conditions under which the operator can conduct flight may exist, as such may be self-imposed based upon a variety of factors such as operator experience, equipment type, and/or mission parameters. It should also be understood that although the numeric scale for visibility is descending from left-right on the display, the intensity of the hazard increases from left-right, as in previous displays, thus providing a uniform and consistent color-coding scale corresponding to the ASI Index.

Reference is now made to FIG. 19, which is an illustration of use of the Atmospheric State Index according to the present invention to grade ceiling (as an example). As in the previous scale of FIG. 18, this allows the operator to use the ASI index for simplification, but have access to the current scales used for this hazard. As discussed later, over time with experience and guidance from the appropriate parties, the operator will develop a range for his particular procedure that will become his operational parameter for that hazard. This will be discussed more with respect to travel tolerance parameters (TTPs). The information on the chart below the 10 . . . 20 . . . 30 data relates to the regulatory definitions for phases of the conditions under which the operator can conduct flight based on his specific licenses (e.g. VFR vs. IFR). It should be understood, however, that additional more restrictive conditions under which the operator can conduct flight may exist, as such may be self-imposed based upon a variety of factors such as operator experience, equipment type, and/or mission parameters. It should also be understood that although the numeric scale for ceiling is descending from left-right on the display, the intensity of the hazard increases from left-right, as in previous displays, thus providing a uniform and consistent color-coding scale corresponding to the ASI Index.

Reference is now made to FIG. 20, which is an illustration of use of the Atmospheric State Index according to the present invention to grade icing (as an example). This allows the operator to use the ASI for simplification, but have access to the current scales (Trace, Light, Moderate, Severe) used for this hazard. Over time with experience and guidance from the appropriate parties, the operator will develop a range for his particular procedure that will become his operational parameter for that hazard. As manufacturers and regulators develop better tools to correlate atmospheric state with actual hazard, especially in areas like icing, to a specific vehicle, the ASI range of operations may become more specific instead of the current broader ranges. For example, while as illustrated, the scale is liquid water content and is measured as grams per cubic meter, alternative scales could be implemented, such as the non-limiting example of water droplet size. It should be understood that for any of the various other hazards described elsewhere herein, additional and/or alternative scales may be developed and/or implemented, as may be desirable for particular applications.

Reference is now made to FIG. 21, which is an illustration of use of the Atmospheric State Index according to the present invention to grade lightning (as an example). This allows the operator to use the ASI for simplification, but have access to the current scales used for this hazard. Over time with experience and guidance from the appropriate parties, the operator will develop a range for his particular procedure that will become his operational parameter for that hazard. As manufacturers and regulators develop better tools to correlate atmospheric state with actual hazard, especially in areas like lightning, to a specific vehicle, the ASI range of operations will become more specific instead of the current broader ranges.

Reference is now made to FIG. 22, which is an illustration of use of the Atmospheric State Index according to the present invention to grade volcanic ash as an example. This allows the operator to use the ASI for simplification, but have access to the current scales used for this hazard. Over time with experience and guidance from the appropriate parties, the operator will develop a range for his particular procedure that will become his operational parameter for that hazard. As manufacturers and regulators develop better tools to correlate atmospheric state with actual hazard, especially in areas like volcanic ash, to a specific vehicle, the ASI range of operations will become more specific instead of the current broader ranges.

Winds around the airport can create a takeoff and landing hazard to aircraft depending on its characteristics. If it is turbulent, the ASI for turbulence would show this for arrivals and departures based on the EDR values as described elsewhere. Another potential hazard would be a crosswind component that would affect the takeoff and landing. Reference is now made to FIG. 23, which is an illustration of use of the Atmospheric State Index according to the present invention to grade ground crosswind as an example. The operator would have to select a runway and the wind feed consisting of speed and direction would calculate the crosswind component and compare it with the operator/machine limitation using the ASI value as an easy reference. Over time with experience and guidance from the appropriate parties, the operator will develop a range for his particular procedure that will become his operational parameter for that hazard.

Reference is now made to FIG. 24, which is a screen capture 200 of a graphical display of multiple actual turbulence reports (the small squares), as well as a turbulence forecast at 30000 feet (the oval-shapes) using the Atmospheric State Index according to the present invention. For purposes of displaying forecast data, the time selection has been set to forecasting conditions at 1900 hours (2 hours 18 minutes from the current time of 1642 hours). For purposes of displaying actual report data (the squares), a selection has been made to display actual reporting data for a certain time previous to forecast time. Evidence of this setting is not shown in this figure (as is the case for forecast time and elevation), but under one aspect of the present invention it could be. For purposes of this discussion it will be assumed that this setting is at four hours, which would result in live report data to be displayed, in this case by squares (or other icons) colored so as to correspond with the colors in the index. For example, a live PIREP report of turbulence in the 40-49 ASI range would be colored yellow.

In FIG. 24, it may be seen that three forecasted weather events are generally shown, in the Northwest, Central, and Southeast portions of the US. The one in the Northwest US shows a forecast of turbulence up to the 30-39 ASI turbulence. The one in the Central US shows a forecast of turbulence up to the 20-29 ASI turbulence value. The one in the Southeast US shows a forecast of turbulence up to the 10-19 ASI turbulence value.

Note that where weather radar measures precipitation which sometimes correlates with turbulence, but can often be misleading since wind shear is the primary cause of turbulence. One can have red on the radar with a steady state rain and minimum shear, but can have green on the radar between two storms interacting with each other which can cause major shear. The newer radars and the ground based system of NEXRAD radars can use algorithms based on Doppler shift to determine where the shear exits. These areas of shear could be superimposed on the bill viewer of Figure DD for example showing the GTG forecast and EDR automated reports using the same color schemes and values to give a composite picture of turbulence. The user could then make a decision on how to deal with this area of turbulence based on the operational risk matrix previously developed for that operation.

Reference is now made to FIG. 25, which is a screen capture 210 of an exemplary graphical display (such as might be viewed on a computer screen) of turbulence similar to FIG. 24 using the Atmospheric State Index according to the present invention, except at 39000 feet instead of 30000 feet. As will be seen, the readings are different.

Reference is now made to FIG. 26, which is a screen capture 220 of an exemplary graphical display (such as might be viewed on a computer screen) of icing at 39000 feet using the Atmospheric State Index according to the present invention. The blobs 222, 224 and 226 represent an area having an ASI index value of 0-10. The blob 228 represents an area having an ASI index value of 10-20. As should be understood from FIG. 28, different airplanes can have differing icing characteristics for a given ASI value, so this will result in a need for different TTPs associated with different aircraft.

Reference is now made to FIG. 29, which is a screen capture 240 of an exemplary graphical display (such as might be viewed on a computer screen) of volcanic ash at 39000 feet using the Atmospheric State Index according to the present invention. The four circles (which in their order of size would be filled with light blue, dark blue, light green, and dark green color) exemplify what might appear in the case of a volcanic eruption in the Northwest portion of the US. In at least the illustrated embodiment the respective circles represent actual observations, such that any probability parameter would necessarily be 100%. However, it should be understood that in other scenarios and embodiments, the respective circles may have further associated with them a probability based upon corresponding forecast data. In those situations, the probability may be less than or equal to 100%.

The turbulence forecast tool currently provided by the National Weather Service as GTG2 is nominally tied to an aircraft response to correlate to the definitions of turbulence in the AIM for a Boeing 757 type aircraft. This depiction would be converted under the inventor's new concepts to an atmospheric state for turbulence and the color coding would be the same as described above to avoid confusion between the two views of turbulence, aircraft response of the prior art, and atmospheric state of the current invention. The old AIM descriptor words used for a scaling method would eventually be eliminated and replaced with the numeric scale and corresponding color coding corresponding to the atmospheric state.

In another element under the inventor's new concepts, the format would include the type of hazard such as turbulence, icing, lightning, and volcanic ash with a probability when appropriate for forecasts to allow for future use, including but not limited for example in the broader weather needs of NextGen. The 0 to 100 scale could also be used for these hazards in a similar scoring type system. This will be especially relevant as more automation requiring digital data becomes involved with negotiations of four dimensional trajectories (including time).

Reference is now made to FIG. 27, which is a screen capture 230 of an exemplary graphical display (such as might be viewed on a computer screen) of icing at a certain altitude using the Atmospheric State Index according to the present invention. This display is similar to the display of FIG. 26, but in this case each of the "blobs" has a probability associated therewith. The blob 232 represents an area having an 85% chance of icing at the ASI index value of 0-10. The blobs 234 and 236 represent areas having a 60% chance of icing at the ASI index value of 0-10. The blob 238 represents an area having a 75% chance of icing at the ASI index value of 20-30.

New Reporting Protocols

In another feature under the inventor's new concepts, the invention would provide a process for using the ASI scale in the current environment where PIREPS are the primary metrics for turbulence and other hazards. Although automated objective aircraft reports are available today, they are not widely used or understood and can be difficult to correlate with the old schema of PIREPS without proper processes and training. This new approach would concentrate on turbulence as one of the weather hazards with a standardized metric defining the atmospheric state rather than the current focus on the source of the turbulence such as radar reflectivity which measures precipitation intensity and subjective reports based on aircraft response. By focusing on the weather hazard (turbulence, lightning, icing, and volcanic ash) as opposed to the source of the hazard (thunderstorms), the user can make better decisions in determining his optimum flight path.

End users in the inventor's new system would be provided with tools and systems to start using an atmospheric state metric for turbulence as the standard and PIREPS as a supplement with clear delineation between the two metrics. PIREPS would have an aircraft type associated with it with the same ambiguities existing currently. If an atmospheric state of 40 was measured by an aircraft, it would be reported as ASI=40 with time, position and altitude or shown graphically on a display. If a smaller aircraft like a regional jet were to fly thru the same point in space, it might provide a PREP of Severe which would be reported as CRJ200 PREP of Severe.

As users gain experience with the new ASI, it will be easier to convert from an atmospheric state to a receiving aircraft response than going from a reporting aircraft response to atmospheric state back to the receiving aircraft response. There will be tools to determine operational guidelines for individual users. One method to do this would be a regression analysis comparing atmospheric state with the state of the aircraft cabin. Other methods including concurrent aircrew reporting on possible cabin service in conjunction with objective aircraft reports are possible.

F. Establish Travel Tolerance Parameters (TTPs)

Another important feature of one of the inventions described herein relates to the establishment of a system enabling the establishment of Travel Tolerance Parameters (TTPs). This includes the development of an operational scoring system tailored for the individual needs of the user. It could be thought of as a "handicapping" feature which could be applied to vehicle operator and/or the vehicle.

Its use in air flight will be described in non-limiting examples. For example, a scoring system would determine the acceptable activities of the flight based on the level of hazard defined by the pilot, or the pilot's peers, or the pilot's employer. This would allow for the accommodation of various factors, including pilot training and experience both generally and with respect to the particular aircraft involved. As previously described herein, the user (e.g., pilot) or the user's peers and/or employer may define certain degrees of acceptable turbulence (or other hazard) levels that the user is either comfortable with or approved for operating under, in which case, according to certain embodiments, at least those degrees (or levels) deemed unacceptable (e.g., operating above a "Severe"=60-69 level on the scale)) could be configured to flash according to their color coding scheme, have a marking thereon (e.g., "XXX"), incorporate a combination thereof, or any of a variety of alternative "warning indicators" to alert the user of potentially adverse hazard conditions that they, per their customized settings, should avoid.

For example, an experienced pilot in a given aircraft might have no concerns in flying in turbulence having a level of 40-49 on the ASI index. However, an inexperienced pilot might decide (or be told by his flight instructor or employer) that he/she would not fly in such turbulence, and would only fly in areas where the ASI index is less than 30. Thus a travel tolerance parameter (TTP) has been set; in one embodiment of one invention, flight plans would be affected by such a setting.

In another example, a given pilot in a given aircraft might have no concerns in flying in icing conditions having a level of 40-49 on the ASI index. However, that same pilot might decide (or be told by his flight instructor or employer) that he/she would not fly in such icing conditions in a different aircraft, and would only fly in areas where the ASI index is less than 20. Thus another travel tolerance parameter (TTP) has been set; in one embodiment of one invention, flight plans would be affected by such a setting.

In another example, a passenger airline would manage its passenger cabin such as meal service and seat belt sign usage to maintain safety while considering the optimum altitudes for efficiencies/emissions and air traffic needs. A cargo type carrier could use individual guidelines for different levels of turbulence than a passenger carrier, but would still use the same atmospheric state ASI index to develop these guidelines.

Note that the development of such Travel Tolerance Parameters (TTPs) could likely be in iterative process as the ASI index is adapted; the more the ASI index is used and becomes universal the better that various travel tolerance parameters (TTPs) can be developed and fine-tuned.

Note that it was mentioned above that acceptable activities of the flight could be determined based on the level of hazard defined by the pilot, or the pilot's peers, or the pilot's employer. In the case of the pilot's peers, this could include his/her flight instructor, a group or association formed for this purpose. In the instance of the pilot's employer, this would typically be in the case of commercial flight; a particular airline could have internal guidelines that would be developed to adapt to the ASI system.

Note also that a different tolerance parameter may be set for each hazard; a certain pilot or aircraft may have a particular difficulty dealing with one type of hazard, while less so with another hazard.

The probability of a particular level of severity could also be factored in when establishing various travel tolerance parameters (TTPs). Particular levels of ASI hazard severity could have a numeric probability associated with them, as shown in for example in FIG. 27, and the TTP could take that into account. An example would be where an operation would not continue with a severity level of 40 and a probability of 80%, but would at a level of 40 and a probability of 20%. In other words, the operator might be willing to depart based on a forecast that exceeds his severity level with a low probability of occurrence and adjust as necessary when approaching the hazard. In the other case with an area that exceeds the operator's severity level with a high probability, the areas would be avoided in the initial planning stage. As discussed elsewhere, this would have a distinct advantage when allow users and providers to have automated exchanges with the user defined matrix to determine the mix of severity and probability acceptable for a specific operation.

For another example, one user's guidelines might accept a route with an ASI score of 40 if the probability is less than 30%, but not the same ASI score with a probability of 80%.

Another example is as follows. A pilot could say if a forecast for 50 ASI turbulence or above, at 80%, I'm not going there. But it's from 50-60 at 40% probability, I may go take a look. In other words, I'll take off and plan on going through there and then as time—if another flight goes through there and I start getting reports, I can make a more tactical decision.

Once all of the various tolerance parameters are set, this could be grouped in a table. This table could be used as discussed elsewhere in developing and filing flight plans.

Note that under one configuration, certain parts may be blocked from use, based upon the travel tolerance parameters (TTPs). This could be by blacking out the area, cross-hathcing it, etc. This could be in response to outside factors, or due to "Pop ups" could come up if the flight has exceeded the tolerance, either due to changing circumstances or error on behalf of the operator. Other alerts are contemplated such as an audible alert on the computer screen of the pilot, or otherwise in the pilots onboard warning systems, if the pilot passes into a zone which is not consistent with his/her flight plan and/or TTPs.

G. Use ASI and TTP data to Display Common Look and Feel While Viewing Different Hazards; "Toggling" Effect Note that any of the figures shown herein may be includes in a "screen display" which could include a computer screen (portable or built into the vehicle), and could include keyboard dependent as well as touch screen environments. As may be understood, such screens in the present state of the art have the ability to "toggle" rapidly thought different screen displays at the will of the user via keystroke, mouse click, or touch control. This toggling effect may be used to a distinct advantage in connection with the present invention(s).

One significant feature of one of the inventions herein is the provision of the ability of a user (e.g., a pilot) to have access to a plurality of screen displays, with all of these particular screen displays having a "common look and feel", which provides for efficient viewing, prompt hazard recognition, and more accurate interpretation of available data. This "common look and feel" is shown within the group of figures including 24, 25, 26, 27, and 29.

Referencing again is again made to FIGS. 24, 25, 26, 27, and 29. It may be understood that a user could easily "toggle" through these various screens to look at the same potential flight zone (in this case North America) while looking at individual hazards individually. It should also be understood that other screens will likewise be available for other hazards (e.g., ground wind, lighting, visibility, etc.

Under one embodiment of one invention, when toggling through the various hazard screens, the time slider and altitude sliders will remain be at the same position as the user toggles through; if the user resets any of them on one screen, that reset value would be kept when you toggling to the next screen.

It is also contemplated to have several preselected overlaid hazards on one view It is also contemplated to have certain screens that could be used and/or available at certain times of a flight. For example a pilot could be presented with the ground crosswind report proximate takeoff and/or landing, whereas at other times this would not be in a group of toggle ready screens available to the pilot/user.

It is also contemplated to have certain screen portions blocked out or the like in associate with the pilots TTP grid, with certain screen portions simply blacked out as unavailable to the user based on his/her TTP settings.

As displays develop in the future, a 3D grid for forecasts could be shown in a pictorial view-type rendering similar to that provided by some CAD design programs.

H. Use of ASI and TTP data in Computer Exchange

Finally, under the invention, the proposed ATI and forecast tools will be integrated into the weather capabilities of the future air traffic system, which is commonly referred to as NextGen in the US and other acronyms around the world. The proposed system will establish the concept of weather hazards regardless of source and the proposed invention will integrate seamlessly into the new approach in rerouting aircraft around specific hazards such as turbulence, icing, lightning, and volcanic ash, regardless of the environmental source of the hazard itself. For example, forecast model data, actual sensed data, and predicted data derived from various sensors such as those that are ground and/or satellite-based may all be superimposed relative to one another, with a common scale and color-coding applied thereto, so as to determine the probability of hazard(s) to be expected based thereon. The numbering system along with the type of hazard and the probability (if such exists) that are used to describe atmospheric state or other weather hazard will easily fit into the numeric models. These numeric models will define weather impact information for an open architecture system, which will itself further define Airspace Volume of Interest (AVOI) that can be transmitted to the end users in an easy to use graphical interface using open languages such as XML and/or digital displays.

The numeric approach of this system would provide a convenient way of defining airspace based on location, severity, time and probability where automated exchanges between the providers and users for many of the decisions can be made. If a conflict arises that requires human intervention, it should still be straightforward based on the operators predetermined risk matrix.

Note that the present prior art system for handling initial flight plans and any subsequence changes called reroutes is very labor intensive, especially with changes due to weather. For a typical commercial flight, a licensed dispatcher in the airline's operational center files a flight plan electronically using a tool that gives the optimal path based on the business model of the corporation and the time of departure. If there are no constraints, the air traffic system will respond with a clearance that is received by the airline and entered into the air traffic control computers. If there are any changes needed, the airline and the air traffic provider negotiate the changes acceptable to both parties. In a dynamic weather situation, this process can be tedious and cumbersome often resulting in delays. The arrival times are dependent on these delays and often result in a long string of aircraft based on first come first served in the arrival sequence.

A key point in this prior art system is that arrival times are not as critical as will be required in the NextGen system proposed by the FAA and other countries to meet the capacity needs of the future. This proposed new system will depend on a required time of arrival to maximize the utilization of the high capacity corridors and airports. Weather impacts could require multiple iterations of negotiated times of arrivals which will require a new flight plan. The proposed inventive system with the Travel Tolerance Parameters (TTPs) based on the airline business model will help automate this process requiring only a final review and/or acknowledgment by the end users. This process will be appropriate for both the initial filing of the flight plan and subsequent reroutes during the execution of the flight in order to meet the required time of arrival.

Once the flight has taken off, there may be a dynamic situation, and the forecast may have changed. The table of risk parameters and/or TTPs, which may be set up beforehand will make it easier to dynamically, seamlessly, and/or at least partially automatically negotiate flight plans. Under at least one embodiment of the present invention, this table would be given to the FAA.

I. Adaptive Measures to Transition from Current State of Art

Various processes would be developed to develop methods and procedures for the transition period from the current Air Traffic Management system to the new NextGen program where company thresholds would be established to ensure safety, capacity maximization, and emission/efficiency reductions. The time period for this transition varies amongst the industry, but is a minimum of 10 years and allows the industry to fully develop such an approach needed by NextGen. This process would include training and informational packages along with tools to use the new system. The tools would include digital based systems incorporating graphical interfaces to facilitate automated decision making for turbulence and any of the other hazards described elsewhere herein, or still further hazards as may be desirable for monitoring under certain circumstances.

These processes would lessen confusion between the current subjective personal observations (e.g., PIREPS) and the new ATI approach during the interim period of transition to the future system where PIREPS are completely eliminated or relegated only to those cases where nothing else is available outside the modern ATC systems of the future.

Still further, it should be appreciated that as a part of this transition users can define what level of hazard and an associated probability they can accept (or tolerances outside of which they cannot accept) when negotiating for a flight plan request, commonly called a four dimensional trajectory in the future systems being considered. These values can be expressed as numeric values which lends itself to a more automated approach, but still very usable for the human interface. Such parameters could be incorporated within the system such that various automatic actions may be taken based thereon, with minimal, if any, operator and/or user involvement.

J. Apparatuses, Methods, Systems, and Computer Program Products

As should be appreciated, various embodiments may be implemented in various ways, including as apparatuses, methods, systems, or computer program products. Accordingly, the embodiments may take the form of an entirely hardware embodiment, or an embodiment in which a processor is programmed to perform certain steps. Furthermore, various implementations may take the form of a computer program product on a computer-readable storage medium having computer-readable program instructions embodied in the storage medium. In such embodiments, any suitable computer-readable storage medium may be utilized including hard disks, CD-ROMs, optical storage devices, or magnetic storage devices.

Various embodiments are described below with reference to block diagrams and flowchart illustrations of apparatuses, methods, systems, and computer program products. It should be understood that each block of any of the block diagrams and flowchart illustrations, respectively, may be implemented in part by computer program instructions, e.g., as logical steps or operations executing on a processor in a computing system. These computer program instructions may be loaded onto a computer, such as a special purpose computer or other programmable data processing apparatus to produce a specifically-configured machine, such that the instructions which execute on the computer or other programmable data processing apparatus implement the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the functionality specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide operations for implementing the functions specified in the flowchart block or blocks.

Accordingly, blocks of the block diagrams and flowchart illustrations support various combinations for performing the specified functions, combinations of operations for performing the specified functions and program instructions for performing the specified functions. It should also be understood that each block of the block diagrams and flowchart illustrations, and combinations of blocks in the block diagrams and flowchart illustrations, could be implemented by special purpose hardware-based computer systems that perform the specified functions or operations, or combinations of special purpose hardware and computer instructions.

Exemplary System Architecture

FIG. 30 is a block diagram of a weather avoidance tool system 20 that can be used in conjunction with various embodiments of the present invention. In at least the illustrated embodiment, the system 20 may include one or more distributed computing devices 100, one or more distributed handheld devices 110, and one or more central computing devices 120, each configured in communication with a dynamic management server 200 via one or more networks 130. While FIG. 30 illustrates the various system entities as separate, standalone entities, the various embodiments are not limited to this particular architecture.

According to various embodiments of the present invention, the one or more networks 130 may be capable of supporting communication in accordance with any one or more of a number of second-generation (2G), 2.5G, third-generation (3G), and/or fourth-generation (4G) mobile communication protocols, or the like. More particularly, the one or more networks 130 may be capable of supporting communication in accordance with 2G wireless communication protocols IS-136 (TDMA), GSM, and IS-95 (CDMA). Also, for example, the one or more networks 130 may be capable of supporting communication in accordance with 2.5G wireless communication protocols GPRS, Enhanced Data GSM Environment (EDGE), or the like. In addition, for example, the one or more networks 130 may be capable of supporting communication in accordance with 3G wireless communication protocols such as Universal Mobile Telephone System (UMTS) network employing Wideband Code Division Multiple Access (WCDMA) radio access technology. Some narrow-band AMPS (NAMPS), as well as TACS, network(s) may also benefit from embodiments of the present invention, as should dual or higher mode mobile stations (e.g., digital/analog or TDMA/CDMA/analog phones). As yet another example, each of the components of the system 5 may be configured to communicate with one another in accordance with techniques such as, for example, radio frequency (RF), Bluetooth™, infrared (IrDA), or any of a number of different wired or wireless networking techniques, including a wired or wireless Personal Area Network ("PAN"), Local Area Network ("LAN"), Metropolitan Area Network ("MAN"), Wide Area Network ("WAN"), or the like.

Although the distributed computing device(s) 100, the distributed handheld device(s) 110, the central computing device(s) 120, and the server 200 are illustrated in FIG. 30 as communicating with one another over the same network 130, these devices may likewise communicate over multiple, separate networks. For example, while the central computing devices 120 may communicate with the server 200 over a wireless personal area network (WPAN) using, for example, Bluetooth techniques, one or more of the distributed devices 100, 110 may communicate with the server 200 over a wireless wide area network (WWAN), for example, in accordance with EDGE, or some other 2.5G wireless communication protocol.

According to one embodiment, in addition to receiving data from the server 200, the distributed computing devices 100, the distributed handheld devices 110, and the central computing devices 120 may be further configured to collect and transmit data on their own. Indeed, the distributed computing devices 100, the distributed handheld devices 110, and the central computing devices 120 may be any device associated with a carrier or provider or user. In certain embodiments, one or more of the distributed computing devices 100 and the distributed handheld devices 110 may be associated with an independent third party user, as opposed to a carrier. Regardless, in various embodiments, the distributed computing devices 100, the distributed handheld devices 110, and the central computing devices 120 may be capable of receiving data via one or more input units or devices, such as a keypad, touchpad, barcode scanner, radio frequency identification (RFID) reader, interface card (e.g., modem, etc.) or receiver. The distributed computing devices 100, the distributed handheld devices 110, and the central computing devices 120 may further be capable of storing data to one or more volatile or non-volatile memory modules, and outputting the data via one or more output units or devices, for example, by displaying data to the user operating the device, or by transmitting data, for example over the one or more networks 130.

Weather Avoidance Server 200

In various embodiments, the weather avoidance server 200 includes various systems for performing one or more functions in accordance with various embodiments of the present invention, including those more particularly shown and described herein. It should be understood, however, that the server 200 might include a variety of alternative devices for performing one or more like functions, without departing from the spirit and scope of the present invention. For example, at least a portion of the server 200, in certain embodiments, may be located on the distributed computing device(s) 100, the distributed handheld device(s) 110, and the central computing device(s) 120, as may be desirable for particular applications.

FIG. 31 is a schematic diagram of the server 200 according to various embodiments. The server 200 includes a processor 230 that communicates with other elements within the server via a system interface or bus 235. Also included in the server 200 is a display/input device 250 for receiving and displaying data. This display/input device 250 may be, for example, a keyboard or pointing device that is used in combination with a monitor. The server 200 further includes memory 220, which preferably includes both read only memory (ROM) 226 and random access memory (RAM) 222. The server's ROM 226 is used to store a basic input/output system 224 (BIOS), containing the basic routines that help to transfer information between elements within the server 200.

In addition, the server 200 includes at least one storage device or program storage 210, such as a hard disk drive, a floppy disk drive, a CD Rom drive, or optical disk drive, for storing information on various computer-readable media, such as a hard disk, a removable magnetic disk, or a CD-ROM disk. As will be appreciated by one of ordinary skill in the art, each of these storage devices 210 are connected to the system bus 235 by an appropriate interface. The storage devices 210 and their associated computer-readable media provide non-volatile storage for a personal computer. As will be appreciated by one of ordinary skill in the art, the computer-readable media described above could be replaced by any other type of computer-readable media known in the art. Such media include, for example, magnetic cassettes, flash memory cards, digital video disks, and Bernoulli cartridges.

Although not shown, according to an embodiment, the storage device 210 and/or memory of the server 200 may further provide the functions of a data storage device, which may store historical and/or current delivery data and delivery conditions that may be accessed by the server 200. In this regard, the storage device 210 may comprise one or more databases. The term "database" refers to a structured collection of records or data that is stored in a computer system, such as via a relational database, hierarchical database, or network database and as such, should not be construed in a limiting fashion.

A number of program modules comprising, for example, one or more computer-readable program code portions executable by the processor 230, may be stored by the various storage devices 210 and within RAM 222. Such program modules include an operating system 280, a data module 400, a tool module 500, and a report module 600. In these and other embodiments, the various modules 400, 500, 600 control certain aspects of the operation of the server 200 with the assistance of the processor 230 and operating system 280. In still other embodiments, it should be understood that one or more additional and/or alternative modules may also be provided, without departing from the scope and nature of the present invention.

In general, the data module 400 is configured to receive, store, manage, and provide (e.g., upon request) any of a variety of data, as has been described elsewhere herein. The tool module 500 is configured to execute one or more tools to convert and/or otherwise manipulate various portions of the data, as has also been described elsewhere herein. The report module 600 is then configured to activate a notification tool, which may be utilized to communicate with one or more users of the system, for example during the at least partially automated operation of the system, as described elsewhere herein.

In various embodiments, the program modules 400, 500, 600 are executed by the server 200 and are configured to generate one or more graphical user interfaces, reports, instructions, and/or notifications/alerts, all accessible and/or transmittable to various users of the system 20. In certain embodiments, the user interfaces, reports, instructions, and/or notifications/alerts may be accessible via one or more networks 130, which may include the Internet or other feasible communications network, as previously discussed. In other embodiments, one or more of the modules 400, 500, 600 may be alternatively and/or additionally (e.g., in duplicate) stored locally on one or more of the distributed computing devices 100, the distributed handheld devices 110, and/or the central computing devices 120, and may be executed by one or more processors of the same. According to various embodiments, the modules 400, 500, 600 may send data to, receive data from, and utilize data contained in, one or more databases, which may be comprised of one or more separate, linked and/or networked databases.

Also located within the server 200 is a network interface 260 for interfacing and communicating with other elements of the one or more networks 130. It will be appreciated by one of ordinary skill in the art that one or more of the server 200 components may be located geographically remotely from other server components. Furthermore, one or more of the server 200 components may be combined, and/or additional components performing functions described herein may also be included in the server.

While the foregoing describes a single processor 230, as one of ordinary skill in the art will recognize, the server 200 may comprise multiple processors operating in conjunction with one another to perform the functionality described herein. In addition to the memory 220, the processor 230 can also be connected to at least one interface or other means for displaying, transmitting and/or receiving data, content or the like. In this regard, the interface(s) can include at least one communication interface or other means for transmitting and/or receiving data, content or the like, as well as at least one user interface that can include a display and/or a user input interface. The user input interface, in turn, can comprise any of a number of devices allowing the entity to receive data from a user, such as a keypad, a touch display, a joystick or other input device.

While reference is made to the "server" 200, as one of ordinary skill in the art will recognize, embodiments of the present invention are not limited to traditionally defined server architectures. Still further, the system of embodiments of the present invention is not limited to a single server, or similar network entity or mainframe computer system. Other similar architectures including one or more network entities operating in conjunction with one another to provide the functionality described herein may likewise be used without departing from the spirit and scope of embodiments of the present invention. For example, a mesh network of two or more personal computers (PCs), similar electronic devices, or handheld portable devices, collaborating with one another to provide the functionality described herein in association with the server 200 may likewise be used without departing from the spirit and scope of embodiments of the present invention.

According to various embodiments, many individual steps of a process may or may not be carried out utilizing the computer systems and/or servers described herein, and the degree of computer implementation may vary.

Conclusion

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A computer-implemented method for executing a path of air travel through a three dimensional travel region having at least two travel hazards each having varying degrees of intensity, said method comprising the steps of:

receiving, via one or more processors, data relating to each of said at least two travel hazards, said at least two travel hazards comprising a first hazard of a first hazard type and a second hazard of a second hazard type, and said data comprising first hazard data indicative of a deterministic intensity of the first hazard and second hazard data indicative of a deterministic intensity of the second hazard;

wherein at least one of said first hazard data or said second hazard data further comprise live reports indicative of observed weather conditions and deterministic future forecasts;

converting, via the one or more processors, each of said first hazard data and said second hazard data to fit to an atmospheric state intensity scale defined by a plurality of deterministic intensity values common across the first hazard type and the second hazard type, such that said first hazard data is indicative of the deterministic intensity of said first hazard along said atmospheric state intensity scale, and such that said second hazard data is indicative of the deterministic intensity of said second hazard along said atmospheric state intensity scale, wherein a first value of said plurality of deterministic intensity values is indicative of the deterministic intensity of said first hazard and a second value of said plurality of deterministic intensity values is indicative of the deterministic intensity of said second hazard determined based at least in part on a deterministic model; and generating, via a display device in communication with the one or more processors, a graphical display indicative, in a uniform and integral fashion, of: (1) the path of air travel through the three dimensional travel region, (2) the deterministic intensity of said first hazard along said atmospheric state intensity scale, (3) the deterministic intensity of said second hazard along said atmospheric state intensity scale, and (4) the location of the live reports.

2. The method as claimed in claim 1, wherein said first hazard is turbulence and said second hazard is icing.

3. The method as claimed in claim 1, wherein at least one of said first hazard data and said second hazard data comprises data dependent upon aircraft response characteristics that can further be used to describe an atmospheric state.

4. The method as claimed in claim 1, further comprising steps for:

displaying, via the display device, said first hazard data and said second hazard data in the form of two different screen displays comprising a first screen display and a second screen display, said first screen display displaying information indicative of the deterministic intensity of the first hazard using said atmospheric state intensity scale, and said second screen display displaying information indicative of the deterministic intensity of the second hazard using said atmospheric state intensity scale.

5. The method as claimed in claim 4, wherein said first screen display and said second screen display are displayed in the alternative via a toggle feature.

6. The method as claimed in claim 1, further comprising steps for:

organizing, via the one or more processors, at least a portion of said first hazard data and said second hazard data into a plurality of data points, each of said plurality of data points comprising information indicative of a hazard type, a hazard location in space, a hazard intensity, a hazard probability indicative of a probability associated with a deterministic hazard, and a time.

7. The method as claimed in claim 1, further comprising steps for:

establishing, via the one or more processors, a travel tolerance parameter (TTP) following said atmospheric state intensity scale for each of said first hazard and said second hazard, such that a first TTP is set for said first hazard, and a second TTP is set for said second hazard; and using, via the one or more processors, the first hazard data, the second hazard data, the first TTP, and the second TTP to execute a path of air travel through said three dimensional travel region.

8. The method as claimed in claim 7, wherein said first hazard is turbulence and said second hazard is icing.

9. The method as claimed in claim 7, further comprising steps for:

displaying, via a display device, said first hazard data and said second hazard data in the form of two different screen displays comprising a first screen display and a second screen display, said first screen display displaying information indicative of the deterministic intensity of the first hazard using said atmospheric state intensity scale, and said second screen display displaying information indicative of the intensity of the second hazard using said atmospheric state intensity scale, and wherein the information displayed via said first screen display is based at least in part on said first TTP and the information displayed via said second screen display is based at least in part on said second TTP.

10. The method as claimed in claim 7, further comprising steps for:

organizing, via the one or more computer processors, at least a portion of said first hazard data and said second hazard data into a plurality of data points, each of said plurality of data points comprising information indicative of a hazard type, a hazard location in space, a hazard intensity, a hazard probability indicative of a probability associated with a deterministic hazard, and a time.

11. The method as claimed in claim 10, wherein said first TTP and said second TTP are established at least partially in light of one of pilot training, employer guidelines, or other pilots.

12. The method as claimed in claim 11, wherein said first TTP and said second TTP are established at least partially in light of a type of flight equipment being used.

13. The method as claimed in claim 12, wherein said first TTP and said second TTP each have a probability element.

14. The method as claimed in Claim 9, wherein said first screen display comprises a first color gradation corresponding to one or more deterministic intensities of the atmospheric state intensity scale, and said second screen display comprises a second color gradation corresponding to one or more deterministic intensities of the atmospheric state intensity scale.

15. The method as claimed in Claim 10, wherein said first screen display and said second screen display each displays at least one of the deterministic future forecasts or the live reports.

16. The method as claimed in claim 7, further comprising steps for:
generating, via the one or more computer processors, an altered path of air travel based at least in part on the path of air travel, changes in at least one of the first hazard data and the second hazard data, and upon recognition that said path of air travel is incompatible with at least one of said first TTP and said second TTP.

17. The method as claimed in claim 16, wherein said first hazard is turbulence and said second hazard is icing.

18. The method of claim 16, further comprising steps for:
determining an expected completion time of said path of air travel; and
updating the expected completion time of said path of air travel based on the altered path of air travel.

19. A weather avoidance system for executing a path of air travel through a three dimensional travel region, the system comprising:
one or more memory storage areas comprising data related to at least two travel hazards each having varying degrees of deterministic intensity, said at least two travel hazards comprising a first hazard of a first hazard type and a second hazard of a second hazard type; and
one or more computer processors configured to:
receive data relating to each of said at least two travel hazards, said data comprising first hazard data indicative of a deterministic intensity of the first hazard and second hazard data indicative of a deterministic intensity of the second hazard;
wherein at least one of said first hazard data or said second hazard data further comprise live reports and deterministic future forecasts;
convert each of said first hazard data and said second hazard data to fit to an atmospheric state intensity ("ASI") scale defined by a plurality of deterministic intensity values common across the first hazard type and the second hazard type, such that said first hazard data is indicative of the deterministic intensity of said first hazard along said ASI scale, and such that said second hazard data is indicative of the deterministic intensity of said second hazard along said ASI scale, wherein a first value of said plurality of deterministic intensity values is indicative of the deterministic intensity of said first hazard and a second value of said plurality of deterministic intensity values is indicative of the deterministic intensity of said second hazard determined based at least in part on a deterministic model; and
generate a graphical display indicative, in a uniform and integral fashion of:
(1) the path of air travel through the three dimensional travel region, (2) the deterministic intensity of said first hazard along said atmospheric state intensity scale, (3) the deterministic intensity of said second hazard along said atmospheric state intensity scale, and (4) the location of the live reports.

20. The system of claim 19, wherein the one or more processors are further configured to:
establish a travel tolerance parameter (TTP) following said ASI scale for each of said first hazard and said second hazard, such that a first TTP is set for said first hazard, and a second TTP is set for said second hazard; and
use said first TTP and said second TTP to further execute said path of air travel through said three dimensional travel region.

21. A non-transitory computer program product comprising at least one computer-readable storage medium having computer-readable program code portions embodied therein, the computer-readable program code portions comprising:
(A) a first executable portion configured for receiving data relating to at least two travel hazards each having varying degrees of intensity, said at least two travel hazards comprising a first hazard of a first hazard type and a second hazard of a second hazard type, and said data comprising first hazard data indicative of a deterministic intensity of the first hazard and second hazard data indicative of a deterministic intensity of the second hazard, wherein at least one of said first hazard data or said second hazard data further comprise live reports and deterministic future forecasts;
(B) a second executable portion configured for converting each of said first hazard data and said second hazard data to fit to an atmospheric state intensity ("ASI") scale defined by a plurality of deterministic intensity values common across the first hazard type and the second hazard type, such that said first hazard data is indicative of the deterministic intensity of said first hazard along said ASI scale, and such that said second hazard data is indicative of the deterministic intensity of said second hazard along said ASI scale, wherein a first value of said plurality of deterministic intensity values is indicative of the deterministic intensity of said first hazard and a second value of said plurality of deterministic intensity values is indicative of the deterministic intensity of said second hazard determined based at least in part on a deterministic model; and
(C) a third executable portion configured for generating a graphical display indicative, in a uniform and integral fashion, of: (1) a path of air travel through a three dimensional travel region, (2) the deterministic intensity of said first hazard along said atmospheric state intensity scale, (3) the deterministic intensity of said second hazard along said atmospheric state intensity scale, and (4) the location of the live reports.

22. The non-transitory computer program product of claim 21, further comprising a fourth executable portion configured for establishing a travel tolerance parameter (TTP) following said ASI scale for each of said first hazard and said second hazard, such that a first TTP is set for said first hazard, and a second TTP is set for said second hazard; and, Wherein said third executable portion is additionally configured for using said first TTP and said second TTP to execute said path of air travel through said three dimensional travel region.

23. The method as claimed in claim 7, further comprising steps for generating an alert upon a determination that at least one of the first TTP or the second TTP is exceeded by the first hazard data or the second hazard data.

24. The system of claim 20, wherein the one or more computer processors are further configured to generate an alert upon a determination that at least one of the first TTP or the second TTP is exceeded by the first hazard data or the second hazard data.

25. The non-transitory computer program product of claim 22, further comprising a fifth executable portion configured to generate an alert upon a determination that at least one of the first TTP or the second TTP is exceeded by the first hazard data or the second hazard data.

* * * * *